United States Patent [19]
Eick et al.

[11] Patent Number: 5,812,124
[45] Date of Patent: Sep. 22, 1998

[54] PROGRAM CATEGORY SELECTION WITH FILTERED DATA AND DISPLAYED CASCADED CARDS

[75] Inventors: Stephen Gregory Eick; Peter Andrew Mataga, both of Naperville, Ill.; Rebecca Anne Walpole, Corvallis, Oreg.

[73] Assignee: Lucent Technologies, Inc., Murray Hill, N.J.

[21] Appl. No.: 967,721

[22] Filed: Nov. 10, 1997

Related U.S. Application Data

[63] Continuation of Ser. No. 412,393, Mar. 28, 1995, abandoned.

[51] Int. Cl.[6] ................................................. G66F 3/00
[52] U.S. Cl. .......................... 345/327; 345/353; 345/349; 348/13; 707/3; 707/7
[58] Field of Search .................... 345/326–358, 345/123; 348/7–13; 707/3–7, 104

[56] References Cited

U.S. PATENT DOCUMENTS

| | | | |
|---|---|---|---|
| 5,093,718 | 3/1992 | Hoarty et al. | 358/84 |
| 5,172,413 | 12/1992 | Bradley et al. | 380/20 |
| 5,261,042 | 11/1993 | Brandt et al. | 395/353 |
| 5,339,391 | 8/1994 | Wroblewski et al. | 395/341 |
| 5,388,197 | 2/1995 | Rayner | 395/328 |
| 5,465,113 | 11/1995 | Gilboy | 348/10 X |
| 5,479,266 | 12/1995 | Young et al. | 348/13 X |
| 5,485,197 | 1/1996 | Hoarty | 348/7 |
| 5,524,195 | 6/1996 | Clanton, III et al. | 395/327 |
| 5,557,724 | 9/1996 | Sampat et al. | 396/327 |
| 5,581,275 | 12/1996 | Glei et al. | 345/123 |
| 5,581,797 | 12/1996 | Baker et al. | 395/326 |
| 5,583,560 | 12/1996 | Florin et al. | 348/7 |
| 5,592,551 | 1/1997 | Lett et la. | 348/7 X |
| 5,596,373 | 1/1997 | White et al. | 348/7 X |

FOREIGN PATENT DOCUMENTS

| | | | |
|---|---|---|---|
| 0560593 | 9/1993 | European Pat. Off. | H04N 5/445 |
| 0645927 | 3/1995 | European Pat. Off. | H04N 5/445 |
| 0721253 | 7/1995 | European Pat. Off. | H03J 1/04 |
| WO 9322877 | 11/1993 | WIPO | H04N 7/173 |
| WO 9414282 | 6/1994 | WIPO | H04N 7/16 |
| WO 9526608 | 10/1995 | WIPO | H04N 5/445 |

OTHER PUBLICATIONS

Foss, "Tools for Reading and Browsing HyperText", Information Processing & Management, pp. 407–418, 1989.

Halasz et al., "NoteCards in a Nutshell", CHI+GI, pp. 45–52, 1987.

Mills, "A Magnifier Tool For Video Data", CHI, pp. 93–98, May 1992.

V. Brugliera, "Digital On–Screen Display, A New Technology For The Consumer Interface", 18th International Television Symposium & Technical Exhibition, Montreaux, Switz., Jun. 11, 1993, *Symposium Record Cable Sessions*, pp. 572–586.

*Primary Examiner*—John E. Breene
*Attorney, Agent, or Firm*—Jack R. Penrod

[57] ABSTRACT

An apparatus and method for presenting a viewer with an overall representation of the present number of entertainment programs available for selection given one week of program schedule data for 300 or more channels and one or more filtering criteria to limit the number of items represented in the overall representation. Sequentially applied filters will filter the group of program schedule data items that has at least 100,000 half hour time slots offered by 300 channels each week into a smaller subgroup where individual consideration of each item of the subgroup can be made in a reasonable time. A set top box drives the display of overall representations or results of filtering criteria on a commercial TV set. Once a reasonable sized subgroup is obtained, other displays provide specific information of the program offerings of the subgroup. Selection of the filtering criteria and selection from within a subgroup is interactively made by a viewer through the use of a controller that looks and operates very much like a TV remote control. This makes the interaction familiar, easy and predictable.

4 Claims, 11 Drawing Sheets

FIG. 17  1700

| TITLES BEGINNING WITH 'M, N, O, P, Q, R' |||
|---|---|---|
| | SYMBOL OR NUMBER | >> |
| | A, B, C, D, E, F, | >> |
| | G, H, I, J, K, L, | >> |
| | M, N, O, P, Q, R, | >> |
| | S, T, U, V, W, X, | >> |
| | Y, Z | >> |
| TV. SEARCH |||

FIG. 18  1800

| TITLES BEGINNING WITH 'M' ||
|---|---|
| M | >> |
| N | >> |
| O | >> |
| P | >> |
| Q | >> |
| R | >> |
| TV TITLES STARTING WITH M, N, O, P, Q, R ||

FIG. 19  1900

| TITLES BEGINNING WITH 'N' ||
|---|---|
| M | >> |
| N | >> |
| O | >> |
| P | >> |
| Q | >> |
| R | >> |
| TV TITLES STARTING WITH M, N, O, P, Q, R || ial No. 08/412,393, filed on Mar. 28, 1995, now abandoned

PROGRAM CATEGORY SELECTION WITH FILTERED DATA AND DISPLAYED CASCADED CARDS

This application is a continuation application Ser. No. 08/412,393, filed on Mar. 28, 1995, now abandoned

TECHNICAL FIELD

The invention concerns a method and apparatus for subjecting a large schedule of data items having multiple attributes to consecutive selection criteria in order to reduce the number of individual programs to a manageable group which can be visually searched for a desired data item having a selected subset of the attributes, and more particularly to an apparatus and method which use an interactive control having directional buttons and a select button that are used in conjunction with an interactive display viewed on a normal television set to select the desired data item.

DESCRIPTION OF THE PRIOR ART

Presently there are known methods for reducing a large quantity of data into a manageable set of data which can be visually searched for a desired item by a decision maker. One example of such a large quantity of data is a directory of a fixed drive of a computer system. Methods implemented through interactive graphical user interfaces for personal computers and workstations display and reduce disk drive directories to root directory displays which typically show root level files and one or more branch subdirectories for the user's selection. Upon selection of a subdirectory, usually by a mouse, the display typically shifts showing files of the selected subdirectory and sub-subdirectories for further selection. The subdirectory display is often too big to fit on the screen, so interactive scroll bars are typically provided so the display may be controlled by a mouse. Using the mouse and the scroll bars, a user may work down the directory tree structure until the desired file is found. Such graphical user interfaces are common for computers and monitors where visual definition is typically at least 640×480 pixels for each display. Such techniques might be used in homes to access databases of useful information, such as airline schedules, television programming schedules and movie-on-demand catalogues. Unfortunately, each home does not have a computer or work station with 640×480 pixel definition which could take advantage of such existing databases. Further, the NTSC television set which almost every home has in its living room has relatively low viewing definition compared to 640×480 pixels or more per screen definition of computer monitors. Moreover, the typical home television set is not connected to a mouse, which is not an appropriate pointing device for the living room, rather most television sets have controls on control panels and/or on a remote controls. If just a fraction of these home television sets were used to find and select airline ticket reservations, programs to watch on 300 hundred or more channel cable television services, or pay-per-view movies from a vast collection, the profitability of the service providers and the satisfaction of the users would both be improved. The 300 plus channels mentioned, may use any type of transmission scheme that will deliver information via a cable or wireless path and includes but is not limited to time division multiplexed channels, frequency division multiplexed channels and packet data multiplexed channels.

One known approach for the TV programming schedule is to display the presently showing programs along with the next subsequent programs for the next hour or so, on what is referred to as a preview channel. Because this is more information than can be legibly displayed on one television screen at once, the preview channel display often scrolls through all the channel offering for the present time and the near future. For a sixty channel system, one complete scrolling takes about three minutes. At such a rate, a one hundred channel cable service would take five minutes and the future three hundred plus channel cable services would take 15 minutes. Needless to say, three minutes is a long time, but acceptable because breaks between programs are about that long. Five and fifteen minutes time periods though represent a substantial portion of a 30 minute program and are simply too long to expect a TV viewer to wait. The alternatives of speeding up the scrolling rate or using smaller size letters for descriptions are not practical either because either of these actions reduces the ability of the viewer to read and understand the schedule. Thus, there is a need in the art for a method and apparatus that allows a viewer to quickly find and select a desired data item from a large schedule, in this case a TV program for viewing from a TV programming schedule for 300 plus channels over the ensuing hours or even days. There is a similar need for a method and apparatus, very similar to the TV program selector, for finding and selecting a movie to order from movies-on-demand, or an airline flight(s) for a trip. It would further be desirable to use a method similar to the TV program selector to find and select a file in storage assets accessible by the apparatus to be executed, updated or deleted as part of file maintenance.

It is an object of the present invention to provide a view of a large schedule of data items and interactive selections of subgroups of the large schedule of data items in order to arrive at a screen display with sufficiently small number of items and sufficiently legible descriptions of each item to provide a viewer with an opportunity to make a reasoned selection therefrom.

It is another object of this invention to provide a method for interactively selecting a data item from a large schedule of data items by means of sequentially applying different filtering criteria using an interactive control having an operation appropriate for use with a television set.

SUMMARY OF THE INVENTION

In another aspect of the invention, the aforementioned objects may be achieved by providing a method for a home television viewer to interactively select a data item from a large schedule of data item having multiple attributes. The method includes a step of receiving the large schedule of data items. The received schedule of data items is stored locally in a database format in order to expedite later filtering and retrieval. Next, the schedule of data items is filtered into a subgroup of the schedule of data items according to attributes selected by to interactive viewer inputs. The resulting subgroup of the schedule data items is displayed for the viewer's inspection. The user then interactively selects a data item from the subgroup of data items viewed on a television screen.

Briefly stated, in accordance with one aspect of the invention, the aforementioned objects are achieved by providing an apparatus for selecting an item from a large group in a system having display means and interactive movable pointing means for specifying a location in the display means and making a selection at a specified location. This apparatus includes a filtration means including subgroup specifiers in the display means and is responsive to selection of a subgroup specifier by the pointing means for filtering the list to produce the subgroup specified by the selected subgroup specifier; means for displaying representations of group items belonging to at least a portion of the subgroup in the display means; and group item selection means for selecting a group item by selecting the representation thereof in the display in response to the pointing means.

In yet another aspect of the invention, the aforementioned objects may be achieved by providing a method for a viewer to interactively select a program. The method includes a step of receiving program schedule data for at least 300 individual channels for a time period of at least a week. The received program schedule data is stored locally in a database format in order to expedite later sorting and retrieval. Next, the program schedule data is filtered into a subgroup of the program schedule data in response to interactive viewer inputs. The subgroup of the program schedule data is displayed for the viewer's inspection. The user then interactively selects a program from the subgroup of program schedule data for viewing on a TV screen, or alternatively for recording by an appropriate program recording device.

BRIEF DESCRIPTION OF THE DRAWING

FIG. 17 is the same display as FIG. 14 except that the highlighted interactive area is at a different location.

FIG. 18 is a pictorial of a second alphanumeric interactive display.

FIG. 19 is the same display as FIG. 16 except the highlighted interactive area is at a different location.

DETAILED DESCRIPTION

Figure 1:
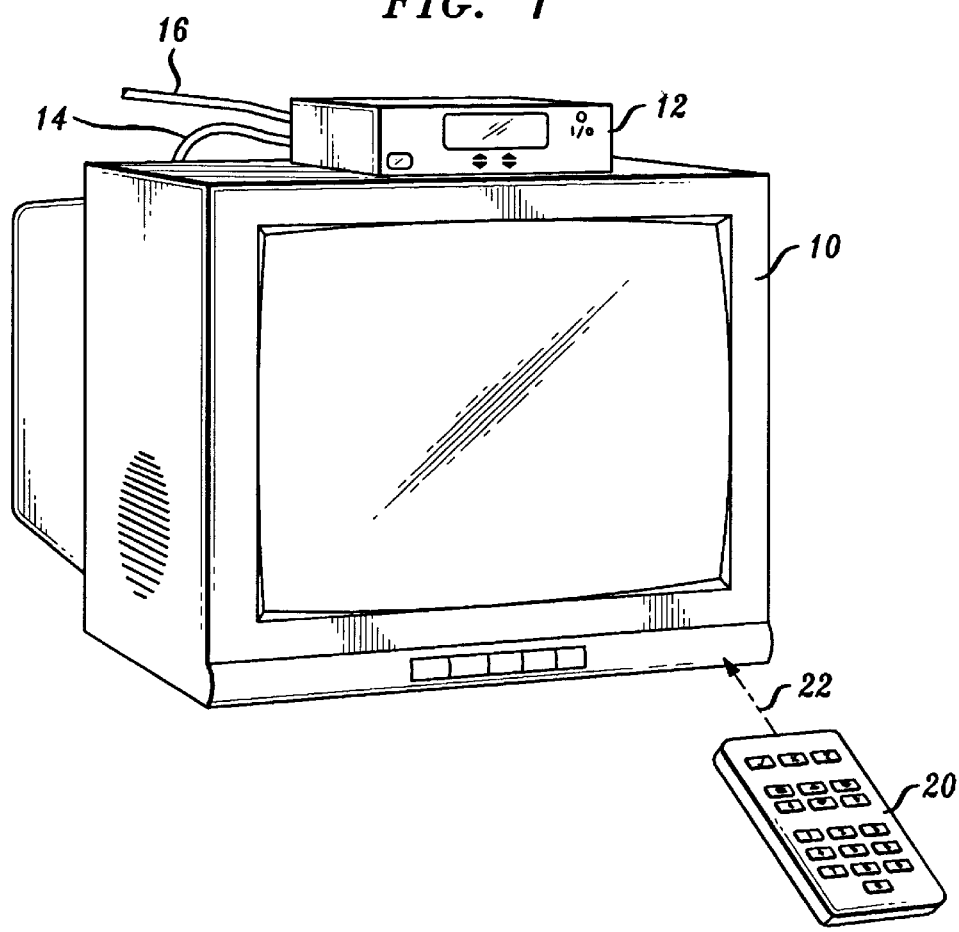
FIG. 1 is a pictorial of a television set connected through a set top box to a cable carrying the program to be selected and a controller for selecting that program.

Referring now to FIG. 1, a television set (TV) 10 is connected to set top box (STB) 12 via interconnecting cable 14. STB 12 is also connected to cable 16 which carries at least one cable program. The TV 10 is any standard TV such as an NTSC, a high definition, or some other standard commercial type for home use. A controller 20 is linked to STB 12, preferably via a free space optical link 22 for controlling the operation of STB 12 in order to select a program for viewing.

Figure 2:
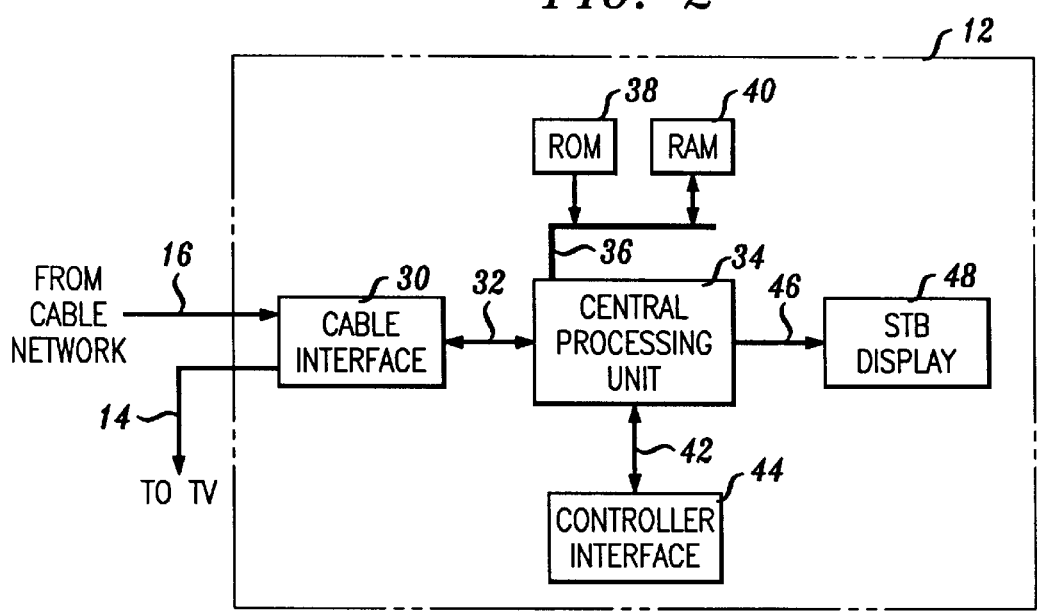
FIG. 2 is a simplified block diagram of the set top box.

Referring now to FIG. 2, STB 12 will be described in greater detail. The STB 12 has a cable interface 30 that selects and converts the incoming signals on cable 16, whether they are digital signals, analog signals, or packet signals, to signals that are compatible with the TV 10. The cable interface 30 is connected by bi-directional bus 32 to CPU 34. Bi-directional bus 32 carries digital information received over cable 16 for use by CPU 34 and digital information transmitted from CPU 34 to cable interface 30. If cable 16 is a bi-directional cable, some of the information from CPU 34 will be processed through cable interface 30 to cable 16.

In addition to bi-directional bus 32, CPU 34 is connected to ROM 38 and RAM 40 via a memory bus 36. ROM 38 contains an operating program that is executed by CPU 34 to provide most of the functionality of the STB 12. RAM 40, among other things, provides storage space for intermediate results of the operating program as executed by CPU 34. RAM 40 provides storage for data that is received from cable 16 and filtered in response to the operating program and viewer inputs from controller 20 (shown in FIG. 1). If further storage is needed for data, larger RAM devices and/or mass storage devices such as disk drives, may be also connected bi-directional bus 32 (not shown). To receive viewer input, CPU 34 is connected to controller interface 44 via bus 42, and to provide feedback to the viewer, CPU 34 is connected to and drives STB display 48 via bus 46 with channel related information.

Figure 3:
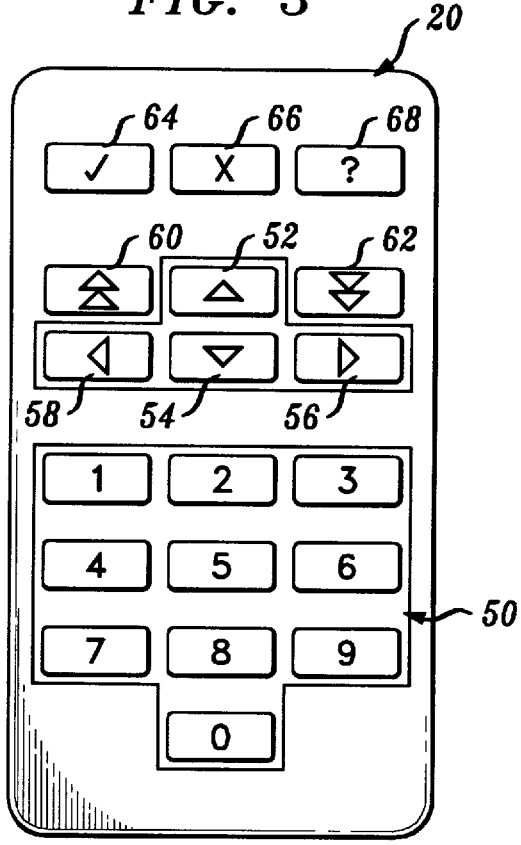
FIG. 3 is a pictorial of a controller as shown in FIG. 1.

FIG. 3 illustrates a preferred embodiment of the controller 20. Controller 20 is designed to look and operate like a standard remote control of a TV or a video cassette recorder (VCR). Controller 20 has a numeric keypad 50 having number keys 0–9. Controller 20 has an up arrow 52, a down arrow 54, a right pointing arrow 56, a left pointing arrow 58, a double up arrow 60 and a double down arrow 62. Controller 20 also has a select (✓) button 64, a cancel (X) button 66 and a query (?) button 68. All interactions with the interface provided by the present invention are controlled by various sequences of these 19 buttons of the controller 20. Further, the result of actuating one of these buttons will be similar the results of a similar action of a standard TV or VCR remote control, so its use will be familiar, predictable and intuitive to the viewer using it.

Figure 4:
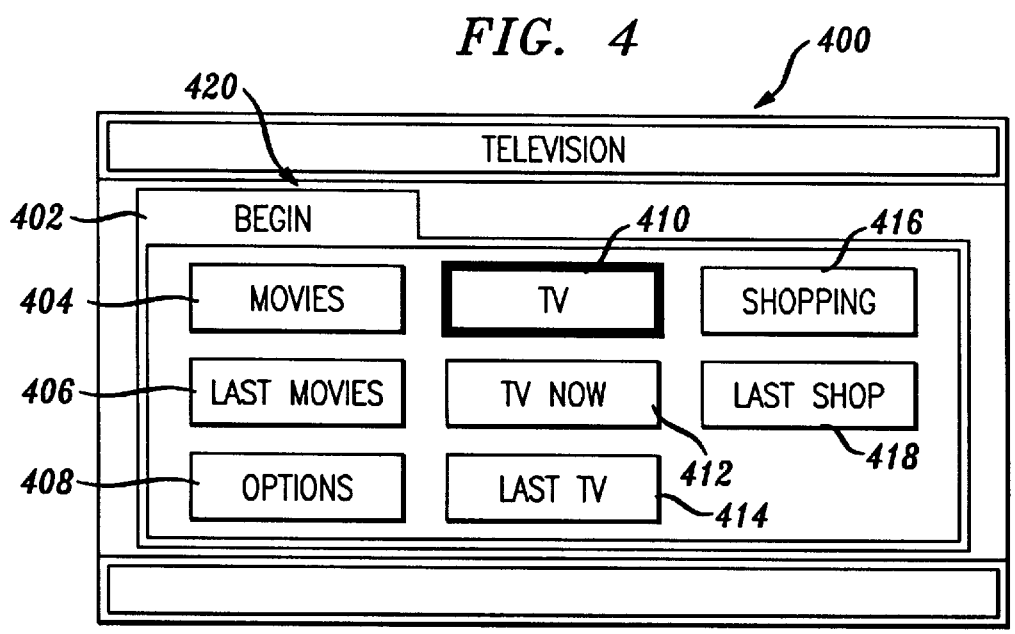
FIG. 4 is a pictorial of a top most selection interactive display.
Figure 6:
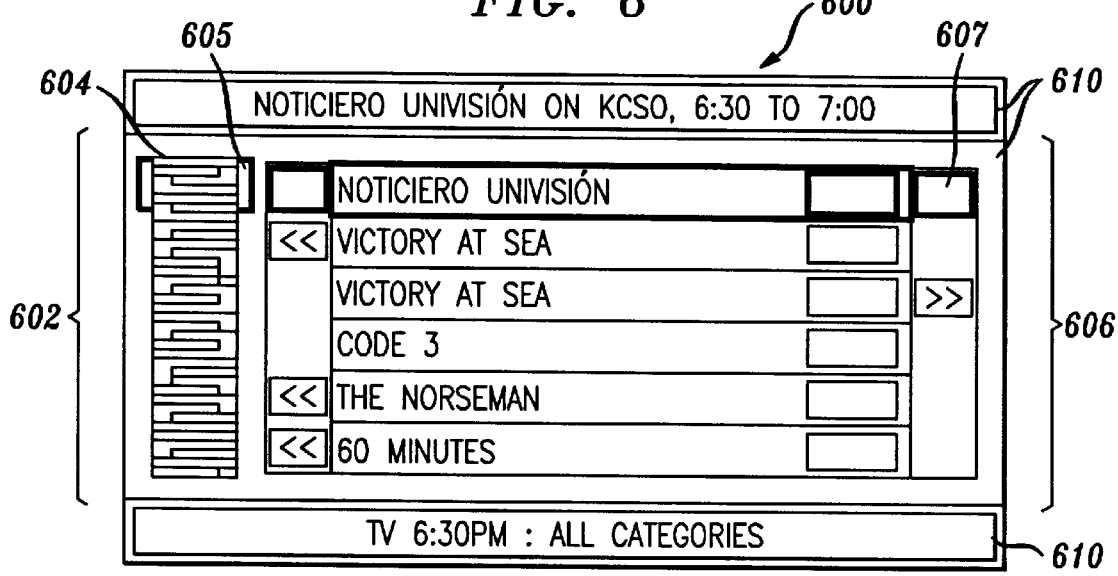
FIG. 6 is a pictorial of a third level selection interactive display.

There are two broad classes of graphical components used in the interface of the present invention: those used by the viewer to select a desired data view or to apply a filter to the information being displayed, such as FIG. 4; and those components used to actually display the information through which the viewer will progress in order to make a selection of a specific item, such as FIG. 6. For example, the viewer might view the schedule of TV programs for the next few hours (all channels), and filter the display to show only sports, basketball games in particular. These choices fall into the first class. Once the display of all basketball shows for the next few hours has been selected, the viewer may progress through it reviewing a text or video digest of each program as selected by the controller 20. Selection of a specific program would typically lead to an action such as videotaping the show or setting an alarm to remind the viewer that the desired program is coming up. The navigation and selection sequences to find and select the desired program are examples of the use of the second class of graphical components.

Note, that in both cases the viewer is required to navigate through multiple graphic displays in order to ultimately select a desired program. The interfaces are kept conceptually and visually distinct in the interface according to the present invention because they serve different purposes and the viewer is reminded of this by their appearance. In addition, the information involved in the view selection components, i.e., the first class, falls naturally into the form of hierarchical menus: short lists with complex substructure. In contrast, the data display, i.e., the second class, components must be able to handle large schedules and arrays of information, which are essentially flat data with simple substructure.

Additionally, there is a display component in most displays referred to as a 'frame', which functions as a status display. The frame is used to give the viewer some context (what view am I displaying?), as well as a brief summary of the presently selected item's characteristics (what item do I currently have selected?). Typically the latter would be the item's full name and useful information such as program start and stop times. The frame will be described further, later.

Referring now to FIGS. 3 and 4, a top or beginning level display 400 of the viewer interface for use with controller 20 as it appears on the viewer's TV 10 (shown in FIG. 1) during normal operation. It is depicted as a file card menu 402 having a tab labeled "Begin". On file card menu 402 are interactive buttons labeled Movies (on Demand) 404, Last Movie 406, Options 408, TV 410, TV Now 412, Last TV 414, Shopping 416, and Last Shop 418 which when selected by means of the controller 20 cause the next relevant display to be shown along with some sorting and/or filtering to be performed on the data stored in RAM 40 (shown in FIG. 2). When the file card menu 402 first appears, an active area, where a selection may be made, is highlighted. This active area may be moved by actuating the arrow buttons 52–56 and double arrow buttons 60, 62 of controller 20. The file card menu 402 is surrounded by a frame 420, the top of which indicates the designation of the active area currently highlighted. Once an active area has been highlighted, a selection is made by actuating the select (✓) button 64 in FIG. 4, the TV button 410 is shown to be active: by actuating the select (✓) button 64, the next display 500 shown in FIG. 5 appears. This appearance is a logical overlaying of the display 500 over the display 400. Although display 400 is not visible while any logically overlaying display is appearing on the screen of the TV 10, display 400 will become visible again if all of the logically overlaying displays are canceled, i.e. by actuating the cancel (X) button 66. Thus, until a program is selected for real time viewing, it is possible for the viewer to work his or her way back to the display 400 by actuating the cancel (X) button the appropriate number of times.

Figure 5:
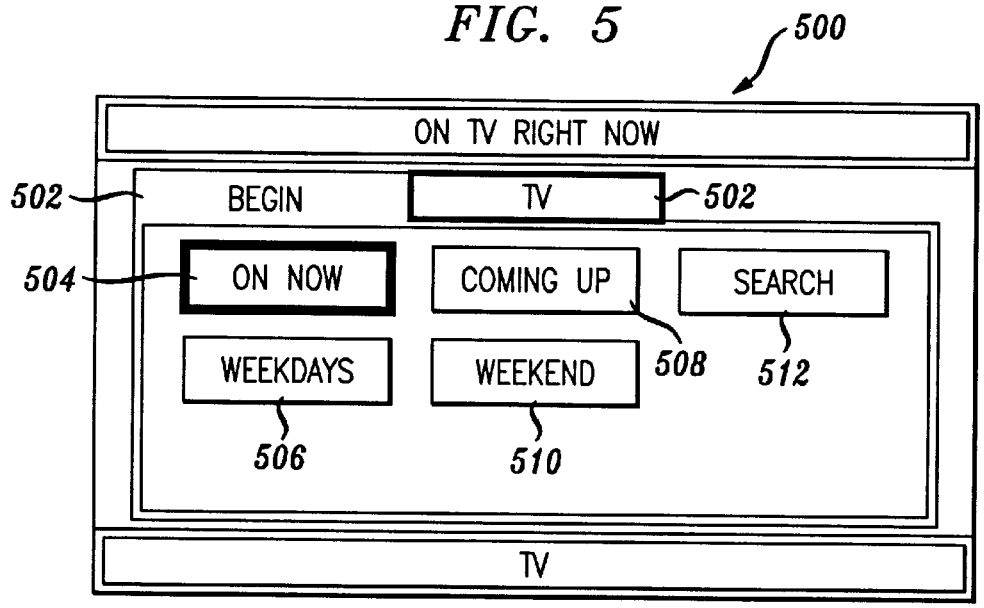
FIG. 5 is a pictorial of a second level selection interactive display.

FIG. 5 shows a second level display 500 which is depicted as a file card menu 502 labeled "TV", which appears to overlay and occlude all of file card menu 402 except for the label "Begin". The label TV indicates that the items that can be accessed are TV shows, such as dramatic series, situation comedies, serials, regular variety shows, game shows, sports, and so forth. Since movies and shopping were topics of other interactive buttons, these types of programs may be filtered out in whole or in part. File card menu 502 has interactive buttons labeled On Now 504, Weekdays 506, Coming Up 508, Weekend 510, and Search 512. As with the file card menu 402, file card menu 502 has an active area that can be moved by the viewer by operation of the arrow buttons 52–56 and double arrow buttons 60, 62 of controller 20 (shown in FIG. 3). Each of the interactive button represents another filtering that will be performed if it is selected. In FIG. 5, the On Now button 504 is highlighted, and if selected by actuating the select (✓) button 64, causes a third level display shown in FIG. 6 to appear and a further sorting an/or filtering of the data stored within RAM 40 (shown in FIG. 2).

Referring now to FIG. 6, display 600 shows what is on at the present time, which in this illustration is 6:30 p.m. A reduced representation 602 of all television shows that are on at the present time appears in FIG. 6. The reduced representation 602 presents each program that is presently on as a card in a tightly cascaded set of cards. The cards may be gray shade coded to distinguish between news shows, sport shows, dramatic shows, comedy shows, documentary shows and so forth. Those skilled in the art will recognize that color would be preferable for color television sets, and a method and apparatus according to the present invention using color to differentiated program types in the reduced representation 602 is contemplated. Thus, using visual coding within the reduced representation 602 would allow a sports program to visually stand out from the non-sports TV programming in the example shown. Up arrow 52 and Down arrow 54 respectively move a selection window 604, which is slightly wider than the items displayed in reduced representation, up and down the reduced representation 602 of the On Now subgroup in single steps. Motion of the active area along the reduced representation 602 is one dimensional, either up or down. The up arrows 60 and the down arrows 62 move this selection window 604 respectively up and down the reduced representation 602 in increments of six. The individual items visible and located within the selection window 604 represent a further subgroup of six programs out of the reduced representation 602 On Now subgroup. This six program subgroup of the selection window 604 is displayed in larger form in a grid display 606 located next to reduced representation 602. This larger form allows the viewer to read the titles of the programs presently in grid display 606. The visible coding, i.e. gray shade coding or color coding, of each item is retained in the larger form in grid display 606 to aid the viewer differentiate between the various types of programming offered.

Within selection window 604 and grid display 606 are active areas 605, 607 that highlight one item in their respective portions of display 600. The active areas 605, 607 move in coordination with each other in response to the Up arrow 52 and the Down arrow 54. When Up arrow 52 or Down arrow 54 require the active areas 605 and 607 to move above or below the selection window 604 and grid display 606, a paging occurs which moves the selection window up six or down six. When an item is located within active areas 605, 607, further information, such as the TV channel call sign, the cable channel number, and the exact start and stop times, is retrieved from the programming database stored in RAM 40 and displayed in the top of a frame 610 of display 600. If the select (✓) button 64 is actuated at this time, a preview of either a short text description or a brief still or motion video replaces the grid display 606. The data for these previews are stored in RAM 40. A second sequential actuation of the select (✓) button 64 actually selects the highlighted program in the active area 604 of reduced representation 602 and formerly highlighted in grid display 606. If the up arrow 52 or the down arrow 54 is actuated the respective preview for the next program item up or down from the previous previewed item is selected. The information displayed in the top of the frame 610 will change to the next program item up or down also. Actuation of the cancel button 66 returns the viewer to the previous arrangement of display 600. The bottom of the frame 610 lists the characteristics of the display 600, which are also retrieved from RAM 40. If the query (?) button 68 is actuated, the grid display 606 will be replaced by a generalized help menu. This generalized help menu has many buttons, as explained below, one of which is a view button. If the view button is actuated, the generalized help menu is replaced with the previous select (i.e. filter) view.

Figure 7:
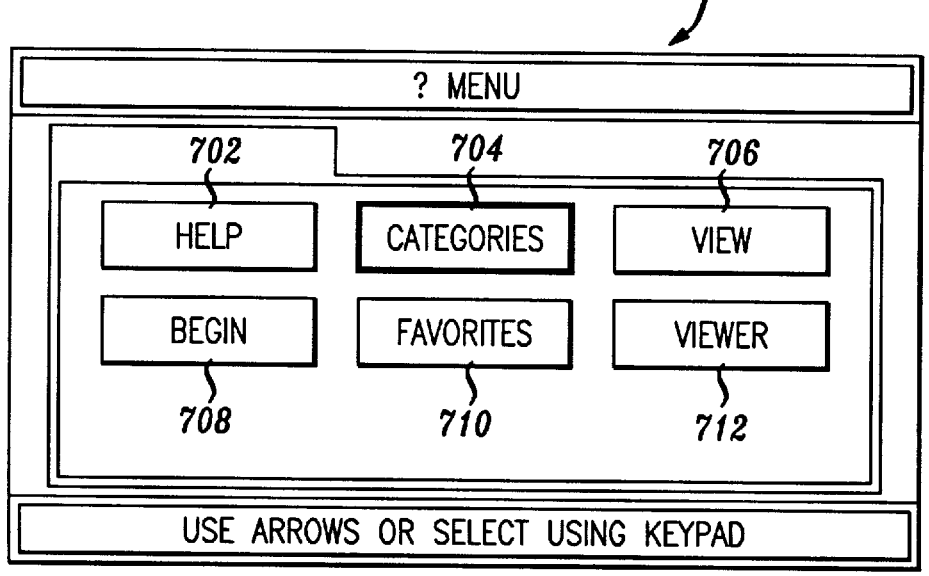
FIG. 7 is a pictorial of a first level selection query display.

Referring now to FIGS. 3, and 7 a selection of a program by category will be described. Actuation of the query (?) button 68 of controller 20 causes display 700 to appear on the screen of TV 10 (shown in FIG. 1). On display 700 has a help button 702, a categories button 704, a view button 706, a begin button 708, a favorites button 710, and a user button 712. An active area, shown on categories button 704 is moved by the arrow buttons 52–58. The function of the view button 706 has been discussed in regard to FIG. 6 and will not be repeated here. Actuation of the help button 702 causes a menu of specific help functions to be displayed. Actuation of the begin button 708 causes the beginning menu to be displayed, i.e. it takes the viewer back to the beginning of the selection sequence. Actuation of the favorites button 710 brings up a list of favorite programs for the present timeslot, which may either be accumulated by the CPU 32 from viewing data or may be entered by the viewer or viewers. Actuation of the viewer button 712, which causes a display to appear where a viewer may interactively enter his or her status as the principal viewer. This information is used to determine, display a slate of favorite programs customized for each viewer. Actuation of the categories button 704 causes a further display 800, which is shown in FIG. 8, to replace display 700 on the screen of TV 10.

Figure 8:
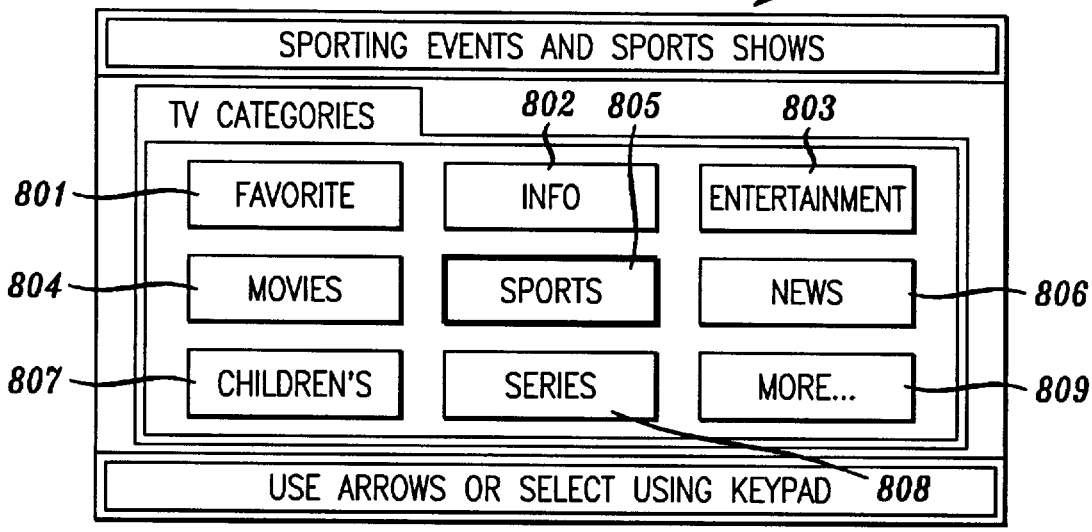
FIG. 8 is a pictorial of a second level selection query display.
Figure 9:
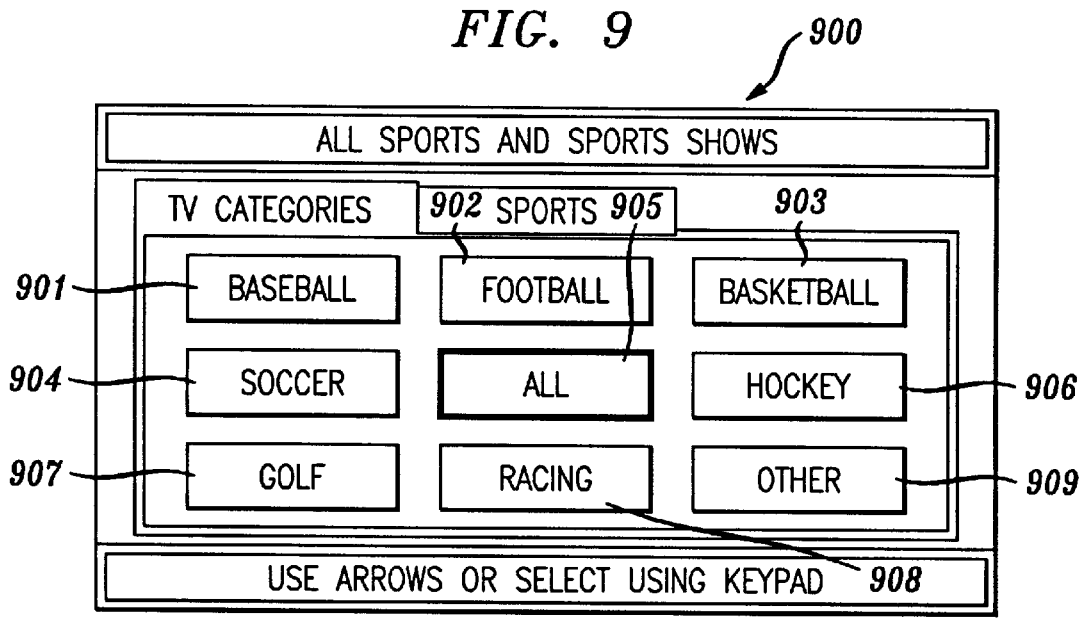
FIG. 9 is a pictorial of another third level selection query display.

Referring now to FIGS. 3, 8 and 9, display 800 has numerous buttons 801, 802, 803, 804, 805, 806, 807, 808, and 809 corresponding to Favorite, Information, Entertainment, Movies, Sports, News, Children, Series and More categories of programming. The buttons 801–809 may be have an active area moved among them using arrows 52–58, or the numeric keypad may be used as a set of hot keys to move the active area to the desired category immediately. The buttons 801–809 are laid out in a 3×3 row and column arrangement just the same as the 1–9 keys of keypad 50 are arranged. Thus, without numbering, intuitive hot key navigation is possible. For example to move the active area to the button in the third column and third row, i.e. button 809, the key in the third column and the third row, i.e. the numeral 9, of keypad 50 is actuated. The button 809 unlike the other buttons which subsequently provide narrower choices, gives another display of buttons for further category choices (not shown). If the active area is around Sports button 805 as shown in FIG. 8, and the select (✓) button 64 is actuated, the display shown in FIG. 9 would appear. FIG. 9 is arranged with selection buttons 901–909 in a 3×3 arrangement, similar to that of FIG. 8. Movement of the active area by arrows 52–58 or by hot key is available in FIG. 9, as in FIG. 8. Buttons 901–909 correspond to Baseball, Football, Basketball, Soccer, All, Hockey, Golf, Racing and Other respectively. Except for All button 905, each of the buttons in FIG. 9 represents a narrower subgroup of the overall category of sports. Actuating All button 905 causes display 1000, shown in FIG. 10, to replace, i.e. logically overlay, display 900.

Figure 10:
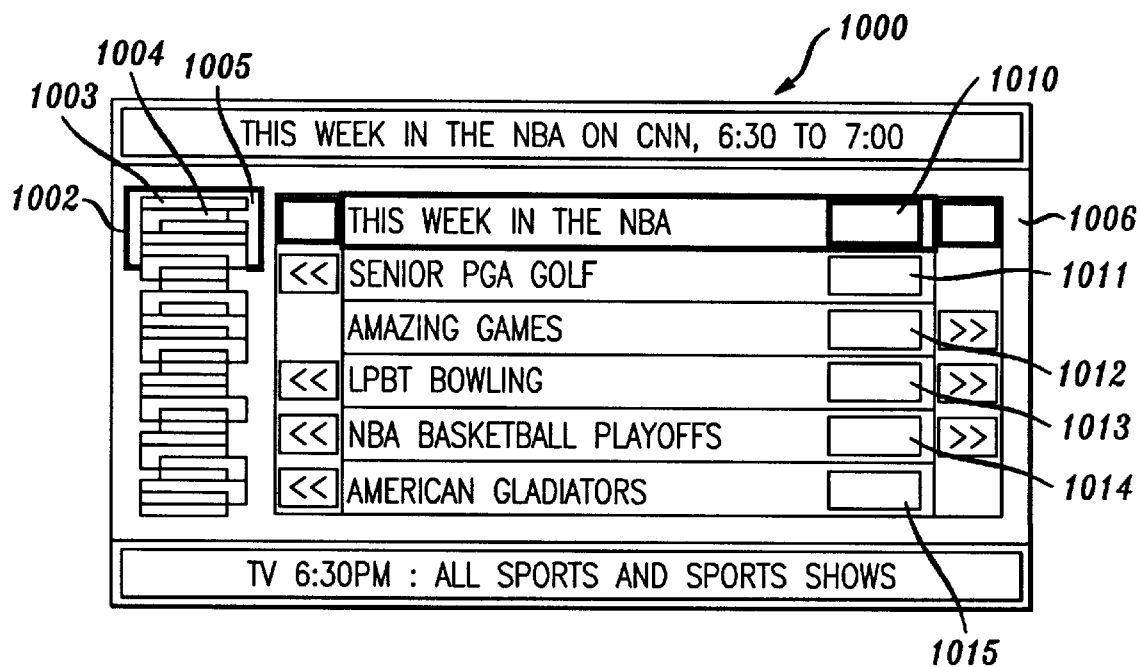
FIG. 10 is a pictorial of a display showing a subgroup of programs meeting the Sports, All and On Now sorting criteria.
Figure 11:
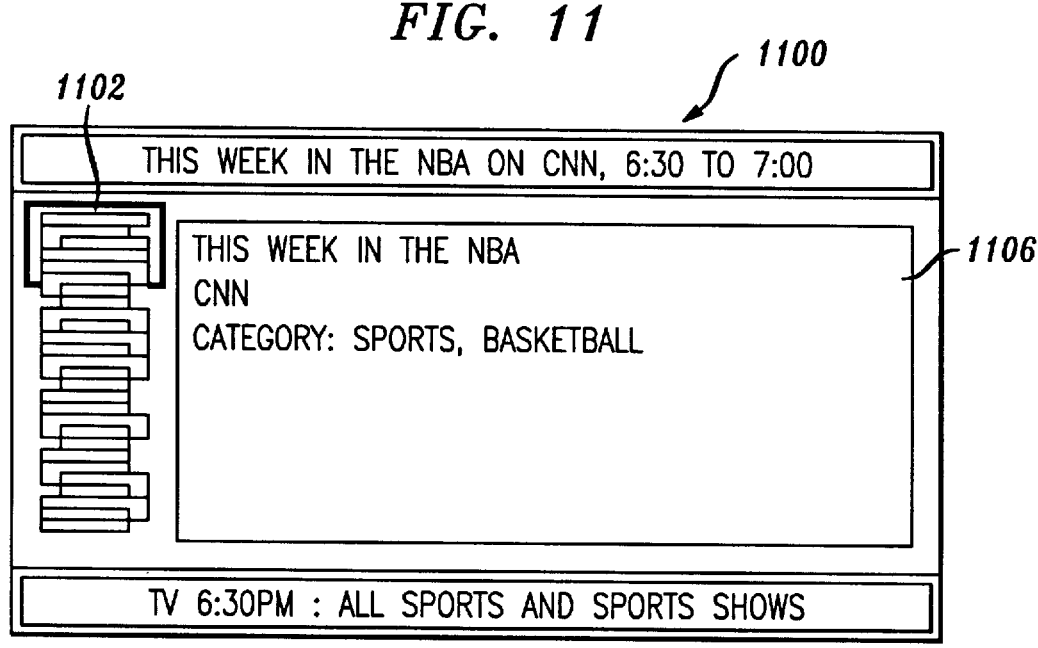
FIG. 11 is a pictorial of a of the display showing the subgroup of programs meeting the Sports, All and On Now sorting criteria along with a window having a preview of the highlighted program.

Referring now to FIG. 10, a filtered display for TV programs, that are On Now, for 6:30 p.m. local time as shown in FIG. 10, that are Sports programs showing All categories in reduced representation 1002 is shown. Reduced representation 1002 has so few entries that characteristics of the individual cards that were hidden previously by the sheer number of programs represented can now be discerned. For example, menu card 1003 representing the program This Week in the NBA is shorter on the left side than menu card 1004 representing the program Senior PGA Golf. The reason for that difference is that the program This Week in the NBA starts at 6:30 p.m., while the program Senior PGA Golf started at an earlier time as designated by the double left pointing arrows before the title of Senior PGA Golf in selection window 1006. Since This Week in the NBA and Senior PGA Golf both end at the same time, the right sides of their reduced representations 1003 and 1004 end at the same location. Movement or navigation of the active area 1005 along the reduced representation 1002 is by means of controller 20 the same as in FIG. 6. Each of the six titles shown in selection window 1006 has a respective rectangular region 1010–1015 thereafter. The rectangular regions 1010–1015 are shaded differently according to the type of sports program with which they are associated. These different shades of gray, or different colors if the display is shown on a color TV, are a visual key to the type of sport that corresponds to each of the six titles. Actuating the select (✓) button 64 of controller 20 causes display 1106, shown in FIG. 11, which is a text preview of the program highlighted by the active area, to overlay selection area 1006. As mentioned above, actuating the select (✓) button 64 at this point will cause CPU 34 to instruct cable interface 30 (shown in FIG. 2) to select that TV program for viewing.

Figure 12:
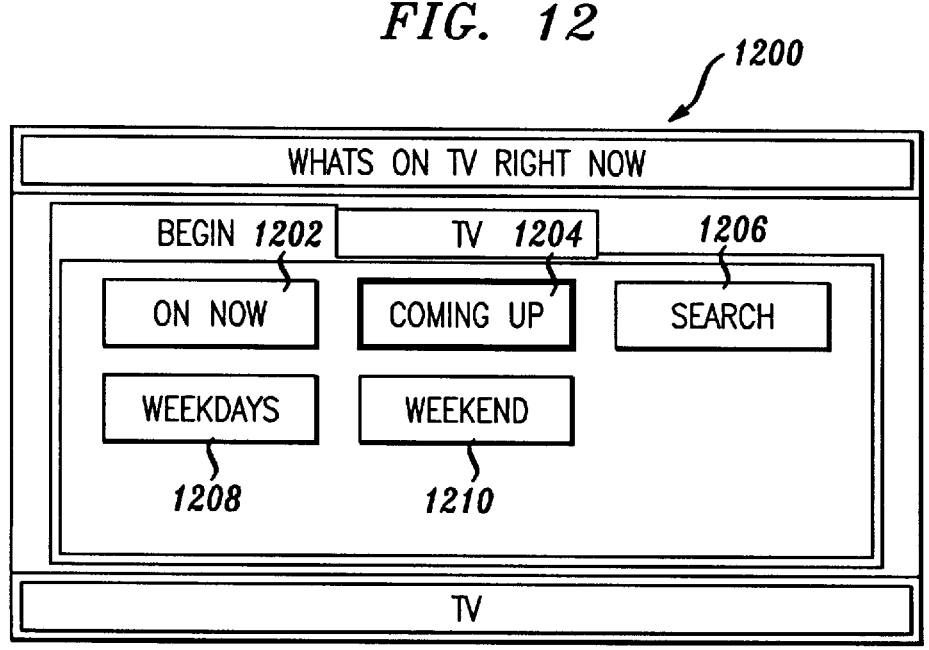
FIG. 12 is a pictorial of a display showing a second level selection interaction display, similar to FIG. 5.

Referring again to FIG. 10 if the status of the method and apparatus is the same as it was just after the selection that caused display 1000 to be shown was made, as described in the previous paragraph, and if the query (?) button 68 is actuated, then the display 700 shown in FIG. 7 with various selections will again be displayed. Further, if view button 706 is actuated, display 1200 as shown in FIG. 12 and its filter selections will logically over lay display 700. Display 1200 has numerous interactive buttons: On Now 1202, Coming Up 1204, Search 1206, Weekdays 1208 and Weekend 1210. Since the All Sports category has been selected previously, if the active area of display 1200 is moved to highlight the Coming Up button 1204 and the button 1204 is actuated, display 1300, shown in FIG. 13 will appear and over lay display 1200.

Figure 13:
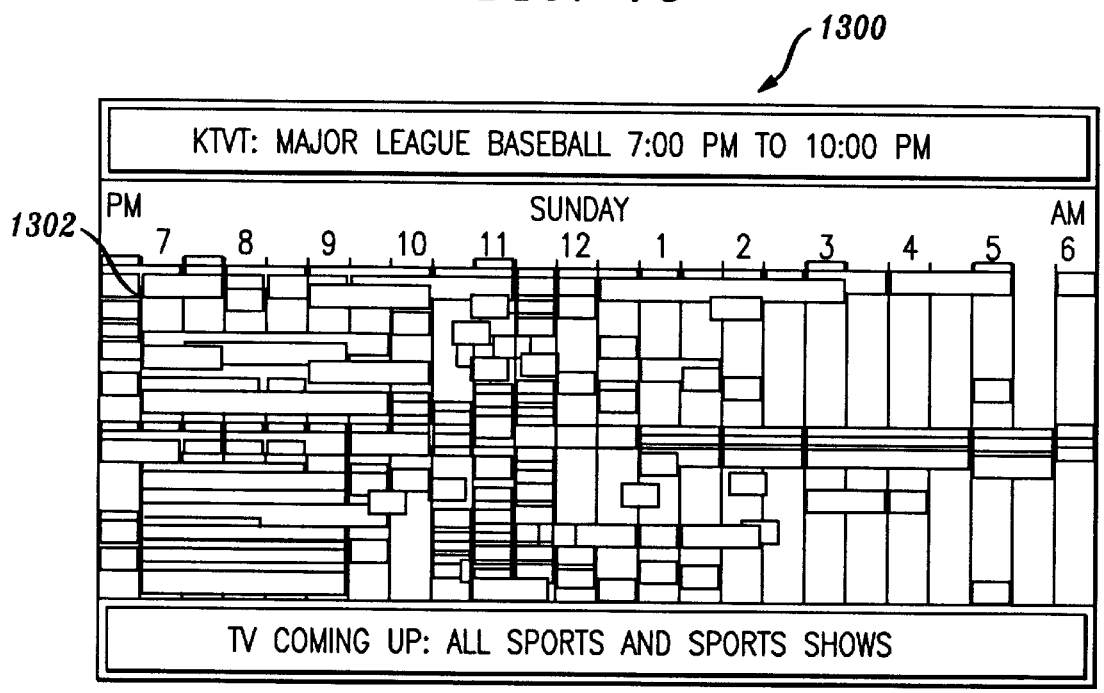
FIG. 13 is a pictorial of a two-dimensional interactive grid display with very many program data items shown in reduced representations.
Figure 14:
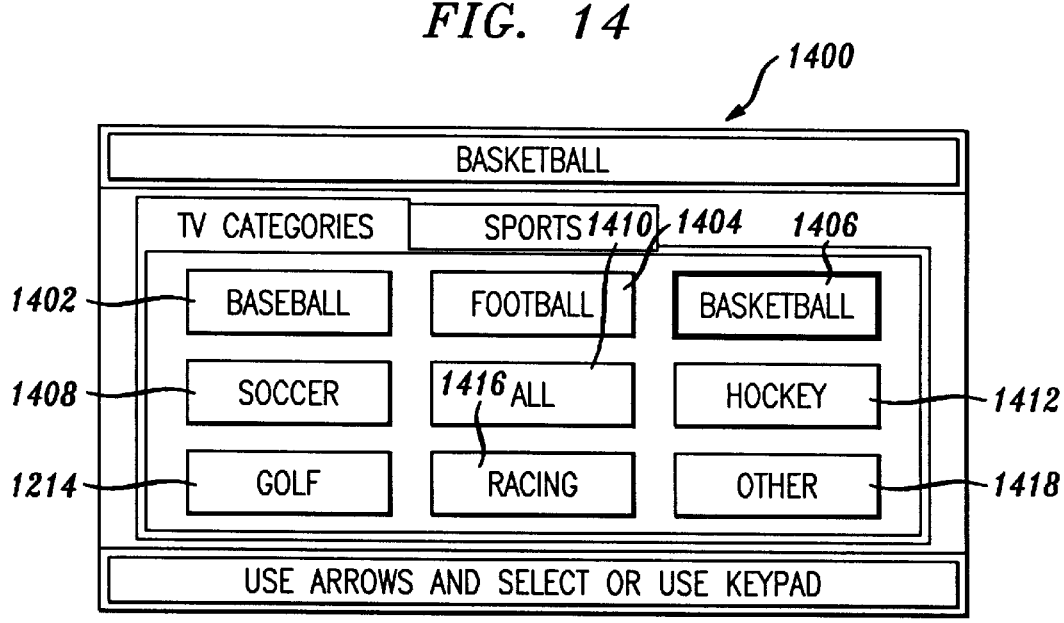
FIG. 14 is a pictorial of a third level selection query display, similar to FIG. 9.
Figure 15:
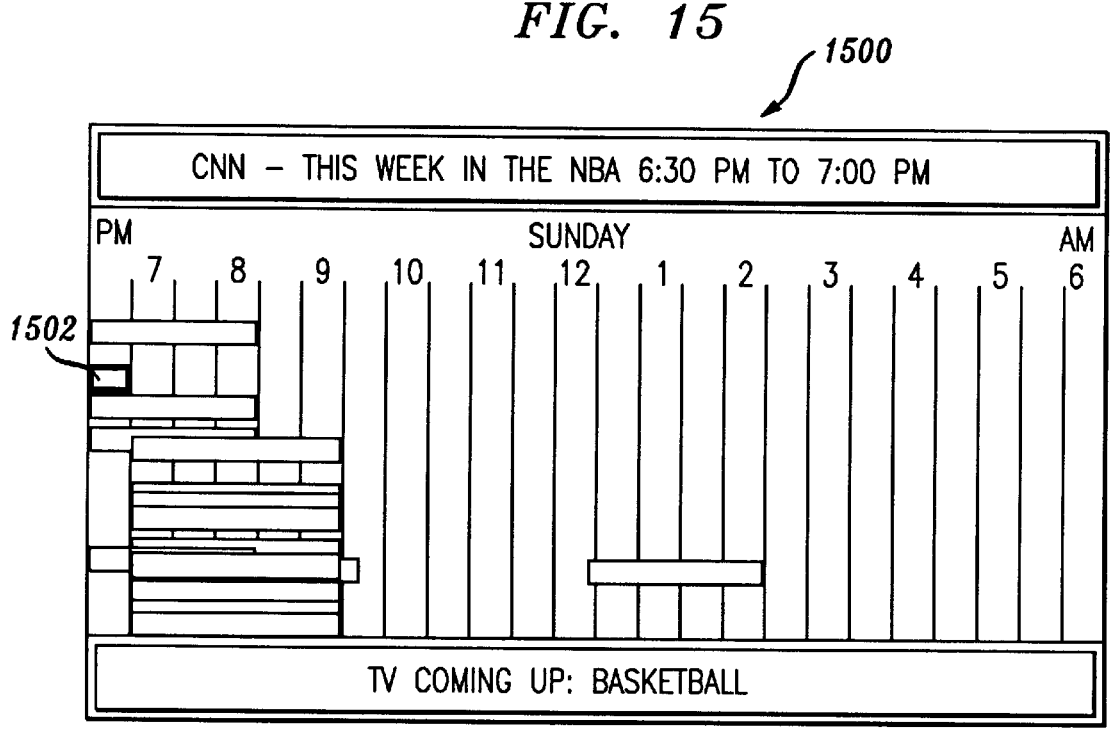
FIG. 15 is a pictorial of a two-dimensional interactive grid display filtered down to a manageable number of data items.

In display 1300, two coordinate axes are shown which are respectively labeled with two attributes of the of the selected subgroup of data items. The two attributes shown in display 1300 are channels and timeslots for the next 24 timeslots, i.e. 12 hours, coming up. Since the all sports category has been selected, each sports program showing on one of the 300 plus channels within the next 12 hours will be represented in display 1300. Each sports program upcoming is represented by a rectangular 'card' located in the row corresponding to the channel carrying the program and in the column(s) representing the timeslot(s) when it will be shown. Each 'card' is a color coded, reduced representation of the data item for its respective program. The viewer may move the active area 1302 among the cards using the up and down arrows 52, 54 and right and left arrows 56, 58 for movement vertically and horizontally, respectively. As can be seen from display 1300, there are still too many data items in the subgroup to individually consider in a reasonable amount of time, so further filtering, either by a shorter time period, i.e. On Now, or a narrower category, i.e. basketball, is needed. To change to a narrower category, the viewer presses the query (?) button 68 which causes display 700 (shown in FIG. 7) to be displayed. Next, categories button 704 is selected which causes display 900 (shown in FIG. 9) to be displayed. Next, basketball button 903 is selected which causes display 1500 of FIG. 15 to be displayed. The Coming Up time filter of FIGS. 12 and 13 has not been changed, so display 1500 shows the basketball programs coming up in the next 12 hours. As can be seen, the two-dimensional grid display 1500 contains approximately sixteen programs, which is sufficiently small to review each item individually in a reasonable time period. Moving active area 1502 around two-dimensional grid display 1500 with the up and down arrows 52, 54 and/or the right and left arrows 56, 58, causes the title and channel of each program to be displayed in the top of the frame of display 1500 to assist the reviewing and selection process. For example, the program highlighted by active area 1502 is "This Week In the NBA" and it is showing on CNN. Thus, by selective filtering the unwieldly display 1300 of programs shown in FIG. 13 is reduced to a manageable handful of display 1500, which the viewer can navigate through individually in a reasonable time.

Figure 16:
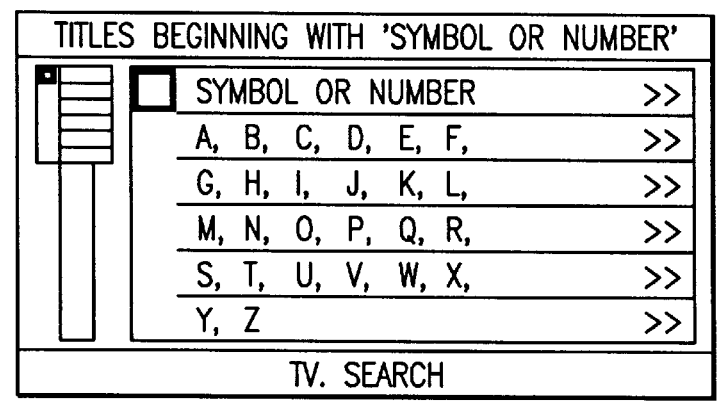
FIG. 16 is a pictorial of a first alphanumeric interactive display.
Figure 20:
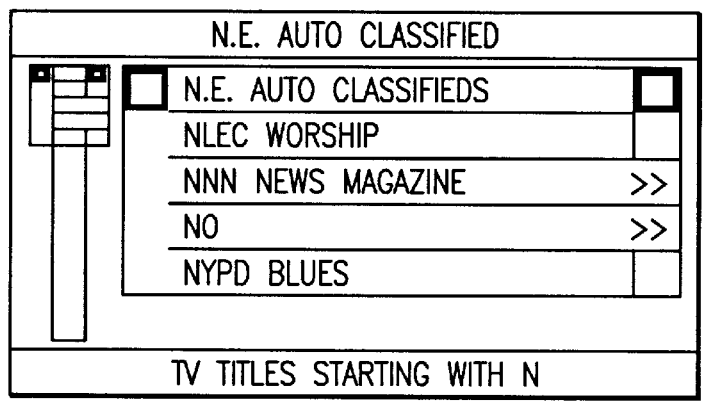
FIG. 20 is a pictorial of a third alphanumeric interactive display.

Referring now to FIGS. 16–23, another aspect of the present invention will be described. In FIG. 16 and the remaining figures, a longer period of time is selected other than the one and a half hours or so retrieved by the On Now selection. For example, if the viewer wishes to look at the programming available for the rest of the week in order to select something to record on a VCR (not shown). Actuating the button having the number zero (0) of the keypad 50 while watching a program causes the data view menu selection card, such as 900 of FIG. 9, to appear at the point in the menu-display hierarchy where the last selection was made. Actuating the zero (0) button again moves the viewer towards the broadest data view menu 400 of FIG. 4, and the viewer may stop at any display in order to change time or subject matter categories.

Figure 21:
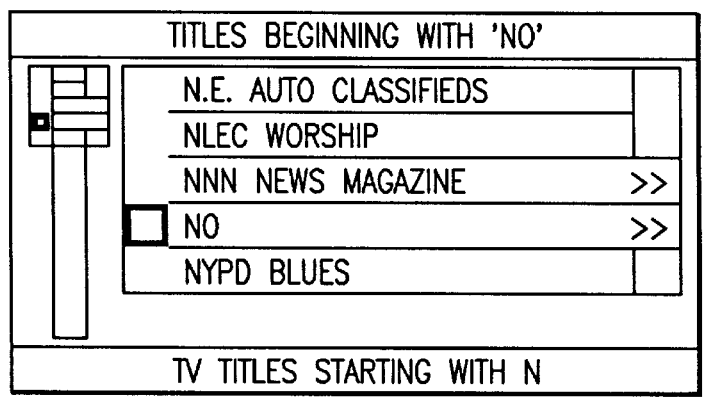
FIG. 21 is the same as FIG. 18 except that the highlighted interactive area is at a different location.
Figure 22:
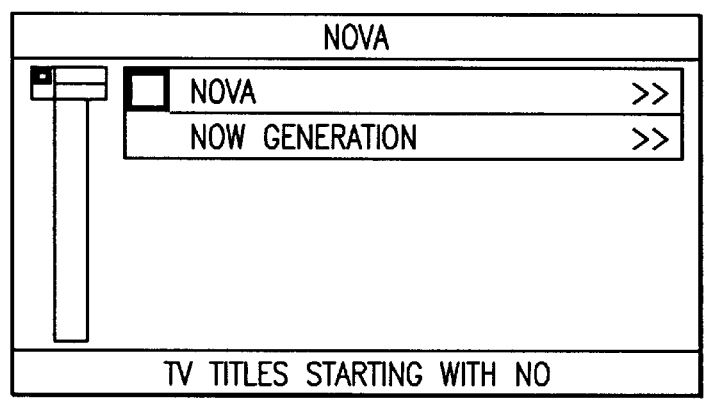
FIG. 22 is a pictorial of a fourth alphanumeric interactive display.

Thus if a viewer were watching This Week in the NBA, and wanted to find a program of interest that is on later, the viewer would first actuate the zero (0) button of keypad 50 which would bring up the display of FIG. 10. Actuating the zero (0) button four more times takes the viewer through displays 900, 800, 700 and 500 of FIGS. 9, 8, 7 and 5 respectively. To get a specific program title, the search button 509 is actuated, which causes FIG. 16 to logically overlay the display 500. FIG. 16 shows a first display 1600 of an interactive alphanumeric selection sequence. First, all alphabetic titles are sorted into groups of five or less. If, for example, Nova was the title of the desired program, the active area would be moved from its initial position (either at the top of the display or at the last group selected) to the group of letters containing the letter N using the up arrow 52 or the down arrow 54 as shown in FIG. 17 followed by actuation of the select (✓) button 64. This sequence would cause FIG. 18 to logically overlay FIG. 17. In FIG. 18, the active area is moved from its initial location at M to the location of N as shown in FIG. 17 followed again by actuation of the select (✓) button 64 causes the display 2000 of FIG. 20 to overlay FIG. 19. In display 2000 are single instances of the first two letters, such as NYPD Blue is the only instance of N followed by Y, and multiple instances of the two letter string as denoted by the double right pointing arrows by NO. To continue the search for Nova, the active area is moved to the line containing NO of display 2000 as shown in FIG. 21 using the down arrow 56 and actuating the select (✓) button 64, which causes display 2200 of FIG. 22 to overlay display 2000. Now, Nova is the only instance of a program beginning with NOV, so the entire title Nova appears in FIG. 22. By moving the active area to the line labeled NOVA in display 2200 and actuating the select (✓), button 64 causes the display 2300 shown in FIG. 23 to overlay display 2200 with a schedule of times and channels for the program series Nova.

Figure 23:
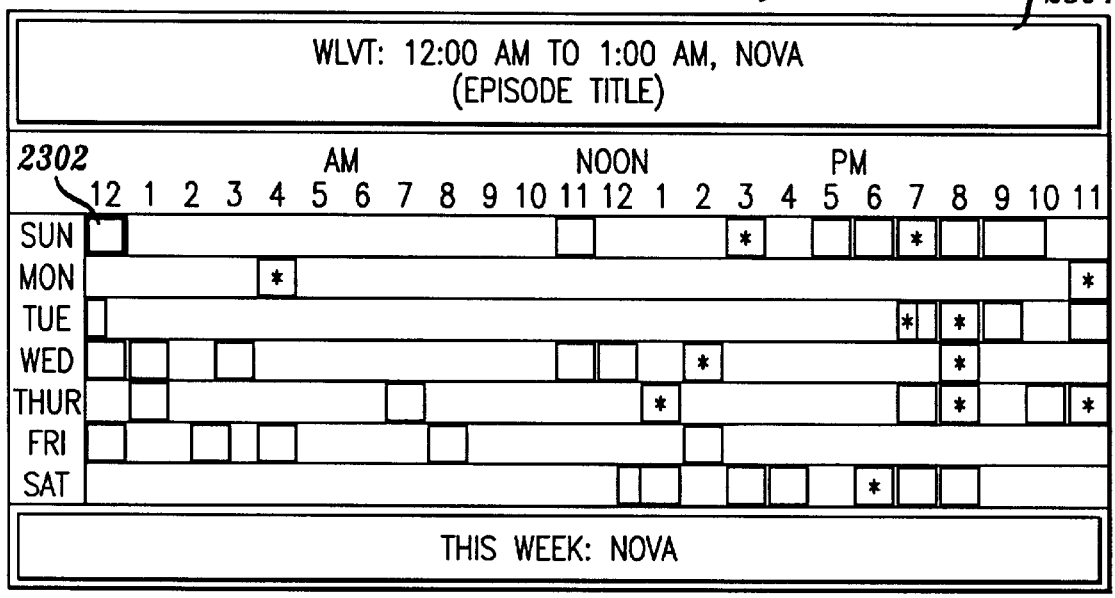
FIG. 23 is a pictorial of a two dimensional interactive display with logical third dimensional stacks for row and column intersections having multiple entries therein.

FIG. 23 is a one week schedule that is laid out as a logical three dimensional grid. The days of the week are displayed along one side, in this case vertically along the left side, of the display 2300. Time of day is displayed along a perpendicular side, in this case horizontally across the top, for a twenty-four hour period. Thus, if an episode of Nova is scheduled at 8:00 p.m. on Sunday, a box of contrasting shade will be located in the intersection of the Sunday row and in the 8:00 p.m. column. The active area 2302 can be moved horizontally by arrows 56, 58 and vertically by arrows 52, 54 of keypad 50. If there are multiple occurrences of Nova on a particular night at a particular time, that fact is shown by a box, located at the intersection of the row of that day and the column of that time, having an asterisk (*) located in the box. The asterisk (*) indicates the presence of a logical stack of multiple programs of Nova appearing on competing channels, such as occurs on Wednesday night at 8:00 p.m. To move or navigate through a stack of programs (or stack of episodes of programs with the same name, for example) on a particular day at a particular time slot, the viewer uses the double up arrows button 60 and the double down arrows button 62 for this third degree of freedom. Because the display 2300 may require greater visual discrimination than program title as a matter of course, the frame information window 1904 is larger than usual for display 2300. Further, frame 2304 is annotated with arrows indicating the existence of program episodes above or below the active areas' position in the stack. If the cable 16 has access to 300 plus 'channels' of programming, it is conceivable that some programs, such as Nova will be offered by more than one channel at the same time. As described previously, once the viewer has moved the active area to a particular entry in two or three dimensions and actuates the select (✓) button 64, a selection is made. In this case, the selection sets an alarm to record a specific channel at a specific time at some day in the near future.

Referring back to FIGS. 1 and 2, overall operation of the apparatus of the invention is described. Program schedule data is supplied via the cable 16. The program schedule data is either transmitted periodically and the STB 12 receives this program schedule data and stores it in RAM 40. Alternatively, all or part of the program schedule data could be dynamically requested and received by STB 12, which stores it in RAM 40. Program data such as this is commercially available from TVData, Inc. and other similar concerns. The data or records of the program schedule data are in a pre-arranged format, such as Microsoft Access or some other similar database format, to facilitate rapid storage, sorting and retrieval by CPU 34. Each record of a TV program has its date of appearance, its time of appearance, its title, its channel and/or network, its categorizations, and a textual or visual preview (if any). A listing of a prototype program that sorts, displays and interactively responds to a viewer's input is shown in the CPU program listing given below. This listing is in Visual Basic programming language of Microsoft Corporation.

The Visual Basic prototype program consists of a collection of forms, each form having its own set of event handlers. In this case, the only significant external events are button actuations because of the remote control interface. A frame form provides the background and information and status bars used by most of the individual displays. A rolodex form provides the menus. The other forms are mostly schedule or list displays of various kinds, including specialized varieties such as the alphanumeric selection list form.

The control part of the program begins with a procedure which loads all forms and activates the frame and rolodex, i.e. the top display, to begin. Forms hand off control by setting a return code and hiding themselves, thereby activating the form directly beneath (usually the frame). Both the frame form and the rolodex form perform different actions depending on the value of the return code. The frame form's most common action is to activate another form, and much of the control flow of the application is handled by the frame form code. The rolodex form is used to display several different menu hierarchies, most importantly view selection and filter choice.

Thus, it will now be understood that there has been disclosed a method and apparatus of finding and selecting a program to view from a large schedule of TV programs. While the invention has been particularly illustrated and described with reference to preferred embodiments thereof, it will be understood by those skilled in the art that various changes in form, details, and applications may be made therein. For example, color coding of the individual items of the reduced representations and of the various entries in the various grid displays could be used to assist the viewer in making rapid program selections. Another example is that it is easily within the capabilities of this art to modify a TV set by integrating the set top box according to the present invention into it. It is accordingly intended that the appended claims shall cover all such changes in form, details and applications which do not depart from the true spirit and scope of the invention.

Eick-Mataga-Walpole 16-1·

```
'====== COMING form code ======
'This form displays a TV schedule for several hours of one day.
'This version uses drawing methods for the program shapes
' (as opposed to creating a control shape for each program)
' and "point & shoot" or "visually closest" navigation.

Option Explicit
Dim allData(8) As snapshot  'all data within time period
Dim filterData(8) As snapshot 'a snapshot for each day in the view
Dim NDays As Integer       'number of days in display
Dim NSlots As Integer      'number of time slots in display
Dim NStation As Integer    'number of stations in display
Dim MaxStation As Integer  'total number of stations in database
Dim colorField As String   'the database field that determines item color
                           '(the field should contain an integer)
Dim inPreview As Integer   'boolean 'should the preview message show?
Const sideGap = .05    'space at beginning and end of program
Const topGAP = 4 'space btwn time label and first program shape
Dim refDate 'reference date for data time slots
Const lblHeight = 40      'height of day and time labels (in 500 scale)
Const MINProgWidth = .2    'minimum width of a program shape as fraction of slot
Dim slotsPerDay As Integer  'number of slots allowed per day
Dim currDay 'number of current day
Dim startTime 'start day and time of display Dim TSBegin As Long   'first time slot
Dim TSEnd As Long     'last time slot
Dim TScurrent As Long 'current time slot
Dim rowOffset     'distance between (tops of) rows in the schedule Sub ApplyFilter ()
'filter program data, keeping only the programs that match the query in filters(TV)
'also makes sure the number of stations is correct
'and the DB field determining the color is set
    Dim i As Integer 'counter If InStr(filters(currDomain), "Station") Then
        NStation = 10  'note: this probably should be a variable or const, not 10
        colorField = "Type"
    Else
        NStation = MaxStation
        colorField = "Category"
    End If
    For i = 1 To NDays
        allData(i).Filter = filters(currDomain)
        Set filterData(i) = allData(i).CreateSnapshot()
    Next i
End Sub Sub ChangeSel (d As String)
'Performs the navigation according to the direction parameter
    Dim current, firstMatch  'database markers
    Dim success As Integer 'boolean
    Dim s As Integer    'station
```

17

```
Eick-Mataga-Walpole 16-1

Dim e              'FinishTS (end)
Dim TS As Long     'time-slot
Dim F As snapshot
Dim aDay As Integer
Dim dist 'distance
Dim best As Long, bestMark 'as database marker 'set info about current place in database
current = filterData(currDay).Bookmark
Set F = filterData(currDay)
s = F("Station")
e = F("FinishTS")
TS = TScurrent
aDay = currDay
success = False
best = 9999

If d = "Right" Then
    'check immediate right
    F.MoveNext
    If Not F.EOF Then
        TS = F("StartTS")
        'success = same station and starts right after current program
        success = (F("Station") = s) And (TS <= e + 1)
    End If
    If Not success Then
    'check all to right for "closest"
        F.MoveFirst
        While Not F.EOF
            If F("FinishTS") > e Then
                dist = VDistHoriz(s, e, F("Station"), F("StartTS"))
                If dist <= best Then
                    'save best so far
                    best = dist
                    success = True
                    bestMark = F.Bookmark
                End If
            End If
            F.MoveNext
        Wend
        If success Then
            'move to the best one
            F.Bookmark = bestMark
            TS = F("StartTS")
        End If
    End If
ElseIf d = "Left" Then
    'check immediate left
    F.MovePrevious
    If Not F.BOF Then
        'success = same station and finishes right before current program
        success = (F("Station") = s) And (F("FinishTS") >= TS - 1)
        TS = F("StartTS")
    End If
```

Eick-Mataga-Walpole 16-1-

```
        If Not success Then
        'check all to left for "closest"
            F.MoveFirst
            While Not F.EOF
                If F("StartTS") < TScurrent Then
                    dist = VDistHoriz(F("Station"), F("FinishTS"), s, TScurrent)
                    If dist < best Then
                        'keep best so far
                        best = dist
                        success = True
                        bestMark = F.Bookmark
                    End If
                End If
                F.MoveNext
            Wend
            If success Then
                'move to best one
                F.Bookmark = bestMark
                TS = F("StartTS")
            End If
        End If
    ElseIf d = "Down" Then
        'check all programs below current one, keeping "closest"
        While Not F.EOF
            If F("Station") > s Then
                dist = VDistVert(s, TScurrent, e, F("Station"), F("StartTS"),
F("FinishTS"))
                If dist < best Then
                    best = dist
                    success = True
                    bestMark = F.Bookmark
                End If
            End If
            F.MoveNext
        Wend
        If success Then
            F.Bookmark = bestMark
            TS = F("StartTS")
        End If
    ElseIf d = "Up" Then
        'check all programs above current one, keeping "closest"
        While Not F.BOF
            If F("Station") < s Then
                dist = VDistVert(s, TScurrent, e, F("Station"), F("StartTS"),
F("FinishTS"))
                If dist < best Then
                    best = dist
                    success = True
                    bestMark = F.Bookmark
                End If
            End If
            F.MovePrevious
        Wend
        If success Then
```

Eick-Mataga-Walpole 16-1-1

```
            F.Bookmark = bestMark
            TS = F("StartTS")
        End If
    End If If success Then
        'update variables and display
        TScurrent = TS
        currDay = aDay
        DisplayProg
    Else
        'restore old position in databasse
        filterData(currDay).Bookmark = current
    End If
End Sub Sub DisplayProg ()
'set current program info in info box
'highlight the appropriate program shape in the display
    Dim F As snapshot
    Dim msg As String Set F = filterData(currDay)

'set highlight
    shpProg(0).Visible = False
    selector.Visible = False
    Position shpProg(0), F("Start"), F("Finish"), F("Station")
    CPlace 0, selector, shpProg(0)
    shpProg(0).Visible = True
    selector.Visible = True 'message for info box
    msg = StationString(F("Station")) & " - " & F("Title") & " "
    msg = msg & Format(F("Start"), "h:mm AM/PM")
    msg = msg & " to " & Format(F("Finish"), "h:mm AM/PM")
    SetInfo msg, Color(F(colorField) Mod 9)
End Sub Sub DoPreview ()
'Construct an appropriate preview message and display it
    Dim msg As String msg = "Station: " & StationString(filterData(currDay)("Station"))
    msg = msg & Chr(13) & "Title: " & filterData(currDay)("Title") & Chr(13)
    msg = msg & CategoryString((filterData(currDay)("Type")),
(filterData(currDay)("Category")))
    msg = msg & Chr(13) & "Time: " & Format(filterData(currDay)("Start"), "mmm d,yy
h:mm AM/PM")
    msg = msg & Chr(13) & "    to " & Format(filterData(currDay)("Finish"), "h:mm
AM/PM")

'show popup with preview message
    popup.Caption = msg
```

Eick-Mataga-Walpole 16-1-

```
        popup.Top = lblTime(1).Top + 2 * lblTime(1).Height
        popup.Left = 2
        popup.Width = slotsPerDay - 3
        popup.Visible = True
        inPreview = True
End Sub Sub DoSelect ()
'set selection info and go to TV
        userStation = filterData(currDay)("Station")
        userStart = filterData(currDay)("Start")
        returnCode = TOTV
        Me.Hide
End Sub Sub DrawProg (colorIndex, start, finish, station)
'use drawing methods to draw a program shape
'note: form.AutoRedraw should be set to true so the drawings are persistant
        Dim L, R, t, B    'left, right, top, bottom
        Dim dayStart
        Dim edge 'convert a day/time to position in NSlot scale
        dayStart = startTime + currDay - 1
        L = (start - dayStart) * 48
        R = (finish - dayStart) * 48
        'clip shapes off at day boundaries
        If L < 0 Then L = 0
        If R > slotsPerDay Then R = slotsPerDay
        'place in correct day, with small gap between programs
        edge = (currDay - 1) * slotsPerDay
        L = L + edge + sideGap
        R = R + edge - sideGap
        'correct for min width to make sure program will show up
        If R - L < MINProgWidth Then R = L + MINProgWidth
        'set top according to station
        'note: this trick will not work if "favorite stations" are not numbered 1..n
        rowOffset = ((500 - 2 * lblHeight - shpProg(0).Height) / NStation)
        t = shpSlot(0).Top + topGAP + (station - 1) * rowOffset
        B = t + shpProg(0).Height
        'draw the box with the correct color
        drawwidth = 1
        Me.FillStyle = 0 'solid
        Me.FillColor = Color(colorIndex Mod 9)
        Line (L, t)-Step(R - L, B - t), , B    'the line command with argument B draws a
box
End Sub Sub Form_Activate ()
'make necessary changes to display, reset info and status bars
        Dim i As Integer 'counter
        Static saveFilter As String If saveFilter = filters(currDomain) Then sameFilter = True
```

Eick-Mataga-Walpole 16-1-

```
    saveFilter = filters(currDomain)
    SetStatus "TV Coming Up: " & currFilter(TV), greyCOLOR
    If newUser Then
        popup.Caption = "Press 'category' to change the kind of programs diplayed."
        popup.Visible = True
        newUser = False
    End If 'if not same filter, redo display
    If Not sameFilter Then
        SetInfo "Loading program information...", GREY
        shpProg(0).Visible = False
        selector.Visible = False
        ApplyFilter
        MakeDisplay
    End If 'in every case
    DisplayProg
    If inPreview Then DoPreview
End Sub Sub Form_KeyDown (KeyCode As Integer, Shift As Integer)
    Select Case KeyCode
    Case Asc("Q")
        End
    Case B_BACK
        returnCode = BACK
        Me.Hide
    Case B_HELP
        InvokeHelp
    Case B_PREVIEW
        If inPreview Then
            popup.Visible = False
            inPreview = False
        Else
            inPreview = True
        End If
    Case B_RIGHT
        If Not filterData(currDay).EOF Then ChangeSel ("Right")
    Case B_LEFT
        If Not filterData(currDay).EOF Then ChangeSel ("Left")
    Case B_UP
        If Not filterData(currDay).EOF Then ChangeSel ("Up")
    Case B_DOWN
        If Not filterData(currDay).EOF Then ChangeSel ("Down")
    Case B_SELECT
        If Not filterData(currDay).EOF Then DoSelect
    Case B_PAGEDOWN
    Case B_PAGEUP
    Case B_FILTER
        returnCode = Filter
        Me.Hide
    Case B_0
```

Eick-Mataga-Walpole 16-1-

```
        returnCode = SHORTCUT
        Me.Hide
    End Select

'in any case
    If inPreview Then
        DoPreview
    Else
        popup.Visible = False
    End If
End Sub Sub Form_Load ()
    Dim i As Integer
    Dim t 'as time 'set form colors and fonts
    Me.BackColor = formCOLOR
    shpProg(0).BackColor = BorderColor
    lblDay(0).BackColor = backgroundCOLOR
    lblAM.BackColor = backgroundCOLOR
    lblPM.BackColor = backgroundCOLOR
    selector.BorderColor = BorderColor
    dayLine(0).BorderColor = divideColor
    lblTime(0).ForeColor = slotCOLOR
    shpSlot(0).BorderColor = slotCOLOR
    If displayMode = "TV" Then
        lblDay(0).FontSize = smallFONT
        lblTime(0).FontSize = smallFONT
        lblAM.FontSize = smallFONT
        lblPM.FontSize = smallFONT
        popup.FontSize = mediumFONT
    Else
        lblDay(0).FontSize = largeFONT
        lblTime(0).FontSize = largeFONT
        lblAM.FontSize = largeFONT
        lblPM.FontSize = largeFONT
        popup.FontSize = largeFONT
    End If
    'set scale and size objects
    SizeAForm Me, DispTop, DispHeight, DispLeft, DispWidth
    Me.Scale (0, 0)-(500, 500)
    SizeAControl lblDay(0), 0, lblHeight, 0, 500
    'note: the AM/PM labels would be placed when time is filtered
    SizeAControl lblPM, 0, lblHeight, 0, 30
    SizeAControl lblAM, 0, lblHeight, 500 - 30, 30
    SizeAControl lblTime(0), lblHeight, lblHeight, 0, 50
    SizeAControl shpSlot(0), 2 * lblHeight + .5 * topGAP, 500 - 2 * lblHeight, 0, 50
    SizeAControl popup, 250, 200, 250, 200
    selector.BorderWidth = 1
    dayLine(0).Y1 = 0
    dayLine(0).Y2 = 500
    'initialize variables
```

Eick-Mataga-Walpole 16-1-1

```
    startTime = fakeToday + fakeTime 'this would be set at activate to current half hour
    NDays = 1
    slotsPerDay = 24
    NSlots = NDays * slotsPerDay
    sameFilter = False
    sameView = False
    inPreview = False
    'set form scale and place permantent stuff (day and time labels)
    Me.ScaleWidth = NSlots
    Load lblDay(1)
    SizeAControl lblDay(1), 0, lblHeight, 0, slotsPerDay
    lblDay(1).Caption = DayString(startTime, "long")
    lblDay(1).Visible = True
    lblTime(0).Width = 1
    For i = 1 To slotsPerDay
        Load lblTime(i)
        lblTime(i).Move i - 1
        t = DateAdd("n", 30 * (i - 1), startTime) 'add 30 minute increments
        lblTime(i).Caption = TimeLabel(t)
        lblTime(i).Visible = True
        lblTime(i).ZOrder
    Next i InputData
    Form_Activate
    sameView = True
End Sub Sub InputData ()
'part of form_load
'opens the database and creates allData snapshots Dim DB As database
    Dim RefSnap As snapshot Set DB = OpenDatabase(TVDB)

'get reference date and number of stations
    Set RefSnap = DB.CreateSnapshot("Reference")
    RefSnap.FindFirst "Name = 'Date'"
    refDate = DateValue(RefSnap("Data"))
    RefSnap.FindFirst "Name = 'NStations'"
    MaxStation = Val(RefSnap("Data"))

Set allData(0) = DB.CreateSnapshot("Programs")
    'assumes data already sorted

'filter for particular time period, would happen at each half-hour change
    TSBegin = Abs(DateDiff("n", startTime, refDate) \ 30)
    TSEnd = TSBegin + slotsPerDay - 1  'check that slotsPerDay is set
    allData(0).Filter = Overlap(TSBegin, TSEnd)
    Set allData(1) = allData(0).CreateSnapshot()
    Set allData(0) = Nothing 'won't be needing everything
```

Eick-Mataga-Walpole 16-

```
End Sub

Sub MakeDisplay ()
'create the display of programs from the data
    Dim i As Integer 'counter
    Dim d As Integer 'day
    Dim F As snapshot    'convenience If Not sameView Then
        'would need to reset captions for times and day
    End If 'place program shapes
    Cls 'clear the form of previous drawings
    DoEvents 'make it so
    For d = 1 To NDays
        currDay = d
        'draw lines to separate time slots
        For i = 0 To slotsPerDay
            drawwidth = 4
            Line (i, shpSlot(0).Top)-(i, 500), slotCOLOR
        Next i
        'draw program shape for each program in data
        Set F = filterData(d)
        If Not F.EOF Then
            F.MoveFirst
            Do While Not F.EOF
                DrawProg F(colorField), F("Start"), F("Finish"), F("Station")
                F.MoveNext
            Loop
            F.MoveFirst
        End If
    Next d 'initialize stuff
    TScurrent = TSBegin
    currDay = 1
    shpProg(0).ZOrder
    selector.ZOrder
    Set F = filterData(currDay)
    'find a program to start on
    Do While TScurrent <= TSEnd
        F.FindFirst Overlap(TScurrent, TScurrent)
        If Not F.NoMatch Then
            DisplayProg
            Exit Do
        End If
        TScurrent = TScurrent + 1
    Loop
    'make sure TScurrent is in range
    If TScurrent > TSEnd Then TScurrent = TSBegin
End Sub Sub Position (shape As Control, start, finish, station)
```

Eick-Mataga-Walpole 16-...

```
'position a program shape control
    Dim relativeL, relativeW, dayStart
    Dim edge
    'convert a day/time to position in NSlot scale
    dayStart = startTime + currDay - 1
    relativeL = (start - dayStart) * 48
    relativeW = (finish - dayStart) * 48 - relativeL
    'clip shapes off at day boundaries
    If relativeL < 0 Then
        relativeW = relativeW + relativeL
        relativeL = 0
    End If
    If relativeW + relativeL > slotsPerDay Then relativeW = slotsPerDay - relativeL
    'set left and width of shape. leaving small gap between programs
    edge = (currDay - 1) * slotsPerDay
    shape.Left = relativeL + edge + sideGap
    shape.Width = relativeW - 2 * sideGap
    'set minimum width so program is visible
    If shape.Width < MINProgWidth Then shape.Width = MINProgWidth
    'set top according to station
    'note: this will not work if "favorite" stations are not numbered 1..n
    rowOffset = ((500 - 2 * lblHeight - shpProg(0).Height) / NStation)
    shape.Top = shpSlot(0).Top + topGAP + (station - 1) * rowOffset
End Sub Function VDistHoriz (station1, finish, station2, start)
'computes a value for the "visual" left-right distance between two programs
'requires that the earlier program come first
'note: needs refinement, does not work satisfactorily, especially with crowded
displays
    Dim deltaR, deltaT 'change in row and time
    Dim row1, row2 row1 = station1
    row2 = station2
    'note: row calculations could be more complicated if stations not numbered 1..n
    deltaR = Abs(row1 - row2) * (100 / NStation)
    deltaT = (start - finish) * (100 / slotsPerDay)
    'penalize programs that are more up&down than to side
    If deltaT <= 1 Then deltaT = (finish + 3 - start) * (100 / slotsPerDay)
    If deltaT < 1 Then deltaT = 100 / slotsPerDay'don't allow zero
    VDistHoriz = deltaR + deltaT
End Function Function VDistVert (station1, start1, finish1, station2, start2, finish2)
'computes a value for the "visual" up-down distance between two programs
'note: needs refinement
    Dim deltaR, deltaT 'change in row and time
    Dim row1, row2 row1 = station1
    row2 = station2
    'note: row calculations could be more complicated if stations not numbered 1..n
    deltaR = Abs(row1 - row2) / NStation
```

Eick-Mataga-Walpole 16-1-1

```
    If start1 > finish2 Then
        deltaT = Abs(start1 - finish2)
    ElseIf start2 > finish1 Then
        deltaT = Abs(start2 - finish1)
    Else
        deltaT = 0
    End If
    VDistVert = deltaR + 2 * deltaT
End Function '====== FRAME form code ======
'This form owns the standard info and status bars and allows
' transfer of control from form to form.
Option Explicit Sub Form_Activate ()
'decides which other form should show in its display area
    Select Case returnCode
    Case SHOWVIEW
        views(currDomain).Show
    Case PICK
        frmSelect.Show
    Case TOTV
        frmTV.Show
    Case LASTVIEW
        sameFilter = True
        views(currDomain).Show
    Case STARTUP
        'do nothing--don't want rolodex to show yet
    Case Else
        frmDex.Show
    End Select
End Sub Sub Form_KeyDown (KeyCode As Integer, Shift As Integer)
    If KeyCode = Asc("Q") Then
        End
    End If
End Sub Sub Form_Load ()
    'set colors and fonts
    Me.BackColor = formCOLOR
    sspInfo.FontSize = mediumFONT
    sspStatus.FontSize = mediumFONT
    'use builtin object to size background
    ScrWidth = Screen.Width
    ScrHeight = Screen.Height
    If displayMode = "mini" Then
        'for taking screen prints
        ScrHeight = ScrHeight * .54
        ScrWidth = ScrWidth * .712
        displayMode = "TV"
    Else
```

Eick-Mataga-Walpole 16-1

```
        'resize to fit TV
        ScrHeight = ScrHeight * .83
    End If
    'set form to fill screen
    frmFrame.Top = 0
    frmFrame.Height = ScrHeight
    frmFrame.Left = 0
    frmFrame.Width = ScrWidth
    'info line at top of screen
    sspInfo.Visible = True
    'status line at bottom of screen
    sspStatus.Visible = True
    'define available display area
    DispTop = sspInfo.Height + 1.5
    DispHeight = frmFrame.Height - (sspStatus.Height + 1.5) - DispTop
    DispLeft = 0
    DispWidth = frmFrame.Width
End Sub Sub SetupStatus ()
End Sub '====== LIST form code ======
'This code is used for all three list forms (TV, Movies, Shopping)
Option Explicit
Dim DB As database 'full database with indexes Dim BlinkControl As Control 'set to blinking object (currently none)
Dim itemSelected As Integer 'from 1 to MAXDISPLAY
Dim locSelected As Integer 'from 1 to MAXLOC
Dim inPreview As Integer 'boolean
Dim captionField As String 'the database field that is used for display
Dim startTime 'the start time for the TV list
Dim TS As Long   'the time slot for the TV list
Dim rowOffset 'difference between tops of two consecutive reduced items
Dim browsing As String 'type of current shopping list
Dim colorField As String 'field which determines color (should be of type integer)

'display parameters
Const MAXDISPLAY = 6 'Number of items in close up
Dim MAXITEM As Integer 'Number of items in whole list
Dim MAXLOC As Integer 'Number of locator positions
Dim whichrItem(MAXDISPLAY) As Integer   'which rItems are in the current display 'define sizes of locator and selector
Const GAP = 10 'space around lists
Const EXTRA = 70 'room for longer programs
Const reducedEXTRA = 20 'room for longer programs in reduced rep
Const T = 50         'reduced list
Const H = 1000 - 2 * T
Const locL = 30        'display area
Const locW = 100
Const dispL = locW + 2 * locL
Const dispW = 1000 - dispL - locL
```

28

Eick-Mataga-Walpole 16-

```
'database snapshots
Dim allData   As snapshot
Dim itemData As snapshot
Dim storeData As snapshot
Dim deptData As snapshot
Dim stuffData As snapshot
Dim filterData As snapshot
Dim marker(1000) As String 'bookmarks of each MAXDISPLAY items
Dim locStart(1000) 'rItem index for start of locator Sub ApplyFilter ()
'filter the data according to user choice
    Dim sortString As String If Me Is TVlist Then
        captionField = "Title"
        sortString = ""
        colorField = "Type"
    ElseIf Me Is MOVlist Then
        If sameView Then
            'keep allData as it is
        Else
            'reset allData to all movies
            LoadData
            allData.Filter = viewFilter
            Set allData = allData.CreateSnapshot()
        End If
        captionField = "Title"
        sortString = "Title"
        colorField = "Type"
    ElseIf Me Is SHOPlist Then
        'note: This would all be done totally differently. Don't bother
        '      understanding it, just rewrite it.
        Select Case filters(currDomain)
        Case "store"
            browsing = "store"
            Set allData = storeData
            captionField = "name"
            filters(currDomain) = ""
            sortString = "name"
            colorField = ""
        Case "dept"
            browsing = "dept"
            deptData.FindFirst "name = '" & userString & "'"
            userString = "" 'fix--this is cheating, I shouldn't use userString
            If deptData.NoMatch Then
                Set allData = deptData
                filters(currDomain) = ""
            Else
                browsing = "stuff"
                filters(currDomain) = "[dept code] = " & deptData("code")
                Set allData = stuffData
            End If
```

Eick-Mataga-Walpole 16-1-1

```
            captionField = "name"
            sortString = "name"
            colorField = ""
        Case "item"
            browsing = "item"
            Set allData = itemData
            captionField = "name"
            colorField = ""
            filters(currDomain) = "name like '" & userString & "*'"
            sortString = "name"
        Case Else
            browsing = "stuff"
            captionField = "name"
            sortString = "name"
            colorField = "[item code]"
            Set allData = stuffData
        End Select
    End If allData.Filter = filters(currDomain)
    If filters(currDomain) = "" Then
        allData.FindFirst "Not " & captionField & " = ''"
    Else
        allData.FindFirst allData.Filter
    End If
    If allData.NoMatch Then
        MAXITEM = 0
    Else
        MAXITEM = 1 'temporary setting just to make sure it isn't 0
        Set filterData = allData.CreateSnapshot()
        filterData.Sort = sortString
        Set filterData = filterData.CreateSnapshot()
    End If
End Sub Sub BlinkStart (C As Control, vis)
    Set BlinkControl = C
    BlinkControl.Visible = vis
    tmrBlink.Enabled = True
End Sub Sub BlinkStop (vis)
    tmrBlink.Enabled = False
    If BlinkControl Is Nothing Then
        'do nothing
    Else
        BlinkControl.Visible = True
    End If
    Set BlinkControl = Nothing
End Sub Sub ChangeLoc (direct As String)
'page up or down with the locator
    Select Case direct
```

Eick-Mataga-Walpole 16-1 .

```
    Case "Up"
        If locSelected > 1 Then
            locSelected = locSelected - 1
            RedoDisplay
        End If
    Case "Down"
        If locSelected < MAXLOC Then
            locSelected = locSelected + 1
            RedoDisplay
        End If
    End Select
End Sub Sub ChangeSel (direct As String)
'navigate up or down one selection
    Select Case direct
    Case "Up"
        If itemSelected > 1 Then
            'move up within current display
            itemSelected = itemSelected - 1
            selector.Top = itemBox(itemSelected).Top - GAP
            rItem(0).Top = rItem(whichrItem(itemSelected)).Top
            rItem(0).Left = locL - GAP
            rItem(0).Width = locW + 2 * GAP
            SetItemInfo
        ElseIf locSelected > 1 Then
            'display previous section of list
            itemSelected = MAXDISPLAY
            locSelected = locSelected - 1
            RedoDisplay
        End If
    Case "Down"
        If itemSelected < MAXDISPLAY Then
            'move down within current display
            'do not move to select an empty item
            If (locSelected - 1) * MAXDISPLAY + itemSelected < MAXITEM Then
                itemSelected = itemSelected + 1
                selector.Top = itemBox(itemSelected).Top - GAP
                rItem(0).Top = rItem(whichrItem(itemSelected)).Top
                rItem(0).Left = locL - GAP
                rItem(0).Width = locW + 2 * GAP
                SetItemInfo
            End If
        ElseIf locSelected < MAXLOC Then
            'display next section of list
            itemSelected = 1
            locSelected = locSelected + 1
            RedoDisplay
        End If
    End Select
    rItem(0).Visible = True
End Sub Sub DoPreview ()
```

31

Eick-Mataga-Walpole 16-1-1

```
'show preview window and preview locator
    Dim i As Integer 'counter inPreview = True 'hide other stuff
    locator.Visible = False
    selector.Visible = False
    For i = 1 To MAXDISPLAY
        itemBox(i).Visible = False
        leftArrow(i).Visible = False
        rightArrow(i).Visible = False
    Next i previewWin.Caption = "Getting preview..."
    previewWin.ZOrder
    previewWin.Visible = True ShowPreview
End Sub Sub DoSelect ()
'act on the current selected item If Me Is TVlist Then
        'set selection data and go to TV
        userStation = filterData("Station")
        userStart = filterData("Start")
        returnCode = TOTV
        Me.Hide
    ElseIf Me Is MOVlist Then
        'display "order movie" message
        sameFilter = True
        TellUser "You would be asked to confirm your order of " &
filterData("Title")
    ElseIf Me Is SHOPlist Then
        Select Case browsing
        Case "stuff"
            sameFilter = True
            TellUser "You would be asked to confirm your order of " &
filterData("name")
        Case "store"
            filters(currDomain) = "[store code] = " & filterData("code")
            Form_Activate
        Case "item"
            filters(currDomain) = "[item code] = " & filterData("code")
            Form_Activate
        Case "dept"
            filters(currDomain) = "[dept code] = " & filterData("code")
            Form_Activate
        End Select
    End If
End Sub
```

Eick-Mataga-Walpole 16-1-1

```
Sub EndPreview ()
'go back to regular list operation
    Dim i As Integer 'counter previewWin.Visible = False
    inPreview = False
    locator.Visible = True
    selector.Visible = True
    previewWin.Top = displayList.Top
    RedoDisplay
End Sub Sub Form_Activate ()
    Dim i As Integer 'counter
    Dim section As Integer 'count the number of locator locations
    Dim NVisible As Integer 'tally the visible shapes in a section
    Dim msg As String
    Static saveFilter As String
    Static saveView As String 'check new filters against current filters
    If Not sameView Then sameView = (saveView = viewFilter)
    saveView = viewFilter
    If Not sameFilter Then sameFilter = (saveFilter = filters(currDomain))
    saveFilter = filters(currDomain)

SetStatus currView(currDomain) & currFilter(currDomain), greyCOLOR

If sameFilter And sameView Then
        'keep everything the same as last time
        If newUser And Not Me Is SHOPlist Then
            popup.Caption = "To change the category shown, press the 'Category' button."
            popup.Visible = True
            newUser = False
        End If
        RedoDisplay
    Else
        'clean up display
        SetInfo "Selecting data, please wait...", GREY
        If MAXITEM = 0 Then
            previewWin.Caption = ""
            previewWin.Visible = False
        End If
        DoEvents
        If inPreview Then EndPreview For i = 1 To MAXDISPLAY
            itemBox(i).Caption = ""
        Next i For i = 1 To MAXITEM
            Unload rItem(i)
        Next i
```

Eick-Mataga-Walpole 16-1-1

```
        'filter new data
        ApplyFilter
        If MAXITEM = 0 Then
            'give "no matches" msg
            locator.Visible = False
            rItem(0).Visible = False
            For i = 1 To MAXDISPLAY
                MAXITEM = 0
                itemBox(i).Visible = False
                leftArrow(i).Visible = False
                rightArrow(i).Visible = False
            Next i
            previewWin.Caption = "No matches were found" & Chr(13)
            previewWin.Caption = previewWin.Caption & "Press 'Category' to change
the selection."
            previewWin.ZOrder
            previewWin.Visible = True
            itemSelected = 0
            locSelected = 0
        Else
            'redo list display
            filterData.MoveLast
            MAXITEM = filterData.RecordCount
            'set distance between items
            rowOffset = (H - rItem(0).Height) / MAXITEM
            If rowOffset > rItem(0).Height + GAP Then rowOffset = rItem(0).Height +
GAP 'max distance
            rItem(0).Visible = False
            rItem(0).Top = T
            rItem(0).Left = locL + reducedEXTRA
            rItem(0).Width = locW - 2 * reducedEXTRA
            rItem(0).BackColor = itemCOLOR
            filterData.MoveFirst
            'size and place the item shapes
            'and set section bookmarks
            section = 0       'number of locator locations
            NVisible = MAXDISPLAY 'so first section will be marked correctly
            For i = 1 To MAXITEM
                Load rItem(i)
                If colorField <> "" Then
                    rItem(i).BackColor = Color(Val(filterData(colorField)) Mod 9)
                End If
                NVisible = NVisible + 1
                rItem(i).Top = T + (i - 1) * rowOffset
                If NVisible > MAXDISPLAY Then
                'begin a new locator location
                    section = section + 1
                    locStart(section) = i
                    marker(section) = filterData.Bookmark
                    NVisible = 1
                End If
                If Me Is TVlist Then
                    'set length of reduced item
```

34

Eick-Mataga-Walpole 16-1-1

```
                    If filterData("StartTS") < TS Then
                        rItem(i).Left = rItem(i).Left - reducedEXTRA
                        rItem(i).Width = rItem(i).Width + reducedEXTRA
                    End If
                    If filterData("FinishTS") > TS Then
                        rItem(i).Width = rItem(i).Width + reducedEXTRA
                    End If
                End If
                rItem(i).ZOrder
                rItem(i).Visible = True
                filterData.MoveNext
            Next i
            MAXLOC = section
            locStart(section + 1) = MAXITEM + 1

'set length of minselector (use rItem(0))
            rItem(0).Left = locL - GAP
            rItem(0).Width = locW + 2 * GAP 'initialize selector and locator
            itemSelected = 1
            locSelected = 1
            locator.Visible = True
            rItem(0).BackColor = highlightCOLOR
            'set the captions in the itemBoxes
            RedoDisplay
        End If
    End If
End Sub Sub Form_KeyDown (KeyCode As Integer, Shift As Integer)
    popup.Visible = False
    Select Case KeyCode
    Case Asc("Q")
        End
    Case B_BACK
        If Me Is SHOPlist And browsing = "item" Then
            'not exactly what we want
            returnCode = ALPHA
            Me.Hide
        Else
            returnCode = BACK
            Me.Hide
        End If
    Case B_HELP
        InvokeHelp
    Case B_PREVIEW
        If inPreview Then
            EndPreview
        Else
            DoPreview
        End If
    Case B_SELECT
        If MAXITEM > 0 Then DoSelect
```

35

Eick-Mataga-Walpole 16-1-1

```
    Case B_UP
        If MAXITEM > 0 Then ChangeSel ("Up")
    Case B_DOWN
        If MAXITEM > 0 Then ChangeSel ("Down")
    Case B_RIGHT
        If Me Is TVlist Then
            returnCode = COMING
            Me.Hide
        End If
    Case B_LEFT
    Case B_PAGEUP
        If inPreview Then
            'scroll preview
            If previewWin.Top < displayList.Top Then
                'move preview window down a screen
                previewWin.Top = previewWin.Top + displayList.Height
            End If
        Else
            If MAXITEM > 0 Then ChangeLoc ("Up")
        End If
    Case B_PAGEDOWN
        If inPreview Then
            'scroll preview
            If previewWin.Top + previewWin.Height > displayList.Top +
displayList.Height Then
                'move preview window up a screen
                previewWin.Top = previewWin.Top - displayList.Height
            End If
        Else
            If MAXITEM > 0 Then ChangeLoc ("Down")
        End If
    Case B_FILTER
        If Not Me Is SHOPlist Then
            returnCode = Filter
            Me.Hide
        End If
    Case B_0
        returnCode = SHORTCUT
        Me.Hide
    End Select
End Sub Sub Form_Load ()
    Dim i As Integer 'counter
    Dim itemRoom 'set colors and fonts
    itemBox(0).FontSize = largeFONT
    leftArrow(0).FontSize = largeFONT
    rightArrow(0).FontSize = largeFONT
    If displayMode = "PC" Then
        popup.FontSize = largeFONT
        previewWin.FontSize = largeFONT
    Else
```

Eick-Mataga-Walpole 16-1-1

```
    previewWin.FontSize = mediumFONT
    popup.FontSize = smallFONT
End If
rItem(0).BackColor = itemCOLOR
selector.FillColor = highlightCOLOR
displayList.FillColor = backgroundCOLOR
previewWin.BackColor = backgroundCOLOR
locator.FillColor = backgroundCOLOR
itemBox(0).BackColor = itemCOLOR
leftArrow(0).BackColor = itemCOLOR
rightArrow(0).BackColor = itemCOLOR
shpSlot.BorderColor = slotCOLOR
'size the objects to the screen
SizeAForm Me, DispTop, DispHeight, DispLeft, DispWidth
Me.Scale (0, 0)-(1000, 1000)
SizeAControl locator, T - GAP, H + GAP, locL - GAP, locW + 2 * GAP
SizeAControl shpSlot, T, H, locL + reducedEXTRA, locW - 2 * reducedEXTRA
SizeAControl displayList, T - GAP, H + GAP, dispL, dispW
SizeAControl popup, dispW / 2, 4 * locW, dispW / 2, 4 * locW
CPlace 1, previewWin, displayList
locator.ZOrder
shpSlot.ZOrder
rItem(0).ZOrder
itemRoom = H / MAXDISPLAY
SizeAControl itemBox(0), T + (.5 * GAP), itemRoom - GAP, dispL + EXTRA, dispW -
2 * EXTRA
SizeAControl patch(0), 50, (6.8 * itemBox(0).Height), (12.3 * itemBox(0).Width),
(7 * itemBox(0).Height)
    If displayMode = "TV" Then
        patch(0).Left = 8.08 * itemBox(0).Width
        patch(0).Height = 3.7 * itemBox(0).Height
    End If
    SizeAControl leftArrow(0), T + (.5 * GAP), itemRoom - GAP, dispL, EXTRA
    SizeAControl rightArrow(0), T + (.5 * GAP), itemRoom - GAP, dispL + dispW -
EXTRA, EXTRA
    SizeAControl selector, T, itemRoom + GAP, dispL, dispW
    selector.ZOrder
    For i = 1 To MAXDISPLAY
        'Load itemBox(i)   'Now created at design time--fixed number (6)
        itemBox(i).Visible = False
        CCopy itemBox(0), itemBox(i)
        patch(i).Visible = False
        CPlace 0, patch(i), patch(0)
        itemBox(i).Top = itemBox(0).Top + (i - 1) * itemRoom
        Load leftArrow(i)
        leftArrow(i).Top = itemBox(i).Top
        Load rightArrow(i)
        rightArrow(i).Top = itemBox(i).Top
    Next i 'load the list data and set up the display
    sameFilter = False
    sameView = False
    LoadData
```

37

Eick-Mataga-Walpole 16-1-

```
    Form_Activate
    sameFilter = True
End Sub

Function ItemString () As String
'set msg to be used in info bar
    Dim msg As String If Me Is TVlist Then
        msg = Format(filterData("Title")) & " on "
        msg = msg & StationString(filterData("Station")) & ", "
        msg = msg & TimeString(filterData("Start")) & " to "
        msg = msg & TimeString(filterData("Finish"))
    ElseIf Me Is MOVlist Then
        msg = Format(filterData("Title"))
        msg = msg & ", " & Format(filterData("Year"))
    ElseIf Me Is SHOPlist Then
        Select Case browsing
        Case "stuff"
            msg = Format(filterData("name")) & " - $" & Format(filterData("price"))
        End Select
    End If
    ItemString = msg
End Function Sub LoadData ()
    Dim refSnap As snapshot
    Dim refDate 'load in the database as a snapshot
    If Me Is TVlist Then
        startTime = fakeToday + fakeTime
        Set DB = OpenDatabase(TVDB)
        Set refSnap = DB.CreateSnapshot("Reference")
        refSnap.FindFirst "Name = 'Date'"
        refDate = DateValue(refSnap("Data"))
        Set allData = DB.CreateSnapshot("Programs")
        'filter for time would really happen at activate
        TS = (startTime - refDate) * 48
        allData.Filter = Overlap(TS, TS)
        Set allData = allData.CreateSnapshot()
    ElseIf Me Is MOVlist Then
        Set DB = OpenDatabase(MVDB)
        Set allData = DB.CreateSnapshot("Movies")
    ElseIf Me Is SHOPlist Then
        Set DB = OpenDatabase(SPDB)
        Set itemData = DB.CreateSnapshot("Items")
        Set storeData = DB.CreateSnapshot("Stores")
        Set deptData = DB.CreateSnapshot("Departments")
        Set stuffData = DB.CreateSnapshot("Stuff")
    End If
End Sub Sub RedoDisplay ()
```

Eick-Mataga-Walpole 16-1-,

```
'set the captions in the itemBoxes to correspond to items in locator
' reposition locator and selector, update info box Dim last As Integer
    Dim i As Integer
    Dim Index As Integer  'index of rItem If MAXITEM = 0 Then Exit Sub
    'figure first item location
    filterData.Bookmark = marker(locSelected)

Index = locStart(locSelected)
    For i = 1 To MAXDISPLAY
        If filterData.EOF Then
            'hide empty itemBox
            itemBox(i).Caption = ""
            itemBox(i).Visible = False
            leftArrow(i).Visible = False
            rightArrow(i).Visible = False
        Else
            whichrItem(i) = Index   'so we can highlight the correct rItem (reduced
item)
            If colorField <> "" Then itemBox(i).BackColor =
Color(filterData(colorField) Mod 9)
            itemBox(i).Caption = filterData(captionField)
            If Not inPreview Then itemBox(i).Visible = True
            If Me Is TVlist And Not inPreview Then
                'show arrows to reflect program length
                If filterData("StartTS") < TS Then
                    leftArrow(i).BackColor = itemBox(i).BackColor
                    leftArrow(i).Visible = True
                Else
                    leftArrow(i).Visible = False
                End If
                If filterData("FinishTS") > TS Then
                    rightArrow(i).BackColor = itemBox(i).BackColor
                    rightArrow(i).Visible = True
                Else
                    rightArrow(i).Visible = False
                End If
                'show color patch for subcategory
                patch(i).FillColor = Color(filterData("Category") Mod 9)
                patch(i).Visible = True
            End If
            last = i
            Index = Index + 1
            filterData.MoveNext
        End If
    Next i 'Do not allow blank to be selected
    If itemSelected > last Then
        itemSelected = last
    End If
```

Eick-Mataga-Walpole 16-1-1

```
    'fix the rest of the display
    displayList.Height = H + 2 * GAP - (H / MAXDISPLAY * (MAXDISPLAY - last))
'display list shrinks when fewer than MAXDISPLAY items displayed
    selector.Top = itemBox(itemSelected).Top - GAP 'behind current itemBox
    locator.Top = T + rowOffset * (locStart(locSelected) - 1)
    locator.Height = last * rowOffset + rItem(0).Height - rowOffset 'height shrinks
when displayList shrinks
    rItem(0).Top = rItem(whichrItem(itemSelected)).Top
    SetItemInfo
End Sub Sub SetItemInfo ()
'display  current item's info in info bar
    Dim i As Integer '# of records away from bookmark we need to go
    Dim msg As String 'find selected record
    filterData.Bookmark = marker(locSelected)
    i = itemSelected
    While (i > 1)
        filterData.MoveNext
        i = i - 1
    Wend
    'Put info in the info bar
    SetInfo ItemString(), (itemBox(itemSelected).BackColor)
    'update preview window if needed
    If inPreview Then ShowPreview
End Sub Sub ShowPreview ()
'Display the video, still, or text preview
' of the item selected
    Dim msg As String
    If Me Is MOVlist Then
        msg = filterData("Plot")
    ElseIf Me Is TVlist Then
        msg = filterData(captionField) & Chr(13)
        msg = msg & StationString(filterData("Station")) & Chr(13)
        msg = msg & CategoryString((filterData("Type")), (filterData("Category")))
    Else
        msg = "This would be a video, still, or textual preview of '"
        msg = msg & filterData(captionField)
        msg = msg & "'"
    End If
    previewWin.Visible = False
    previewWin.Caption = msg
    CPlace 0, previewWin, displayList
    previewWin.Visible = True
End Sub Sub tmrBlink_Timer ()
    BlinkControl.Visible = Not BlinkControl.Visible
End Sub
```

40

Eick-Mataga-Walpole 16-1

```
'====== MESSAGE form code ======
'This form is used by Help and some lists to display information,
' temporarily covering up the current form.
Option Explicit Const GAP = 500

Sub Form_Activate ()
    textArea.Caption = userMsg
End Sub

Sub Form_KeyDown (KeyCode As Integer, Shift As Integer)
    Select Case KeyCode
    Case Else
        returnCode = KeyCode
        Me.Hide
    End Select
End Sub Sub Form_Load ()
    'set colors and fonts
    Me.BackColor = itemCOLOR
    textArea.BackColor = itemCOLOR
    textArea.FontSize = largeFONT
    'set sizes
    SizeAForm Me, DispTop, DispHeight, DispLeft, DispWidth
    SizeAControl textArea, GAP, DispHeight - 2 * GAP, GAP, DispWidth - 2 * GAP
    'initialize
    textArea.Caption = ""
End Sub '====== ROLODEX form code ======
'This form shows the main menu and filter menus.
'Unimplemented: Have filter button color correspond to type/category color
Option Explicit Dim BlinkControl As Control 'pointer to blinking highlight
Dim parent As Integer      'number of parent card
Dim current As Integer    'number of current card 'special cards
'note: these must be updated each time the number of filter cards in the card
datafile changes
Const filterCARD = 1    'TV filter menu
Const mfilterCARD = 68  'movie filter menu
Const homeCARD = 96     'main menu
Dim lastCard As Integer 'holds number of regular card while in filter Const MAXTITLE = 3 'WARNING: A change in MAXTITLE requires a change in code for
LoadGraphics
Const CARDSHIFT = 2.5 'for card display--amount change in card placement
Const MAXROWS = 3 'for card display--number of rows of buttons
Const MAXCOLS = 3 'for card display--number of columns of buttons on a card
```

Eick-Mataga-Walpole 16-1-

```
Const MAXCARD = 9 'max number of cards that can be displayed on screen
Const MAXITEM = 9 'max number of buttons on a card 'action codes: tell what action to take for a button choice
'actions greater than actNEXT need additional input
Const actCOMING = 2
Const actNOW = 3
Const actNEXT = 5
Const actALPHASHOP = 6
Const actFILTER = 7
Const actALPHATV = 8
Const actALPHAMOV = 9
Const actDOMAIN = 10
Const actLATER = 11
Const actWEEK = 12
Const actWKEND = 13
Const actSCHED = 14
Const shortTVVIEW = 30
Const shortMVVIEW = 31
Const shortSPVIEW = 32
Const shortTVNOW = 35
Const shortTVFAV = 36
Const shortMVFAV = 37
Const shortSPFAV = 38
Const actMOVIE = 40
Const actSTORE = 50
Const actDEPT = 52
Const actMORE = 60
Const actNONE = 65
'for development only
Const actKEYS = 71
Const actTABS = 72

Sub Animate (direct As String, cardNo As Integer)
'Animate opening another card, backing up, or selecting a button
    Dim index As Integer
    Dim depth As Integer DoEvents 'do not interrupt another animation
    depth = Cards(current).level
    Select Case direct
    Case "Back"
      If Cards(current).parent > 0 Then
          CCopy sspCard(depth), sspCont
          sspCont.Visible = True
          Zoom 10, sspCont, sspItem(Cards(current).self)
          DisplayCard (Cards(current).parent)
          sspCont.Visible = False
      End If
    Case "Next"
      index = Cards(current).selected
      If index > 0 Then
          CCopy sspItem(index), sspCont
          sspCont.Visible = True
```

Eick-Mataga-Walpole 16-1-1

```
            sspCont.BackColor = sspCard(0).BackColor
            Zoom 10, sspCont, sspCard(depth)
            DisplayCard cardNo
            sspCont.Visible = False
        End If
      Case "Select"
        index = Cards(current).selected
        If index > 0 Then
            CCopy sspItem(index), sspCont
            sspCont.Visible = True
            sspCont.BackColor = sspCard(0).BackColor
            SizeAControl sspCard(0), 0, 500, 0, 500 'size of whole  form
            Zoom 10, sspCont, sspCard(0)
        End If
     End Select
End Sub Sub BlinkStart (C As Control, vis)
'enable blinking object
    Set BlinkControl = C
    BlinkControl.Visible = vis
    tmrBlink.Enabled = True
End Sub Sub BlinkStop (vis)
'stop blinking object, leaving visiblility as vis
    tmrBlink.Enabled = False
    If BlinkControl Is Nothing Then
      'do nothing
    Else
      BlinkControl.Visible = vis
    End If
    Set BlinkControl = Nothing
End Sub Sub ButtonAction ()
'perform action associated with selected button
    Dim button As Integer
    Dim cardNo As Integer
    Dim msg As String button = Cards(current).selected 'item number of selected button on parent card
    cardNo = Cards(current).item(button) 'card number of selected button
    If button < 1 Then Exit Sub Select Case Cards(cardNo).actionCode
    Case actNONE
      'an inactive button
      SetInfo "This option is not yet available.", greyCOLOR
    Case actNEXT
      'display the next card
      Animate "Next", Cards(current).item(button)
    Case actDOMAIN
      'change current domain before going to the next card
```

43

Eick-Mataga-Walpole 16-1

```
      currDomain = Val(Cards(cardNo).actionData)
      SetStatus Cards(cardNo).name, greyCOLOR
      Animate "Next", Cards(current).item(button)
    Case actMORE
      'show more choices on same topic (currently same as actNEXT)
      Animate "Next", Cards(current).item(button)
    Case actCOMING
      'show schedule of what's coming up on TV
      Animate "Select", 0
      sameFilter = False
      Set views(currDomain) = frmComing
      returnCode = SHOWVIEW
      Me.Hide
    Case actNOW
      'show what's on TV now
      currView(currDomain) = "TV 6:30pm : " 'obviously, this would be the current
time
      Animate "Select", 0
      sameFilter = False
      sameView = True
      Set views(currDomain) = listFrm(currDomain)
      returnCode = SHOWVIEW
      Me.Hide
    Case actLATER
      'show what's on TV for a later day
      'currently non-functional
      'Animate "Select", 0
      'sameFilter = False
      'Set views(currDomain) = frmFriday
      returnCode = SHOWVIEW
      Me.Hide
    Case actWEEK
      'show TV schedule for weekdays
      Animate "Select", 0
      sameFilter = False
      Set views(currDomain) = frmWkday
      returnCode = SHOWVIEW
      Me.Hide
    Case actWKEND
      'show TV schedule for weekend
      'currently non-functional
      'Animate "Select", 0
      'sameFilter = False
      'Set views(currDomain) = frmWkend
      returnCode = SHOWVIEW
      Me.Hide
    Case actSCHED
      'show TV schedule
      'currently non-functional
      'Animate "Select", 0
      'sameFilter = False
      'Set views(currDomain) = frmSched
      returnCode = SHOWVIEW
      Me.Hide
```

44

Eick-Mataga-Walpole 16-1-1

```
Case actALPHASHOP
   'get a string from user, search for items beginning with user string
   'note: this would probably be very different
   Animate "Select", 0
   SetStatus "Shopping, " & Cards(cardNo).name, greyCOLOR
   msg = Cards(cardNo).actionData
   SetInfo msg, YELLOW
   Wait frmAlpha
   If returnCode <> BACK And userString <> "" Then
       sameFilter = False
       filters(currDomain) = "item"
       Set views(currDomain) = listFrm(currDomain)
       returnCode = SHOWVIEW
       Me.Hide
   End If
Case actALPHATV
   'allow user to select a show title
   Animate "Select", 0
   SetStatus "TV, " & Cards(cardNo).name, greyCOLOR
   returnCode = PICK
   Me.Hide
Case actALPHAMOV
   'This is not hooked up to work, but would probably be
   ' a   lot like actALPHTV
   'Animate "Select", 0
Case actFILTER
   'send a new filter to a TV view
   filters(currDomain) = Cards(cardNo).actionData
   currFilter(currDomain) = Cards(cardNo).infotext
   sameFilter = False
   sameView = True
   returnCode = SHOWVIEW
   Me.Hide
Case actMOVIE
   'show a movie list
   Animate "Select", 0
   If current > homeCARD Then
       'the view (a filter) is changing
       currView(currDomain) = Cards(cardNo).infotext
       viewFilter = Cards(cardNo).actionData
       sameView = False
       sameFilter = False
   Else
       'the category is changing
       currFilter(currDomain) = ": " & Cards(cardNo).infotext
       filters(currDomain) = Cards(cardNo).actionData
       sameView = True
       sameFilter = False
   End If
   Set views(currDomain) = listFrm(currDomain)
   returnCode = SHOWVIEW
   Me.Hide
Case actSTORE
   'show a list of stores
```

Eick-Mataga-Walpole 16-1-

```
    Animate "Select", 0
    SetInfo "Choose a store:", TURQUOISE
    SetStatus "Shopping", greyCOLOR
    sameFilter = False
    filters(currDomain) = "store"
    Set views(currDomain) = listFrm(currDomain)
    returnCode = SHOWVIEW
    Me.Hide
Case actDEPT
    'show products from a department
    Animate "Select", 0
    SetStatus "Shopping, " & Cards(cardNo).infotext, greyCOLOR
    sameFilter = False
    filters(currDomain) = "dept"
    userString = Cards(cardNo).name
    Set views(currDomain) = listFrm(currDomain)
    returnCode = SHOWVIEW
    Me.Hide
Case shortTVVIEW
    'Show last TV schedule or list
    Animate "Select", 0
    currDomain = TV
    If views(currDomain) Is Nothing Then
        Set views(currDomain) = frmComing
    End If
    sameFilter = True
    returnCode = SHOWVIEW
    Me.Hide
Case shortMVVIEW
    'Show lat movie list
    Animate "Select", 0
    currDomain = MOVIE
    If views(currDomain) Is Nothing Then
        Set views(currDomain) = listFrm(currDomain)
    End If
    sameFilter = True
    returnCode = SHOWVIEW
    Me.Hide
Case shortSPVIEW
    'Show last shopping view
    Animate "Select", 0
    currDomain = SHOP
    If views(currDomain) Is Nothing Then
        Set views(currDomain) = listFrm(currDomain)
    End If
    sameFilter = True
    returnCode = SHOWVIEW
    Me.Hide
Case shortTVNOW
    'show all TV shows on now
    currFilter(currDomain) = "All Categories"
    currView(currDomain) = "TV 6:30pm : "  'obviously, this would be the current
time
    Animate "Select", 0
```

46

Eick-Mataga-Walpole 16-1.

```
      currDomain = TV
      filters(currDomain) = ""
      sameFilter = False
      sameView = True
      Set views(currDomain) = listFrm(currDomain)
      returnCode = SHOWVIEW
      Me.Hide
    Case actKEYS
      'Only for development, wouldn't stay
      SetKeys Cards(cardNo).actionData
      SetStatus Cards(cardNo).infotext, itemCOLOR
      current = homeCARD
      DisplayCard current
    Case actTABS
      'only for development
      ToggleTabs
    Case Else
      MsgBox "Bad action code for card " & Cards(cardNo).name
      Stop
      End
    End
  End Select
End Sub Sub ChangeSel (direct As String)
'do button navigation
    Dim n As Integer
    Dim last As Integer, Sel As Integer
    n = Cards(current).NItems
    last = Cards(current).selected
    If last = 0 Then Exit Sub If direct = "Right" Then
    'move right with wrap around
      If last = n Then
          Sel = 1
      Else
          Sel = last + 1
      End If
    ElseIf direct = "Left" Then
    'move left with wrap around
      If last = 1 Then
          Sel = n
      Else
          Sel = last - 1
      End If
    ElseIf direct = "Up" Then
    'move up, no wrap around
      If last > MAXCOLS Then
          Sel = last - MAXCOLS
      Else
          Sel = last
      End If
    ElseIf direct = "Down" Then
    'move down, no wrap around
```

47

Eick-Mataga-Walpole 16-1

```
        If last <= n - MAXCOLS Then
            Sel = last + MAXCOLS
        Else
            Sel = last
        End If
    Else
      MsgBox "Bad Direction"
      End
    End If Cards(current).selected = Sel
    UpdateSel
End Sub Sub DisplayCard (index)
'takes care of displaying menu on screen
    Dim depth As Integer    'number of visible cards
    Dim i As Integer        'counter
    Dim ancestor As Integer 'card numbers current = index
    parent = Cards(current).parent
    depth = Cards(current).level 'hide cards after (in front of) current
    For i = MAXCARD To depth + 1 Step -1
      sspTitle(i).Visible = False
      sspCard(i).Visible = False
    Next i 'make sure previous tab names are correct and visible
    ancestor = current
    For i = depth - 1 To 1 Step -1
       ancestor = Cards(ancestor).parent
       sspTitle(i).Caption = Cards(ancestor).name
       sspCard(i).Visible = True
       sspTitle(i).Visible = True
    Next i 'show current card
    sspTitle(depth).Caption = Cards(current).name
    sspCard(depth).Visible = True
    sspTitle(depth).Visible = True 'show buttons on current card
    DisplayItems
End Sub Sub DisplayItems ()
'displays buttons on a card
    Dim Area As SSPanel
    Dim i As Integer
    Dim Dx, Dy, x, Y, w, h
    Dim NItems As Integer
```

48

Eick-Mataga-Walpole 16-1-1

```
    NItems = Cards(current).NItems

Set Area = sspCard(Cards(current).level)'this is a pointer, not a copy
    'calculate size of button
    Dx = Area.Width * .9 / MAXCOLS
    Dy = Area.Height * .9 / MAXROWS
    w = Dx * .9
    If w > 30 Then w = 30
    h = Dy * .9
    If h > 20 Then h = 20 sspBlinkBG.Visible = False
    sspBlinkBG.ZOrder 0    'bring to front
    'place and show each button
    For i = 1 To NItems
      sspItem(i).Width = w
      sspItem(i).Height = h
      sspItem(i).Caption = Cards(Cards(current).item(i)).name
      If Cards(Cards(current).item(i)).actionCode = actNONE Then
          'turn inactive buttons grey
          sspItem(i).BackColor = greyCOLOR
      Else
          sspItem(i).BackColor = itemCOLOR
      End If
      x = Area.Left + .05 * Area.Width + (((i - 1) Mod MAXCOLS) + .5) * Dx
      Y = Area.Top + .05 * Area.Height + (Int((i - 1) / MAXCOLS) + .5) * Dy
      CenterItem sspItem(i), x, Y
      sspItem(i).ZOrder 0
      sspItem(i).Visible = True
    Next i
    'make blinker bigger than buttons
    CPlace 2, sspBlinkBG, sspItem(1)

'hide unused buttons
    For i = NItems + 1 To MAXITEM
      sspItem(i).Visible = False
    Next i
    UpdateSel
End Sub Sub Form_Activate ()
'check for a return code from another form
    sspCont.Visible = False
    Select Case returnCode
    Case BACK
      If current < homeCARD Then current = lastCard
      SetStatus "Use arrows and select or use keypad.", greyCOLOR
      DisplayCard current
      UpdateSel
    Case SHORTCUT
      current = homeCARD
      SetStatus "Use arrows and select or use keypad.", greyCOLOR
      DisplayCard current
```

49

Eick-Mataga-Walpole 16-1-,

```
      UpdateSel
    Case FILTER
      SetStatus "Use arrows and select or use keypad.", greyCOLOR
      If current < homeCARD Then
          DisplayCard current
      Else
          lastCard = current
          Select Case currDomain
          Case TV
            DisplayCard filterCARD
          Case MOVIE
            DisplayCard mfilterCARD
          Case SHOP
            DisplayCard current
          End Select
      End If
      UpdateSel
    Case COMING
      'to get from TV list view to schedule view
      Cards(current).selected = 2
      sameFilter = False
      Set views(currDomain) = frmComing
      returnCode = SHOWVIEW
      Me.Hide
    End Select
End Sub Sub Form_KeyDown (KeyCode As Integer, Shift As Integer)
    Dim index As Integer
    Dim n As Integer Select Case KeyCode
    Case B_BACK
      'Go up in menu hierarchy
      Animate "Back", 0
    Case B_HELP
      InvokeHelp
    Case B_PREVIEW
      userStation = 1
      userStart = fakeTime
      returnCode = TOTV
      Me.Hide
    Case B_SELECT
      'Do button action
      ButtonAction
    Case B_RIGHT
      ChangeSel ("Right")
    Case B_LEFT
      ChangeSel ("Left")
    Case B_UP
      ChangeSel ("Up")
    Case B_DOWN
      ChangeSel ("Down")
    Case B_PAGEUP
```

Eick-Mataga-Walpole 16-1

```
Case B_PAGEDOWN
'use numeric key pad to choose a button directly, without navigation
Case B_1
   If Cards(current).NItems > 0 Then
       Cards(current).selected = 1
       UpdateSel
       ButtonAction
   End If
Case B_2
   If Cards(current).NItems > 1 Then
       Cards(current).selected = 2
       UpdateSel
       ButtonAction
   End If
Case B_3
   If Cards(current).NItems > 2 Then
       Cards(current).selected = 3
       UpdateSel
       ButtonAction
   End If
Case B_4
   If Cards(current).NItems > 3 Then
       Cards(current).selected = 4
       UpdateSel
       ButtonAction
   End If
Case B_5
   If Cards(current).NItems > 4 Then
       Cards(current).selected = 5
       UpdateSel
       ButtonAction
   End If
Case B_6
   If Cards(current).NItems > 5 Then
       Cards(current).selected = 6
       UpdateSel
       ButtonAction
   End If
Case B_7
   If Cards(current).NItems > 6 Then
       Cards(current).selected = 7
       UpdateSel
       ButtonAction
   End If
Case B_8
   If Cards(current).NItems > 7 Then
       Cards(current).selected = 8
       UpdateSel
       ButtonAction
   End If
Case B_9
   If Cards(current).NItems > 8 Then
       Cards(current).selected = 9
       UpdateSel
```

51

Eick-Mataga-Walpole 16-1-1

```
        ButtonAction
      End If
    Case B_0
      current = homeCARD
      DisplayCard current
    Case Asc("Q")
      End
    End Select
End Sub Sub Form_Load ()
    'set fonts and colors
    sspCard(0).BackColor = backgroundCOLOR
    sspTitle(0).BackColor = backgroundCOLOR
    sspItem(0).BackColor = itemCOLOR
    sspBlinkBG.BackColor = highlightCOLOR
    sspItem(0).FontSize = mediumFONT
    sspCard(0).FontSize = mediumFONT
    sspTitle(0).FontSize = mediumFONT
    Me.BackColor = formCOLOR
    'fit into display area
    SizeAForm Me, dispTop, dispHeight, dispLeft, dispWidth
    Me.Scale (0, 0)-(100, 100)
    'set global return code to default
    returnCode = BACK
    'read in menu hierarchy for rolodex
    PopulateCards
    'load graphical objects
    LoadGraphics
    'set current card on screen
    DisplayCard homeCARD
End Sub Sub LoadGraphics ()
    Dim i As Integer 'counter
    Dim tabHeight 'load buttons
    For i = 1 To MAXITEM
      Load sspItem(i)
    Next i 'shape prototype card
    sspCard(0).Top = sspItem(0).Height
    sspCard(0).Height = 100 - CARDSHIFT - sspCard(0).Top
    sspCard(0).Left = 2 * CARDSHIFT
    sspCard(0).Width = 100 - 4 * CARDSHIFT
    'shape prototype tab
    sspTitle(0).AutoSize = False
    sspTitle(0).Width = sspCard(0).Width / MAXTITLE + CARDSHIFT
    'load and shape cards and tabs
    For i = 1 To MAXCARD
      Load sspCard(i)
      sspCard(i).Height = sspCard(i - 1).Height - CARDSHIFT
```

52

Eick-Mataga-Walpole 16-1

```
        sspCard(i).Top = sspCard(i - 1).Top + CARDSHIFT
        sspCard(i).ZOrder
        Load sspTitle(i)
        sspTitle(i).Top = sspCard(i).Top - sspTitle(0).Height + 2
        Select Case (i Mod MAXTITLE)
        'note: these cases are not flexible for different MAXTITLE
        Case 1
            sspTitle(i).Left = sspCard(i).Left
        Case 2
            sspTitle(i).Left = sspCard(i).Left + sspCard(i).Width / 2 -
sspTitle(i).Width / 2
        Case 0
            sspTitle(i).Left = sspCard(i).Left + sspCard(i).Width - sspTitle(i).Width
        End Select
        sspTitle(i).ZOrder
    Next i
End Sub Sub PopulateCards ()
'This subroutine reads in the card data from the
'CARDFILE file defined as a constant. The cards
'will be numbered 1 to the number of lines (cards)
'in the file.  All special cards should come before
'the home card (by convention), and are named as
'constants in the declarations. Each card record
'should have a level (integer), item selected (integer),
'a name (string), an info string (string), and
'an action code (integer). If the action code is greater
'than actNEXT, one additional input (variant type) is read
'for the card.
    Dim last As Integer, parent As Integer
    Dim selected As Integer
    Dim index As Integer, itemNo As Integer
    Dim level, title, text, action
    Open CARDFILE For Input As #1

'make dummy parent for top level
    index = 0
    Cards(index).name = "root"
    Cards(index).level = 0
    Cards(index).NItems = 0
    While Not EOF(1)
      last = index
      index = index + 1
      Input #1, level, selected, title, text, action
      Cards(index).level = level
      Cards(index).selected = selected
      Cards(index).name = title
      Cards(index).infotext = text
      Cards(index).actionCode = action
      If action > actNEXT Then
          Input #1, action
          Cards(index).actionData = action
      End If
```

53

Eick-Mataga-Walpole 16-1-.

```
        Cards(index).NItems = 0   'initialize number of items
        If Cards(index).level = Cards(last).level + 1 Then
            'Child of last
            parent = last
        ElseIf Cards(index).level <= Cards(last).level Then
            'Sibling or cousin, back up to find parent
            Do While (Cards(index).level < Cards(last).level)
              'Find last sibling
              last = Cards(last).parent
            Loop
            parent = Cards(last).parent
        Else 'Skipped a level, text file is incorrect
            MsgBox "Bad level in text file."
            Stop
            End
        End If
        Cards(index).parent = parent
        'Add self to parent's list of items
        itemNo = Cards(parent).NItems + 1
        Cards(parent).NItems = itemNo
        Cards(parent).item(itemNo) = index
        Cards(index).self = itemNo
    Wend
    Cards(0).NItems = 1
    Close #1
End Sub Sub tmrBlink_Timer ()
    BlinkControl.Visible = Not BlinkControl.Visible
End Sub Sub ToggleTabs ()
'toggles offset of tab placement; development only
    Dim i As Integer
    Static offset
    If offset = 3.5 Then
      offset = 2
    Else
      offset = 3.5
    End If
    For i = 1 To 9
      sspTitle(i).Top = sspCard(i).Top - sspTitle(0).Height + offset
    Next i
End Sub Sub UpdateSel ()
'put blinking highlight in correct location, update info bar
    Dim i As Integer
    Dim x, Y
    Dim S As SSPanel
    Dim text As String
    Dim color BlinkStop False   'turn blinking off
```

54

Eick-Mataga-Walpole 16-1-,

```
    i = Cards(current).selected
    If i > 0 Then  'something is selected
      Set S = sspItem(i)   'S is pointer to button
      'find center of button
      x = S.Left + S.Width / 2
      Y = S.Top + S.Height / 2
      'put blinker behind button
      CenterItem sspBlinkBG, x, Y
      'resume blinking
      BlinkStart sspBlinkBG, True
    End If
    text = Cards(Cards(current).item(Cards(current).selected)).infotext
    color = sspItem(Cards(current).selected).BackColor
    SetInfo text, color
End Sub Sub Zoom (n As Integer, C As Control, Dest As Control)
'animates control C changing size to control Dest
    Dim i As Integer, j As Integer
    Dim dl, dw, dt, dh
    dl = (Dest.Left - C.Left) / n
    dw = (Dest.Width - C.Width) / n
    dt = (Dest.Top - C.Top) / n
    dh = (Dest.Height - C.Height) / n
    C.ZOrder
    C.AutoSize = False
    For i = 1 To n
      C.Move C.Left + dl, C.Top + dt, C.Width + dw, C.Height + dh
      C.Refresh
    Next i
End Sub '====== SELECT form code ======
'This form is another attempt at alphabetic input that allows only valid input.
' It relies on the TV titles database which has two tables. The reference table is used first
' and contains a count of all items starting with each letter of the alphabet or with a
' symbol or number.  The user is first presented with a list of possible starting letters
' (each item in the first on-screen list may have several letters in it). Once a starting
' letter is chosen, a snapshot is made of matching entries from the table of titles.
' Each list the user sees has only valid choices for the next letter, or full titles if
' a particular title is distinguished from all others by the letters chosen so far.
' The best way to understand is to see the form in action before reading the code.
'The code could easily be modified to work with other data such as lists of movies, etc.
'note: the non-proportional font used in the itemBoxes is Courier New
Option Explicit
Dim DB As database 'the full database Dim list(1000) As String 'the list of selection strings
```

Eick-Mataga-Walpole 16-1-1

```
Dim leaf(1000) As Integer 'true if nth item is a leaf, false otherwise
Dim listEnd As Integer 'number of last element in list
Dim currPrefix As String 'the letters chosen so far
Dim initialList As Integer 'boolean 'true if this list has multiple letters per item
Dim BlinkControl As Control 'not used, currently no blinking object
Dim itemSelected As Integer 'from 1 to MAXDISPLAY
Dim locSelected As Integer 'from 1 to MAXLOC
Dim rowOffset 'difference between tops of two consecutive reduced items 'database
Dim allData  As snapshot
Dim filterData As snapshot
Dim marker(100) As String 'bookmarks of each MAXDISPLAY items
Dim locStart(100) As Integer'rItem index for start of locator 'display parameters
Const MAXDISPLAY = 6   'Number of items in close up
Dim MAXITEM As Integer 'Number of items in whole list
Dim MAXLOC As Integer 'Number of locator positions
Dim whichrItem(MAXDISPLAY)  As Integer  'which rItems are in the current display
Const GAP = 10 'space around lists
Const EXTRA = 70 'room for longer programs
Const reducedEXTRA = 20 'room for longer programs in reduced rep
Const T = 50
Const H = 1000 - 2 * T
Const locL = 30      'for reduced list
Const locW = 100
Const displ = locW + 2 * locL    'for display list
Const dispW = 1000 - dispL - locL Sub BlinkStart (C As Control, vis)
    Set BlinkControl = C
    BlinkControl.Visible = vis
    tmrBlink.Enabled = True
End Sub Sub BlinkStop (vis)
    tmrBlink.Enabled = False
    If BlinkControl Is Nothing Then   'do nothing
    Else
        BlinkControl.Visible = True
    End If
    Set BlinkControl = Nothing
End Sub Sub ChangeLoc (direct As String)
'page up or down with the locator
    Select Case direct
    Case "Up"
        If locSelected > 1 Then
            locSelected = locSelected - 1
            RedoDisplay
        End If
    Case "Down"
```

Eick-Mataga-Walpole 16-1-.

```
        If locSelected < MAXLOC Then
            locSelected = locSelected + 1
            RedoDisplay
        End If
    End Select
End Sub Sub ChangeSel (direct As String)
'Perform list navigation
    Select Case direct
    Case "Up"
        If itemSelected > 1 Then
        'move up within items currently displayed
            itemSelected = itemSelected - 1
            selector.Top = itemBox(itemSelected).Top - GAP
            rItem(0).Top = locator.Top + rowOffset * (itemSelected - 1)
            SetItemInfo
        ElseIf locSelected > 1 Then
        'display previous section of the list
            itemSelected = MAXDISPLAY
            locSelected = locSelected - 1
            RedoDisplay
        End If
    Case "Down"
        If itemSelected < MAXDISPLAY Then
        'move down within items currently displayed
            'do not move to select an empty item
            If (locSelected - 1) * MAXDISPLAY + itemSelected < MAXITEM Then
                itemSelected = itemSelected + 1
                selector.Top = itemBox(itemSelected).Top - GAP
                rItem(0).Top = locator.Top + rowOffset * (itemSelected - 1)
                SetItemInfo
            End If
        ElseIf locSelected < MAXLOC Then
        'display next section of list
            itemSelected = 1
            locSelected = locSelected + 1
            RedoDisplay
        End If
    End Select
End Sub Sub DoSelect ()
'finish with leaf value or create a new list based on user's choice of prefix
    Dim index As Integer
    Dim count As Integer
    Dim i As Integer
    Dim nextChar As String
    Dim looking As Integer 'boolean
    Dim title As String index = locStart(locSelected) + itemSelected - 1  'index in list of item
selected
    If leaf(index) Then
```

57

Eick-Mataga-Walpole 16-1-.

```
    'selection made; show next view
    title = removeAmpersand(list(index))
    filterData.FindFirst "SelectTitle = """ & title & """"
    If filterData.NoMatch Then
        Do  'prompt for different title until found
            'note: this should never happen, it's only in the list if it's in the
database
            title = InputBox(title & " not found. Enter new title:", title)
            filterData.FindFirst "SelectTitle = """ & title & """"
        Loop Until Not filterData.NoMatch
    End If
    userString = filterData("FullTitle")
    Set views(TV) = frmWeek
    sameFilter = False
    returnCode = SHOWVIEW
    Me.Hide
Else
    'indicate to user that something is happening
    itemBox(itemSelected).BackColor = greyCOLOR
    SetInfo "Loading data, please wait...", greyCOLOR
    DoEvents
    i = Len(list(index))
    currPrefix = ""
    If initialList Then
        currPrefix = list(index)
    Else
        'remove underline formatting (&) from prefix
        If i > 2 Then currPrefix = Left(list(index), i - 2)
        currPrefix = currPrefix & Right(list(index), 1)
    End If
    SetStatus "TV Titles starting with " & currPrefix, greyCOLOR
    'construct new list
    If initialList Then
        'list items are special, not prefixes
        If index = 1 Then
            'Symbol or Number selected
            initialList = False
            filterData.Filter = "SelectTitle < 'A'"
            currPrefix = ""
        Else
            'a list of letters selected
            listEnd = 0
            For i = 1 To Len(currPrefix)
                'strip out the letters (ignore commas) to make a new list
                If Mid(currPrefix, i, 1) >= "A" Then
                    listEnd = listEnd + 1
                    list(listEnd) = "&" & Mid(currPrefix, i, 1)
                    leaf(i) = False
                End If
            Next i
        End If
    Else
        'refilter data to match the new prefix
        filterData.Filter = "SelectTitle like '" & currPrefix & "*'"
```

58

Eick-Mataga-Walpole 16-1-.

```
        End If

'data assumed to be already sorted
        If Not initialList Then
        'still need to create new list from data
            Set filterData = filterData.CreateSnapshot()
            filterData.MoveFirst
            listEnd = 0
            For i = Asc(" ") To Asc("Z") 'space, punctuation, and letters
            'note: should be fixed up by not trying every single one, go stright to next db item's char
                count = 0: looking = True
                While Not filterData.EOF And looking
                    nextChar = Mid(filterData("SelectTitle"), Len(currPrefix) + 1, 1)
                    If nextChar = Chr(i) Or nextChar = LCase(Chr(i)) Then
                        count = count + 1
                        filterData.MoveNext
                    Else
                        looking = False
                    End If
                Wend
                Select Case count
                Case 0   'do not add to list
                Case 1   'make a leaf entry
                    filterData.MovePrevious
                    listEnd = listEnd + 1
                    list(listEnd) = fixAmpersand((filterData("SelectTitle")))
                    leaf(listEnd) = True
                    filterData.MoveNext
                Case Else   'make a non-leaf entry
                    filterData.MovePrevious
                    listEnd = listEnd + 1
                    list(listEnd) = currPrefix & "&" & Chr(i) 'underline new char
                    'note: underlining is just one mechanism for emphasizing what is different
                    leaf(listEnd) = False
                    filterData.MoveNext
                End Select
            Next i
            If filterData.RecordCount <= MAXDISPLAY Then
                'redo the list to have just leaves in it, if they all fit in one display
                listEnd = 0
                filterData.MoveFirst
                While Not filterData.EOF
                    listEnd = listEnd + 1
                    list(listEnd) = fixAmpersand((filterData("SelectTitle")))
                    leaf(listEnd) = True
                    filterData.MoveNext
                Wend
            End If
        End If
```

59

Eick-Mataga-Walpole 16-1-

```
        'display the newly created list
        itemBox(itemSelected).BackColor = itemCOLOR 'restore itemBox color
        initialList = False
        If listEnd > 1 Then
            NewList
        Else
            'automatically select item if only one in list
            locSelected = 1
            itemSelected = 1
            DoSelect
        End If
    End If
End Sub Sub Form_Activate ()
'always begin with initial list
    LoadData
    NewList
End Sub Sub Form_KeyDown (KeyCode As Integer, Shift As Integer)
    Select Case KeyCode
    Case Asc("Q")
        End
    Case B_BACK
        'note: do we want ability to back up one level from a particular choice in
the list?
        ' Could have B_BACK go back one list then back to menu after another press.
        returnCode = BACK
        Me.Hide
    Case B_HELP
        InvokeHelp
    Case B_PREVIEW
    Case B_SELECT
        DoSelect
    Case B_UP
        ChangeSel ("Up")
    Case B_DOWN
        ChangeSel ("Down")
    Case B_RIGHT
    Case B_LEFT
    Case B_PAGEUP
        ChangeLoc ("Up")
    Case B_PAGEDOWN
        ChangeLoc ("Down")
    Case B_FILTER
    Case B_0
        returnCode = SHORTCUT
        Me.Hide
    End Select
End Sub Sub Form_Load ()
    Dim i As Integer 'counter
```

Eick-Mataga-Walpole 16-1

```
    Dim itemRoom

'set colors and fonts
    itemBox(0).FontSize = largeFONT
    rightArrow(0).FontSize = largeFONT
    rItem(0).BackColor = itemCOLOR
    selector.FillColor = highlightCOLOR
    displayList.FillColor = backgroundCOLOR
    locator.FillColor = backgroundCOLOR
    itemBox(0).BackColor = itemCOLOR
    rightArrow(0).BackColor = itemCOLOR
    shpSlot.BorderColor = slotCOLOR
    'size and place the objects to the screen
    SizeAForm Me, DispTop, DispHeight, DispLeft, DispWidth
    Me.Scale (0, 0)-(1000, 1000)
    SizeAControl locator, T - GAP, H + GAP, locL - GAP, locW + 2 * GAP
    SizeAControl shpSlot, T, H, locL + reducedEXTRA, locW - 2 * reducedEXTRA
    SizeAControl displayList, T - GAP, H + GAP, dispL, dispW
    locator.ZOrder
    shpSlot.ZOrder
    rItem(0).ZOrder
    itemRoom = H / MAXDISPLAY
    SizeAControl itemBox(0), T + (.5 * GAP), itemRoom - GAP, dispL + EXTRA, dispW -
2 * EXTRA
    SizeAControl leftArrow(0), T + (.5 * GAP), itemRoom - GAP, dispL, EXTRA
    SizeAControl rightArrow(0), T + (.5 * GAP), itemRoom - GAP, dispL + dispW -
EXTRA, EXTRA
    SizeAControl selector, T, itemRoom + GAP, dispL, dispW
    selector.ZOrder
    For i = 1 To MAXDISPLAY
        Load itemBox(i)
        itemBox(i).Visible = False
        itemBox(i).Top = itemBox(0).Top + (i - 1) * itemRoom
        Load rightArrow(i)
        rightArrow(i).Top = itemBox(i).Top
    Next i
End Sub Sub LoadData ()
    Dim refSnap As snapshot
    Const MAXTOGETHER = MAXDISPLAY 'number of letter allowed in one itemBox
    Dim together 'fill initial selection list
    listEnd = 0
    Set DB = OpenDatabase(TVTitles)
    Set allData = DB.CreateSnapshot("Titles")

'create initial list
    Set refSnap = DB.CreateSnapshot("Reference")
    refSnap.MoveFirst
    together = MAXTOGETHER 'indicate need for new item
    While Not refSnap.EOF
        Select Case refSnap("Number")
```

Eick-Mataga-Walpole 16-1-,

```
        Case 0
            'do not add to list
        Case 1
            'make a leaf entry
            listEnd = listEnd + 1
            allData.FindFirst "SelectTitle like " & refSnap("Letter") & "*"
            list(listEnd) = allData("SelectTitle")
            leaf(listEnd) = True
            together = MAXTOGETHER
        Case Else
            If refSnap("Letter") = "#" Then
                listEnd = listEnd + 1
                list(listEnd) = "Symbol or Number"
                together = MAXTOGETHER
                'note: DoSelect relies on this entry being the first list item
            Else
                If together >= MAXTOGETHER Then
                    listEnd = listEnd + 1
                    list(listEnd) = refSnap("Letter")
                    together = 1
                Else
                    list(listEnd) = list(listEnd) & ", " & refSnap("Letter")
                    together = together + 1
                End If
            End If
            leaf(listEnd) = False
        End Select
        refSnap.MoveNext
    Wend
    Set filterData = allData
    initialList = True
End Sub Sub NewList ()
'remakes the display for a new list
'note: should itemSelected be initialized to something other than 1?
    Dim i As Integer 'counter
    Dim section As Integer 'count the number of locator locations
    Dim msg As String 'clear captions
    For i = 1 To MAXDISPLAY
            itemBox(i).Caption = ""
    Next i For i = 1 To MAXITEM
        Unload rItem(i)
    Next i MAXITEM = listEnd   'number of items in list 'load the reduced item shapes and size relative to MAXITEM
    rowOffset = (H - rItem(0).Height) / MAXITEM
    If rowOffset > rItem(0).Height + GAP Then rowOffset = rItem(0).Height + GAP
```

62

Eick-Mataga-Walpole 16-1

```
        rItem(0).Visible = False
        rItem(0).Top = T
        rItem(0).Left = locL + reducedEXTRA
        rItem(0).Width = locW - 2 * reducedEXTRA
        rItem(0).BackColor = itemCOLOR
        filterData.MoveFirst
        'size and place the item shapes
        'and set section bookmarks
        section = 0      'number of locator locations
        For i = 1 To MAXITEM
            Load rItem(i)
            rItem(i).Top = T + (i - 1) * rowOffset
            If ((i - 1) Mod MAXDISPLAY) = 0 Then
            'begin a new locator location
                section = section + 1
                locStart(section) = i
            End If
            If Not leaf(i) Then
                rItem(i).Width = rItem(i).Width + reducedEXTRA
            End If
            rItem(i).ZOrder
            rItem(i).Visible = True
        Next i
        MAXLOC = section
        locStart(section + 1) = MAXITEM + 1

'set length of minselector
        'use rItem(0) as mini selector
        rItem(0).Left = locL - GAP
        rItem(0).Width = locW + 2 * GAP 'initialize selector and locator
        itemSelected = 1
        locSelected = 1
        rItem(0).BackColor = highlightCOLOR 'set the captions in the itemBoxes
        RedoDisplay
End Sub Sub RedoDisplay ()
'set the captions in the itemBoxes to correspond to items in locator
'reposition locator, selector and set item info in info box Dim last As Integer 'number of last item in display
    Dim i As Integer 'counter
    Dim index As Integer 'index of item in list index = locStart(locSelected)
    For i = 1 To MAXDISPLAY
        If index > MAXITEM Then
            'hide empty itemBox
            itemBox(i).Caption = ""
            itemBox(i).Visible = False
```

Eick-Mataga-Walpole 16-1-.

```
                rightArrow(i).Visible = False
        Else
                itemBox(i).Caption = list(index)
                If Not leaf(index) Then
                    'show right arrow and put in all caps
                    rightArrow(i).Visible = True
                    itemBox(i).Caption = UCase(list(index))
                Else
                    rightArrow(i).Visible = False
                End If
                itemBox(i).Visible = True
                last = i   'remember last valid selection
                index = index + 1
        End If
    Next i 'Do not allow blank to be selected
    If itemSelected > last Then
        itemSelected = last
    End If 'fix the rest of the display
    displayList.Height = H + 2 * GAP - (H / MAXDISPLAY * (MAXDISPLAY - last))
    selector.Top = itemBox(itemSelected).Top - GAP
    locator.Top = T + rowOffset * (locStart(locSelected) - 1)
    locator.Height = last * rowOffset + rItem(0).Height - rowOffset
    rItem(0).Top = locator.Top + rowOffset * (itemSelected - 1)
    rItem(0).Visible = True
    SetItemInfo
End Sub Function removeAmpersand (oldText As String) As String
'for each double ampersand, remove one of them
    Dim text As String
    Dim newText As String
    Dim i As Integer text = oldText
    newText = ""
    While InStr(text, "&&")
        i = InStr(text, "&&")
        newText = newText & Left(text, i)
        text = Right(text, Len(text) - (i + 1))
    Wend
    removeAmpersand = newText & text
End Function Sub SetItemInfo ()
'put the relevant info for current item into info box
    Dim msg As String
    Dim index As Integer
    Dim F As snapshot If Me.Visible Then
```

Eick-Mataga-Walpole 16-1

```
        index = locStart(locSelected) + itemSelected - 1
        If leaf(index) Then
            'get full title from data
            Set F = filterData
            F.FindFirst "SelectTitle = """ & list(index) & """"
            msg = F("FullTitle")
        Else
            msg = "Titles beginning with '" & list(index) & "'"
        End If
        SetInfo msg, (itemBox(itemSelected).BackColor)
    End If
End Sub Sub tmrBlink_Timer ()
    BlinkControl.Visible = Not BlinkControl.Visible
End Sub '====== START form code ======
'This startup form allows the developer to choose display mode
' (either for PC, TV, or mini PC for making screen prints)
' then starts the actual program by calling Main
Option Explicit Sub Form_Load ()
    returnCode = STARTUP
End Sub Sub miniButton_Click ()
    displayMode = "mini"
    Unload Me
    Main
End Sub Sub PCbutton_Click ()
    displayMode = "PC"
    Unload Me
    Main
End Sub Sub TVbutton_Click ()
    displayMode = "TV"
    Unload Me
    Main
End Sub '====== TV form code ======
'This form pretends to show a TV program or record it, if it is not currently on Option Explicit Const GAP = 700

Sub Form_Activate ()
    Dim msg As String
```

Eick-Mataga-Walpole 16-1

```
    Dim DB As database
    Dim Programs As table
    Dim startTime
    Dim refSnap As snapshot
    Dim refDate
    Dim startTS, finishTS, nowTS Set DB = OpenDatabase(TVDB)
    Set refSnap = DB.CreateSnapshot("Reference")
    refSnap.FindFirst "Name = 'Date'"
    refDate = DateValue(refSnap("Data"))
    Set Programs = DB.OpenTable("Programs")
    Programs.Index = "ID"
    Programs.Seek "=", userStation, userStart
    'note: ought to check that userStation is valid
    If Programs.NoMatch Then
        'simulate showing whatever is currently on userStation
        nowTS = DateDiff("n", refDate, fakeToday + fakeTime) \ 30
        Set refSnap = Programs.CreateSnapshot()
        refSnap.FindFirst "Station = " & Str(userStation)
        refSnap.FindNext "FinishTS > " & Str(nowTS)
        msg = "You are watching "
        msg = msg & Chr(13) & Format(refSnap("Title"))
        msg = msg & " on " & StationString(refSnap("Station"))
        msg = msg & Chr(13) & Format(refSnap("Start"), "h:mm AM/PM")
        msg = msg & " to " & Format(refSnap("Finish"), "h:mm AM/PM")
    Else
        'decide if the program is on, record if it's not
        startTS = DateDiff("n", refDate, Programs("Start")) \ 30
        finishTS = DateDiff("n", refDate, Programs("Finish")) \ 30
        nowTS = DateDiff("n", refDate, fakeToday + fakeTime) \ 30
        'nowTS would be calculated to work in real time
        If startTS <= nowTS And finishTS >= nowTS Then
            msg = "You are watching "
        Else
            msg = "The VCR is set to record "
        End If
        msg = msg & Chr(13) & Format(Programs("Title"))
        msg = msg & " on " & StationString(Programs("Station"))
        msg = msg & Chr(13) & Format(Programs("Start"), "h:mm AM/PM")
        msg = msg & " to " & Format(Programs("Finish"), "h:mm AM/PM")
    End If
    textArea.Caption = msg
End Sub Sub Form_KeyDown (KeyCode As Integer, Shift As Integer)
    Select Case KeyCode
    Case B_BACK
        returnCode = LASTVIEW
        'note: this is not appropriate if we came from menu (rolodex)
        Me.Hide
    Case B_0
        returnCode = SHORTCUT
        Me.Hide
```

Eick-Mataga-Walpole 16-1-1

```
    Case Asc("Q")
        End
    Case Else
        returnCode = BACK
        Me.Hide
    End Select
End Sub Sub Form_Load ()
    textArea.Caption = ""
    textArea.FontSize = largeFONT
    SizeAForm Me, 0, ScrHeight, 0, ScrWidth
    SizeAControl textArea, GAP, ScrHeight - 2 * GAP, GAP, ScrWidth - 2 * GAP
End Sub '====== TV_GUIDE form code ======
'General remarks:
'   The Main procedure starts the ball rolling by showing the Frame, loading
'all the forms, and then showing the rolodex menu. Control is tranferred from form
'to form through the use of the returnCode variable (see list of return codes in
'global declarations). The frmDex, for example, sets the returnCode to SHOWVIEW, and
'hides itself. This causes frmFrame to become active. frmFrame looks at the returnCode
'and shows the current domain's view form.  Communication between forms is done through
'a variety of variables, since a form's procedures are not accessible from outside.

Option Explicit
'*****************************
'    Global Declarations
'*****************************
'database constants
Global Const CARDFILE = "c:\pctv\db\cards2.txt"
Global Const MVDB = "c:\pctv\db\plots.mdb"
Global Const SPDB = "c:\pctv\db\shopping.mdb"
Global Const TVDB = "c:\pctv\db\big.mdb"
Global Const TVTitles = "c:\pctv\db\titles.mdb"
Const CATDB = "c:\pctv\db\cats.mdb"
Dim typeTable As table   'TV type IDs
Dim catTable As table    'TV category IDs
Dim statTable As table 'station IDs
Global fakeToday 'keep the day constant
Global fakeTime  'keep the time constant
Global displayMode As String 'display set for "PC" or "TV" (affects size of fonts
and graphics)
Global newUser As Integer 'boolean 'when true, give extra helps Global ScrWidth, ScrHeight
Global DispTop, DispHeight, DispLeft, DispWidth 'display area available to forms
inside the frame 'Colors
Global Const highlightCOLOR = &H8080FF   'redish
Global Const backgroundCOLOR = &H80FFFF  'yellow
```

Eick-Mataga-Walpole 16-1-

```
Global Const itemCOLOR = &HFFFFC0        'light blue
Global Const formCOLOR = &HFF0000        'dark blue
Global Const whiteCOLOR = &H80000005     'white
Global Const greyCOLOR = &HC0C0C0        'grey
Global Const blackCOLOR = &H0&           'black
Global Const slotCOLOR = &H80000005      'white
Global Const borderCOLOR = &HFF&         'red
Global Const divideCOLOR = &HFFFF&       'white
Global Color(10)   'array filled in Main 'font sizes
Global Const smallFONT = 13.8
Global Const mediumFONT = 18
Global Const largeFONT = 24

'domain constants
Global Const MOVIE = 0
Global Const TV = 1
Global Const SHOP = 2

'array of list forms
Global listFrm(3) As Form
Global TVlist As New frmList
Global MOVlist As New frmList
Global SHOPlist As New frmList '*******************************
'   Inter-Form Communication
'*******************************
Global currDomain As Integer 'the current domain
Global filters(3) As String 'array of query strings for current domain filter
Global currFilter(3) As String 'text name of filter
Global currView(3) As String 'text name of current view (use mainly for lists which
change view title)
Global views(3) As Form 'array of current domain views (TV coming or TV schedule,
for instance)
Global viewFilter As String 'the database filter needed to obtain the appropriate
view
    'note: used only for movies at this time, would probably be expanded to array
    Global userString As String 'string chosen by user
Global userMsg 'message string to display to user
Global userStation 'a station selected by user
Global userStart 'a time chosen by user Global sameFilter As Integer 'boolean 'true if need to refilter data
Global sameView   As Integer 'boolean 'true if need to redo display 'return codes determine which action to take on re-activate of frmFrame or frmDex
Global returnCode As Integer
Global Const BACK = 0
Global Const TOTV = 1
Global Const LASTVIEW = 2
Global Const SHORTCUT = 3
Global Const DONE = 4
```

Eick-Mataga-Walpole 16-1

```
Global Const FILTER = 5
Global Const COMING = 6
Global Const SHOWVIEW = 9
Global Const ALPHA = 10
Global Const PICK = 11
Global Const STARTUP = 12

'***************************
'    Define Type Card
'        for rolodex
'***************************
Global Const MAXITEM = 9  'max number of buttons on a card 'Represents one index card as viewed on screen
Type Card
    self As Integer   'item number of self on parent
    level As Integer  'number of cards away from root
    name As String    'text to appear on button/card
    infotext As String      'text for info bar
    actionCode As Integer   'code for action to take when chosen
    actionData As String    'extra info needed for action
    parent As Integer       'number of parent card
    NItems As Integer       'number of buttons visible on card
    Item(MAXITEM) As Integer 'array of card pointers (one for each button on card)
    selected As Integer     'the number of the selected button
End Type 'Array of up to MAXCARDS index cards
Global Const MAXCARDS = 1000
Global Cards(MAXCARDS) As Card '***************************
'       Remote Buttons
'***************************
'assigned values in sub SetKeys
Global B_BACK
Global B_HELP
Global B_PREVIEW
Global B_UP
Global B_DOWN
Global B_LEFT
Global B_RIGHT
Global B_SELECT
Global B_PAGEUP
Global B_PAGEDOWN
Global B_1
Global B_2
Global B_3
Global B_4
Global B_5
Global B_6
Global B_7
Global B_8
Global B_9
```

Eick-Mataga-Walpole 16-1

```
Global B_0
Global B_FILTER

'*******************
'       COLORS
'*******************
Global Const RED = &HFF&
Global Const ORANGE = &H80FF&
Global Const YELLOW = &HFFFF&
Global Const GREEN = &H80FF80
Global Const TURQUOISE = &HFFFF00
Global Const BLUE = &HFF0000
Global Const VIOLET = &HFF00FF
Global Const WHITE = &HFFFFFF
Global Const BLACK = &H0&
Global Const GREY = &HC0C0C0

'*********************************************************
'*          CONSTANTS FROM VISUAL BASIC FILES            *
'*********************************************************

'* From CONSTANT.TXT

' Key Codes
Global Const KEY_LBUTTON = &H1
Global Const KEY_RBUTTON = &H2
Global Const KEY_CANCEL = &H3
Global Const KEY_MBUTTON = &H4      ' NOT contiguous with L & RBUTTON
Global Const KEY_BACK = &H8
Global Const KEY_TAB = &H9
Global Const KEY_CLEAR = &HC
Global Const KEY_RETURN = &HD
Global Const KEY_SHIFT = &H10
Global Const KEY_CONTROL = &H11
Global Const KEY_MENU = &H12
Global Const KEY_PAUSE = &H13
Global Const KEY_CAPITAL = &H14
Global Const KEY_ESCAPE = &H1B
Global Const KEY_SPACE = &H20
Global Const KEY_PRIOR = &H21
Global Const KEY_NEXT = &H22
Global Const KEY_END = &H23
Global Const KEY_HOME = &H24
Global Const KEY_LEFT = &H25
Global Const KEY_UP = &H26
Global Const KEY_RIGHT = &H27
Global Const KEY_DOWN = &H28
Global Const KEY_SELECT = &H29
Global Const KEY_PRINT = &H2A
Global Const KEY_EXECUTE = &H2B
Global Const KEY_SNAPSHOT = &H2C
Global Const KEY_INSERT = &H2D
Global Const KEY_DELETE = &H2E
Global Const KEY_HELP = &H2F
```

Eick-Mataga-Walpole 16-1-

```
' KEY_A thru KEY_Z are the same as their ASCII equivalents: 'A' thru 'Z'
' KEY_0 thru KEY_9 are the same as their ASCII equivalents: '0' thru '9'

Global Const KEY_NUMPAD0 = &H60
Global Const KEY_NUMPAD1 = &H61
Global Const KEY_NUMPAD2 = &H62
Global Const KEY_NUMPAD3 = &H63
Global Const KEY_NUMPAD4 = &H64
Global Const KEY_NUMPAD5 = &H65
Global Const KEY_NUMPAD6 = &H66
Global Const KEY_NUMPAD7 = &H67
Global Const KEY_NUMPAD8 = &H68
Global Const KEY_NUMPAD9 = &H69
Global Const KEY_MULTIPLY = &H6A
Global Const KEY_ADD = &H6B
Global Const KEY_SEPARATOR = &H6C
Global Const KEY_SUBTRACT = &H6D
Global Const KEY_DECIMAL = &H6E
Global Const KEY_DIVIDE = &H6F
Global Const KEY_F1 = &H70
Global Const KEY_F2 = &H71
Global Const KEY_F3 = &H72
Global Const KEY_F4 = &H73
Global Const KEY_F5 = &H74
Global Const KEY_F6 = &H75
Global Const KEY_F7 = &H76
Global Const KEY_F8 = &H77
Global Const KEY_F9 = &H78
Global Const KEY_F10 = &H79
Global Const KEY_F11 = &H7A
Global Const KEY_F12 = &H7B
Global Const KEY_F13 = &H7C
Global Const KEY_F14 = &H7D
Global Const KEY_F15 = &H7E
Global Const KEY_F16 = &H7F Global Const KEY_NUMLOCK = &H90

Function CategoryString (typeCode As Integer, catCode As Integer) As String
'creates user-reabable string for a TV program's category
    Dim msg As String msg = "Category: "
    'look up type code
    typeTable.Index = "ID"
    typeTable.Seek "=", typeCode
    If typeTable.NoMatch Then
        msg = msg & typeCode
    Else
        msg = msg & typeTable("Name")
    End If
    msg = msg & ", " 'all on one line, replaced: Chr(13) & "Subcategory: "
```

71

Eick-Mataga-Walpole 16-1

```
    'look up category code
    catTable.Index = "ID"
    catTable.Seek "=", catCode
    If catTable.NoMatch Then
        msg = msg & catCode
    Else
        msg = msg & catTable("Name")
    End If
    CategoryString = msg
End Function Sub CCopy (Cfrom As Control, Cto As Control)
'copies attributes of CFrom control to CTo
    Cto.Caption = Cfrom.Caption
    Cto.BackColor = Cfrom.BackColor
    Cto.Top = Cfrom.Top
    Cto.Height = Cfrom.Height
    Cto.Left = Cfrom.Left
    Cto.Width = Cfrom.Width
    Cto.FontSize = Cfrom.FontSize
End Sub Sub CenterItem (Item As Control, x, y)
'centers a control around a point
    Item.Left = x - Item.Width / 2
    Item.Top = y - Item.Height / 2
End Sub Sub CPlace (extra, Cfrom As Control, Cto As Control)
'place Cfrom in the same place as Cto, with difference extra
    Cfrom.Top = Cto.Top - extra
    Cfrom.Left = Cto.Left - extra
    Cfrom.Height = Cto.Height + 2 * extra
    Cfrom.Width = Cto.Width + 2 * extra
End Sub Function DayString (d, length As String) As String
'returns string for appropriate day of week based on date given
' and length specified
    Select Case Weekday(d)
    Case 1
        If length = "long" Then
            DayString = "Sunday"
        Else
            DayString = "Sun"
        End If
    Case 2
        If length = "long" Then
            DayString = "Monday"
        Else
            DayString = "Mon"
        End If
    Case 3
        If length = "long" Then
```

Eick-Mataga-Walpole 16-1

```
            DayString = "Tuesday"
        Else
            DayString = "Tue"
        End If
    Case 4
        If length = "long" Then
            DayString = "Wednesday"
        Else
            DayString = "Wed"
        End If
    Case 5
        If length = "long" Then
            DayString = "Thursday"
        Else
            DayString = "Thur"
        End If
    Case 6
        If length = "long" Then
            DayString = "Friday"
        Else
            DayString = "Fri"
        End If
    Case 7
        If length = "long" Then
            DayString = "Saturday"
        Else
            DayString = "Sat"
        End If
    End Select
End Function Function fixAmpersand (text As String)
'put in a "&&" for every "&" so ampersand will print instead of format an underline
    Dim i As Integer
    Dim oldText As String
    Dim newText As String newText = ""
    oldText = text
    While InStr(oldText, "&")
        i = InStr(oldText, "&")
        newText = Left(oldText, i - 1) & "&&"
        oldText = Right(oldText, Len(oldText) - i)
    Wend
    fixAmpersand = newText & oldText
End Function Sub InvokeHelp ()
'add parameter for current location or give each form a local InvokeHelp
'would be specialized for each view, probably not each button
    TellUser "Press Help (?) again for general help, or press any button on the
remote for help with that button."
    Select Case returnCode
    Case B_HELP
```

73

Eick-Mataga-Walpole 16-

```
            TellUser "General Help:"
        Case B_PREVIEW
            TellUser "Use  the Preview button to see a video preview of the highlighted
    selection."
        Case B_BACK
            TellUser "Use the Back button to back up to the previous screen."
        Case KEY_ESCAPE
            TellUser "Use the Shortcut key to get to the shortcut buttons."
        Case B_SELECT
            TellUser "Use the select button to choose a highlighted option."
        Case Else
            TellUser "This help screen is not written yet."
        End Select
    End Sub Sub Main ()
        Dim i As Integer
        Dim DB As database
        Set DB = OpenDatabase(CATDB)
        Set typeTable = DB.OpenTable("Type")
        Set catTable = DB.OpenTable("Category")
        Set DB = OpenDatabase(TVDB)
        Set statTable = DB.OpenTable("Stations")
        SetKeys displayMode
        'set different list forms
        Set listFrm(TV) = TVlist
        Set listFrm(MOVIE) = MOVlist
        Set listFrm(SHOP) = SHOPlist
        'set color array
        Color(0) = &HBFBF00     'teal green
        Color(1) = &HFFFF80     'light blue
        Color(2) = &HFFC0FF     'light pink
        Color(3) = &HFF80FF     'dark pink
        Color(4) = &H80C0FF     'medium orange
        Color(5) = &HC0FFC0     'lightest green
        Color(6) = &HFF8080     'royal blue
        Color(8) = &HFFC0C0     'lavendar
        Color(7) = &HC0C0&      'ochre
        'set date and time
        fakeToday = CVDate("6/12/94")
        fakeTime = CVDate("6:30 PM")

newUser = True

'start up the forms
        frmFrame.Show
        DoEvents
        'load all forms here
        Load frmDex
        Load frmAlpha
        Load frmTV
        Load frmMsg
        'Movie forms
        currDomain = MOVIE
```

74

Eick-Mataga-Walpole 16-

```
    viewFilter = "Year >= 1993"
    currView(MOVIE) = "Recent Movies"
    currFilter(MOVIE) = ": All Categories"
    SetStatus "Movies", greyCOLOR
    Load listFrm(MOVIE)
    'Shopping forms
    currDomain = SHOP
    filters(SHOP) = ""
    SetStatus "Shopping, compact disks", greyCOLOR
    Load listFrm(SHOP)
    'TV forms
    currFilter(TV) = "Basketball"
    currDomain = TV
    filters(TV) = "Category = 39"
    userString = "Nova"
    'Load frmWeek
    'Load listFrm(TV)
    'Load frmComing
    'Load frmWkday
    'Load frmSelect 'show main menu
    SetStatus "Use arrows and select or use keypad.", greyCOLOR
    frmDex.Show
End Sub Function Overlap (beginTS, endTS) As String
'create query string to look for TV programs in the range between
' and including beginTS and endTS
    Overlap = "(StartTS <= " & Str(endTS) & " And FinishTS >= " & Str(beginTS) & ")"
End Function Sub SetInfo (text As String, Color)
'update the info box text and color
    Dim s As SSPanel
    Set s = frmFrame!sspInfo 'works as long as form is loaded
    s.BackColor = Color
    s.Caption = text
End Sub Sub SetKeys (mode As String)
'Set the keymappings for keyboard or "remote"
    B_1 = KEY_NUMPAD7
    B_2 = KEY_NUMPAD8
    B_3 = KEY_NUMPAD9
    B_4 = KEY_NUMPAD4
    B_5 = KEY_NUMPAD5
    B_6 = KEY_NUMPAD6
    B_7 = KEY_NUMPAD1
    B_8 = KEY_NUMPAD2
    B_9 = KEY_NUMPAD3
    If mode = "TV" Then
        'use keypad for all buttons (except 1-9)
        B_BACK = KEY_SUBTRACT
```

75

Eick-Mataga-Walpole 16-1

```
        B_HELP = 18 'I don't know what the name of this key is
        B_PREVIEW = KEY_ADD
        B_UP = Asc("8")
        B_DOWN = Asc("2")
        B_LEFT = Asc("4")
        B_RIGHT = Asc("6")
        B_SELECT = Asc("5")
        B_PAGEUP = KEY_DIVIDE
        B_PAGEDOWN = Asc("0")
        B_0 = KEY_MULTIPLY
        B_FILTER = KEY_RETURN
    Else
        B_BACK = KEY_F1
        B_HELP = KEY_F3
        B_PREVIEW = KEY_F2
        B_UP = KEY_UP
        B_DOWN = KEY_DOWN
        B_LEFT = KEY_LEFT
        B_RIGHT = KEY_RIGHT
        B_SELECT = KEY_RETURN
        B_PAGEUP = KEY_PRIOR
        B_PAGEDOWN = KEY_NEXT
        B_0 = KEY_NUMPAD0
        B_FILTER = KEY_F4
    End If
End Sub Sub SetStatus (text As String, Color)
'update the status bar with new message
    Dim s As SSPanel
    Set s = frmFrame!sspStatus '(works as long as form is loaded)
    s.BackColor = Color
    s.Caption = text
End Sub Sub SizeAControl (Item As Control, t, H, l, w)
'set the size attributes of a control
    Item.Top = t
    Item.Left = l
    Item.Height = H
    Item.Width = w
End Sub Sub SizeAForm (frm As Form, t, H, l, w)
'set the size attributes of a form
    frm.Top = t
    frm.Left = l
    frm.Height = H
    frm.Width = w
End Sub Function StationString (s) As String
'looks up station number and returns station name as string
    statTable.Index = "ID"
```

Eick-Mataga-Walpole 16-1-1

```
    statTable.Seek "=", s
    If statTable.NoMatch Then
        MsgBox "illegal station ID " & s
        Stop
    End If
    StationString = statTable("Name")
End Function Sub TellUser (message As String)
'displays message on screen until key is pressed
'probably would not be used
    userMsg = message
    Wait frmMsg
End Sub Function TimeLabel (t) As String
'returns null string for times on half hour,
' returns hour 1..12 otherwise
    Dim s As String
    s = Format(t, "hh:mm AM/PM")
    If Mid(s, 4, 2) = "30" Then
        TimeLabel = ""
    Else
        s = Format(s, "h AM/PM")
        'strip off AM/PM
        TimeLabel = Left(s, Len(s) - 3)
    End If
End Function Function TimeString (aDate) As String
'format a date as 12-hour time without AM/PM or leading zero
    Dim theTime As String
    theTime = Format(aDate, "hh:mm AM/PM")
    theTime = Left(theTime, 5) 'take just "hh:mm" part
    If Left(theTime, 1) = "0" Then
        theTime = Right(theTime, 4)
    End If
    TimeString = theTime
End Function Sub Wait (F As Form)
'Allows one form to wait for another to hide itself
    F.Show
    While (F.Visible)
        DoEvents
    Wend
End Sub '====== WEEK form code ======
Option Explicit
'stacked channel' view to be used with TV search and
' possibly other minimal searches (would need modification in ApplyFilter)

Dim allData(8) As snapshot   'all data within time period
```

Eick-Mataga-Walpole 16-1

```
Dim filterData(8) As snapshot 'a snapshot for each day in the view
Dim NDays As Integer      'number of days in display
Dim NSlots As Integer     'number of time slots in display
Dim NProgs As Integer     'number of programs in display
Dim colorField As String  'the database field that determines item color
                          '(the field should contain an integer)
Dim inPreview As Integer  'boolean 'if true, preview should show
Dim refDate 'reference date for data time slots
Dim slotsPerDay As Integer  'number of slots allowed per day
Dim currDay 'number of current day
Dim dayWidth As Integer 'width of day labels
Dim lblHeight As Integer 'height of day labels
Dim infoHeight As Integer 'height of specialized info panel
Dim timeHeight 'height of time labels
Dim startTime  'beginning time for view
Dim TSBegin As Long 'first time slot of current day
Dim TSEnd As Long  'last time slot of current day
Dim TScurrent As Long  'time slot of current program Sub ApplyFilter ()
'filter for a particular show by title in userString
    Dim i As Integer 'counter 'create snapshot for each day
    For i = 1 To NDays
        allData(i).Filter = "Title = """ & userString & """"
        Set filterData(i) = allData(i).CreateSnapshot()
        filterData(i).Sort = "StartTS"
        Set filterData(i) = filterData(i).CreateSnapshot()
    Next i
End Sub Sub ChangeSel (d As String)
'perform view navigation
    Dim current 'as database marker
    Dim success As Integer 'boolean
    Dim s As Integer 'station number
    Dim best
    Dim TS As Long  'time slot
    Dim F As snapshot
    Dim aDay As Integer
    Dim marker 'as bookmark
    Dim arrows As String 'save values, initialize values
    current = filterData(currDay).Bookmark
    Set F = filterData(currDay)
    s = F("Station")
    TS = TScurrent
    aDay = currDay
    success = False Select Case d
    Case "Right"
```

Eick-Mataga-Walpole 16-1

```
        'move to later time, same day
        F.FindNext "StartTS > " & Str(TS)
        success = Not F.NoMatch
        If success Then
            'check if info arrows needed
            TS = F("StartTS")
            F.MoveNext
            If Not F.EOF Then
                If F("StartTS") = TS Then
                    infoArrows "down"
                Else
                    infoArrows "none"
                End If
            Else
                infoArrows "none"
            End If
            F.MovePrevious
        End If
    Case "Left"
        'move to earlier time, same day
        F.FindPrevious "StartTS < " & Str(TS)
        success = Not F.NoMatch
        If success Then
            TS = F("StartTS")
            'go to top of column
            F.FindFirst "StartTS = " & Str(TS)
            TS = F("StartTS")
            'check if info arrows needed
            F.MoveNext
            If Not F.EOF Then
                If F("StartTS") = TS Then
                    infoArrows "down"
                Else
                    infoArrows "none"
                End If
            Else
                infoArrows "none"
            End If
            F.MovePrevious
        End If
    Case "Down"
        'move to later day, trying to keep close to previous time slot
        If NProgs < 1 Then Exit Sub 'do nothing if all snapshots empty
        aDay = aDay + 1: TS = TS + 48
        While Not success And aDay <= NDays
            Set F = filterData(aDay)
            F.FindFirst "StartTS > " & Str(TS)
            If F.NoMatch Then
                'no prog to right, look left for any programs
                If Not F.EOF Then F.MoveLast
                If Not F.EOF Then
                    success = True
                    TS = F("StartTS")
                End If
```

Eick-Mataga-Walpole 16-1

```
        Else
            'save program to right, count time slots away, check left
            marker = F.Bookmark
            best = F("StartTS") - TS
            F.FindLast "StartTS <= " & Str(TS)
            If F.NoMatch Then
                'no prog to left, take program to right
                F.Bookmark = marker
                TS = TS + best
            Else
                'check distances from previous time slot
                If TS - F("StartTS") > best Then
                    'right prog closest
                    F.Bookmark = marker
                    TS = TS + best
                Else
                    'left prog closest
                    TS = F("StartTS")
                End If
            End If
            'either way, we found a program
            success = True
        End If
        aDay = aDay + 1: TS = TS + 48
    Wend
    aDay = aDay - 1: TS = TS - 48
    If success Then
        'make sure to be at the top of a column
        F.FindFirst "StartTS = " & Str(TS)
        If F.NoMatch Then Stop 'how did we get a TS with no program in it?
        TS = F("StartTS")
        'check if info arrows needed
        F.MoveNext
        If Not F.EOF Then
            If F("StartTS") = TS Then
                infoArrows "down"
            Else
                infoArrows "none"
            End If
        Else
            infoArrows "none"
        End If
        F.MovePrevious
    End If
Case "Up"
    'move to earlier day, trying to keep close to previous time slot
    If NProgs < 1 Then Exit Sub 'do nothing if all snapshots empty
    aDay = aDay - 1: TS = TS - 48
    While Not success And aDay > 0
        Set F = filterData(aDay)
        F.FindFirst "StartTS > " & Str(TS)
        If F.NoMatch Then
            'no prog to right, look left
            If Not F.EOF Then F.MoveLast
```

Eick-Mataga-Walpole 16-1

```
            If Not F.EOF Then
                success = True
                TS = F("StartTS")
            End If
        Else
            'save program to right, count time slots away,   look left
            marker = F.Bookmark
            best = F("StartTS") - TS
            F.FindLast "StartTS <= " & Str(TS)
            If F.NoMatch Then
                'no prog to left, take program to right
                F.Bookmark = marker
                TS = TS + best
            Else
                'check distances
                If TS - F("StartTS") > best Then
                    'right prog closest
                    F.Bookmark = marker
                    TS = TS + best
                Else
                    'left prog closest
                    TS = F("StartTS")
                End If
            End If
            'either way, we found a program
            success = True
        End If
        aDay = aDay - 1: TS = TS - 48
    Wend
    aDay = aDay + 1: TS = TS + 48
    If success Then
        'make sure to be at the top of a column
        F.FindFirst "StartTS = " & Str(TS)
        If F.NoMatch Then Stop 'how did we get a TS with no program in it?
        TS = F("StartTS")
        'check if info arrows needed
        F.MoveNext
        If Not F.EOF Then
            If F("StartTS") = TS Then
                infoArrows "down"
            Else
                infoArrows "none"
            End If
        Else
            infoArrows "none"
        End If
        F.MovePrevious
    End If
Case "Next"
    'find next program, same time and day
    F.MoveNext
    If Not F.EOF Then
        'success means still in same time slot
        success = F("StartTS") = TS
```

Eick-Mataga-Walpole 16-1-.

```
        End If
        'set arrows
        If success Then
            F.MoveNext
            arrows = "up"
            If Not F.EOF Then
                If F("StartTS") = TS Then arrows = "both"
            End If
            F.MovePrevious
            infoArrows arrows
        End If
    Case "Prior"
        'find previous program, same time and day
        F.MovePrevious
        If Not F.BOF Then
            'success means still in same time slot
            success = F("StartTS") = TS
        End If
        'set arrows
        If success Then
            F.MovePrevious
            arrows = "down"
            If Not F.BOF Then
                If F("StartTS") = TS Then arrows = "both"
            End If
            F.MoveNext
            infoArrows arrows
        End If
    Case "none"
        'stay at current program, update the arrows  (used at startup)
        If Not F.EOF Then
            F.MoveNext
            arrows = "none"
            If Not F.EOF Then
                If F("StartTS") = TS Then arrows = "down"
            End If
            F.MovePrevious
            infoArrows arrows
        End If
    End Select If success Then
        'update
        TScurrent = F("StartTS")
        currDay = aDay
        DisplayProg
    Else
        'restore database position
        filterData(currDay).Bookmark = current
    End If
    'set begin and end time slots for current day
    TSBegin = DateDiff("n", refDate, (startTime + currDay - 1)) \ 30
    TSEnd = TSBegin + slotsPerDay - 1
End Sub
```

Eick-Mataga-Walpole 16-1-.

```
Sub DisplayProg ()
'set info box with current program info and highlight position
    Dim F As snapshot
    Dim msg As String Set F = filterData(currDay)
    msg = StationString(F("Station")) & ": " & Format(F("Start"), "h:mm AM/PM")
    msg = msg & " to " & Format(F("Finish"), "h:mm AM/PM, ")
    msg = msg & Format(F("Title"))
    msg = msg & Chr(13) & "(episode info here)" '& Format(F("Episode"))
    'note: current database does not contain episode information
    SetInfo msg, Color(F(colorField) Mod 9)

shpProg(0).Visible = False
    selector.Visible = False
    Position shpProg(0), F("StartTS"), F("FinishTS")
    CPlace 0, selector, shpProg(0)
    shpProg(0).Visible = True
    selector.Visible = True
End Sub Sub DoPreview ()
'Construct an appropriate preview message and display
    Dim msg As String msg = filterData(currDay)("Title")
    msg = msg & Chr(13) & "on " & StationString(filterData(currDay)("Station")) & Chr(13)
    msg = msg & CategoryString((filterData(currDay)("Type")), (filterData(currDay)("Category")))
    msg = msg & Chr(13) & DayString(Weekday(filterData(currDay)("Start")), "long")
    msg = msg & ", " & Format(filterData(currDay)("Start"), "mmm d, yy h:mm AM/PM")
    msg = msg & Chr(13) & "     to " & Format(filterData(currDay)("Finish"), "h:mm AM/PM")

popup.Caption = msg
    SizeAControl popup, (lblTime(1).top + 1.5 * lblTime(1).Height), 12, (lblDay(1).Width), 45
    popup.Visible = True
    inPreview = True
End Sub Sub DoSelect ()
'set data for selection and go to TV.
    userStation = filterData(currDay)("Station")
    userStart = filterData(currDay)("Start")
    returnCode = TOTV
    Me.Hide
End Sub Sub DrawProg (duplicates As Integer, index As Integer)
'draw a program shape in display, marking it if there are duplicates at the
identical time slot
```

83

Eick-Mataga-Walpole 16-1-.

```
'shpProg(0) should be at the desired location
    Dim above, below, side, wide
    Const GAP = .3 above = shpProg(0).top
    below = shpProg(0).Height
    side = shpProg(0).Left
    wide = shpProg(0).Width
    ForeColor = blackCOLOR    'line color, thin black outline
    FillStyle = 0 'solid
    drawwidth = 1

Select Case duplicates
    Case 0
        'draw the program in the given color
        fillColor = Color(index)
        Line (side, above)-(side + wide, above + below - .5 * GAP), , B
    Case 1
        'draw the program in grey and mark it
        fillColor = greyCOLOR    'indicate duplicates (which may be of different
colors)
        Line (side, above)-(side + wide, above + below - .5 * GAP), , B
        'draw icon
        above = above + GAP
        side = side + GAP
        wide = 2 * GAP
        drawwidth = 2
        Line (side, above)-(side + wide, above + wide)
        Line (side, above + wide)-(side + wide, above)
        Line (side, above + .5 * wide)-(side + wide, above + .5 * wide)
        Line (side + .5 * wide, above)-(side + .5 * wide, above + wide)
    Case Else
        'no need to redraw duplicate marks
    End Select End Sub Sub Form_Activate ()
    Dim i As Integer 'counter
    Static saveFilter As String If saveFilter = userString Then sameFilter = True
    saveFilter = userString
    SetStatus "This Week: " & userString, greyCOLOR 'if not same form, erase and redraw the week schedule
    If Not sameFilter Then
        Me.Cls
        SetInfo "Loading program information...", GREY
        shpProg(0).Visible = False
        selector.Visible = False
        infoArrows "none"
        DoEvents
```

Eick-Mataga-Walpole 16-1

```
        ApplyFilter
        MakeDisplay
        sameFilter = True
    End If
End Sub Sub Form_KeyDown (KeyCode As Integer, Shift As Integer)
    Dim index As Integer
    Dim n As Integer
    Select Case KeyCode
    Case Asc("Q")
        End
    Case B_BACK
        returnCode = BACK
        Me.Hide
    Case B_HELP
        sameFilter = True
        InvokeHelp
    Case B_PREVIEW
        If inPreview Then
            inPreview = False
            popup.Visible = False
        Else
            inPreview = True
        End If
    Case B_RIGHT
        ChangeSel ("Right")
    Case B_LEFT
        ChangeSel ("Left")
    Case B_UP
        ChangeSel ("Up")
    Case B_DOWN
        ChangeSel ("Down")
    Case B_SELECT
        If Not filterData(currDay).EOF Then DoSelect
    Case B_PAGEDOWN
        ChangeSel ("Next")
    Case B_PAGEUP
        ChangeSel ("Prior")
    Case B_FILTER
        'go back to frmSelect to choose a new title
        returnCode = PICK
        Me.Hide
    Case B_0
        returnCode = SHORTCUT
        Me.Hide
    End Select
    If inPreview Then
        DoPreview
    Else
        popup.Visible = False
    End If
End Sub
```

85

Eick-Mataga-Walpole 16-1

```
Sub Form_Load ()
    Dim i As Integer

'set form colors and fonts
    Me.BackColor = formCOLOR
    shpProg(0).BackColor = BorderColor
    lblDay(0).BackColor = backgroundCOLOR
    selector.BorderColor = BorderColor
    dayLine(0).BorderColor = divideCOLOR
    lblTime(0).ForeColor = slotCOLOR
    shpSlot(0).BorderColor = slotCOLOR
    infoPanel.FontSize = mediumFONT
    If displayMode = "TV" Then
        lblDay(0).FontSize = smallFONT
        lblTime(0).FontSize = smallFONT
        popup.FontSize = mediumFONT
    Else
        lblDay(0).FontSize = largeFONT
        lblTime(0).FontSize = largeFONT
        popup.FontSize = largeFONT
    End If
    'cover up the standard info box
    SizeAForm Me, 0, DispTop + DispHeight, DispLeft, dispWidth
    'set scale and size objects
    NDays = 7
    NSlots = 48
    dayWidth = 4
    lblHeight = 2
    infoHeight = 6
    If displayMode = "TV" Then
        upArrow.Left = 8950
        downArrow.Left = 8950
        timeHeight = 2
        downArrow.top = 650
        upArrow.top = 150
    Else
        timeHeight = 1.5
        downArrow.top = 1525
    End If
    Me.Scale (0, 0)-(NSlots + dayWidth, NDays * lblHeight + 2 * timeHeight +
infoHeight)
    selector.BorderWidth = 1
    'place extended info panel
    SizeAControl infoPanel, 0, infoHeight, 0, (Me.ScaleWidth)
    infoPanel.Caption = ""
    infoPanel.Visible = True
    'place day labels along side
    SizeAControl lblDay(0), lblHeight + infoHeight, lblHeight, 0, dayWidth
    For i = 1 To NDays
        Load lblDay(i)
        lblDay(i).Caption = DayString(i, "short")
        lblDay(i).top = (i - 1) * lblHeight + infoHeight + 2 * timeHeight
        lblDay(i).Visible = True
    Next i
```

86

Eick-Mataga-Walpole 16-

```
    'put AM/PM label across top
    SizeAControl lblDay(0), infoHeight, timeHeight, dayWidth, NSlots
    lblDay(0).Caption = "AM                  NOON                  PM"
    lblDay(0).Visible = True
    'put time labels across top
    SizeAControl lblTime(0), (lblDay(0).Height) + infoHeight, timeHeight, 0, 2
    For i = 1 To NSlots \ 2
        Load lblTime(i)
        lblTime(i).Caption = TimeLabel(DateAdd("h", (i - 1), fakeTODAY))
        lblTime(i).Left = 2 * i + 2
        lblTime(i).Visible = True
    Next i
    NProgs = 0
    sameFilter = False
    InputData
    Form_Activate
End Sub Sub infoArrows (direct As String)
'show or hide arrows in info box indicating presence of more programs at identical
time
    Select Case direct
    Case "up"
        downArrow.Visible = False
        upArrow.Visible = True
    Case "down"
        upArrow.Visible = False
        downArrow.Visible = True
    Case "both"
        upArrow.Visible = True
        downArrow.Visible = True
    Case "none"
        upArrow.Visible = False
        downArrow.Visible = False
    End Select
End Sub Sub InputData ()
'part of form_load
'opens the database and creates allData snapshots Dim DB As database
    Dim RefSnap As snapshot
    Dim i As Integer Set DB = OpenDatabase(TVDB)

'get reference date and number of stations
    Set RefSnap = DB.CreateSnapshot("Reference")
    RefSnap.FindFirst "Name = 'Date'"
    refDate = DateValue(RefSnap("Data"))
    RefSnap.FindFirst "Name = 'NStations'"

Set allData(0) = DB.CreateSnapshot("Programs")
```

87

Eick-Mataga-Walpole 16-1

```
    startTime = refDate
    TSBegin = 0
    TSEnd = TSBegin + 48 - 1
    For i = 1 To 7
        allData(0).Filter = Overlap(TSBegin + 48 * (i - 1), TSEnd + 48 * (i - 1))
        Set allData(i) = allData(0).CreateSnapshot()
    Next i
    Set allData(0) = Nothing   'no longer need data all together
End Sub Sub MakeDisplay ()
'create schedule display on screen
    Dim i As Integer 'counter
    Dim d As Integer 'day
    Dim TSlast As Integer 'last time slot affected
    Dim F As snapshot    'convenience
    Dim offset As Integer 'used twice: dayline offset & number of programs sharing a
time slot 'draw horizontal day lines
    drawwidth = 2
    ForeColor = lblDay(0).BackColor
    offset = infoHeight + 2 * timeHeight
    For i = 0 To NDays
        Line (0, offset + i * lblHeight)-(52, offset + i * lblHeight)
    Next i 'place program shapes
    offset = 0 'keep track of how full a particular time slot is
    colorField = "Category" 'note: should this be "Type" instead?
    For d = 1 To NDays
        currDay = d
        TSlast = -1
        Set F = filterData(d)
        If Not F.EOF Then
            F.MoveFirst
            Do While Not F.EOF
                If F("StartTS") = TSlast Then
                    offset = offset + 1
                    DrawProg offset, -1
                Else
                    offset = 0
                    Position shpProg(0), F("StartTS"), F("FinishTS")
                    DrawProg offset, F(colorField) Mod 9
                    TSlast = F("StartTS")
                End If
                F.MoveNext
            Loop
            F.MoveFirst
        End If
    Next d 'initialize stuff
```

Eick-Mataga-Walpole 16-1-1

```
    d = 1
    currDay = 1
    While d <= NDays
        If filterData(d).EOF Then
            d = d + 1
        Else
            NProgs = 1 'just to make sure it is more than 0
            currDay = d
            d = NDays + 1
        End If
    Wend
    shpProg(0).ZOrder
    selector.ZOrder
    If Not filterData(currDay).EOF Then
        TScurrent = filterData(currDay)("StartTS")
        DisplayProg
        ChangeSel "none"
    End If
End Sub Sub Position (shape As Control, start, finish)
'position a program shape
    Dim leftTS
    Dim rightTS
    Const smallGAP = .1

'convert to time slot scale
    leftTS = start - 48 * (currDay - 1)
    rightTS = finish - 48 * (currDay - 1)
    'set left and width
    shape.Left = dayWidth + leftTS
    shape.Width = rightTS - leftTS + 1 - smallGAP
    'cut off at beginning of day
    If shape.Left < dayWidth Then
        shape.Width = shape.Width - (dayWidth - shape.Left)
        shape.Left = dayWidth
    End If
    'set top and height
    shape.Height = 2 - 2 * smallGAP
    shape.top = lblDay(currDay).top + smallGAP
End Sub Sub SetInfo (msg As String, Color)
'override the global SetInfo to write to my own info panel
    infoPanel.BackColor = Color
    infoPanel.Caption = msg
End Sub '====== WKDAY form code ======
Option Explicit
'schedule of 5 weekdays at a particular time
'uses time-slot guided navigation Dim allData(8) As snapshot   'all data within time period
```

Eick-Mataga-Walpole 16-1

```
Dim filterData(8) As snapshot 'a snapshot for each day in the view
Dim NDays As Integer      'number of days in display
Dim NSlots As Integer     'number of time slots in display
Dim NProgs As Integer     'number of programs in display
Dim NStation As Integer   'number of stations in display
Dim MaxStation As Integer 'total number of stations in database
Dim colorField As String  'the database field that determines item color
                          '(the field should contain an integer)
Dim inPreview As Integer  'boolean 'true if preview should show
Const sideGap = .05       'space at beginning and end of program
Const topGAP = 4 'space btwn time label and first program shape
Dim refDate 'reference date for data time slots
Const lblHEIGHT = 40      'height of day and time labels (in 500 scale)
Const MINProgWidth = .2   'minimum width of a program shape as fraction of slot
Dim slotsPerDay As Integer  'number of slots allowed per day
Dim currDay As Integer 'number of current day Dim startTime 'start day and time of display
Dim TSBegin As Long  'first time slot
Dim TSEnd As Long    'last time slot
Dim TScurrent As Long 'current time slot
Dim rowOffset    'distance between (tops of) rows in the schedule Sub ApplyFilter ()
'create data set of onpy TV programs that fit into query string filters(TV)
'set number of stations and database field determining color
    Dim i As Integer 'counter If InStr(filters(TV), "Station") Then
        NStation = 10
        'note: need better mechanism for displaying favorite channels
        colorField = "Type"
    Else
        NStation = MaxStation
        colorField = "Category"
    End If
    For i = 1 To NDays
        allData(i).Filter = filters(TV)
        Set filterData(i) = allData(i).CreateSnapshot()
    Next i
End Sub Sub ChangeSel (d As String)
    Dim current, firstMatch 'as database markers
    Dim success As Integer 'boolean
    Dim s As Integer 'station
    Dim TS As Long    'time slot
    Dim F As snapshot
    Dim aDay As Integer
    Dim best As Integer current = filterData(currDay).Bookmark
    Set F = filterData(currDay)
    s = F("Station")
```

Eick-Mataga-Walpole 16-1

```
    TS = TScurrent
    aDay = currDay
    success = False

If d = "Right" Then
        'check to immediate right, same time slot
        F.MoveNext
        If Not F.EOF Then
            success = F("Station") = s And F("StartTS") = TS
        End If
        If Not success Then
        'check time slots to right
            shpSlot(TS - TSBegin + 1 + (currDay - 1) * slotsPerDay).FillStyle =
1'transparent
            lblTime(TS - TSBegin + 1 + (currDay - 1) * slotsPerDay).BackStyle =
0'transparent
            While aDay <= NDays And Not success
                While TS < TSEnd And Not success
                    TS = TS + 1
                    'check stations at and below current
                    F.FindFirst Overlap(TS, TS) & "And Station >= " & s
                    If F.NoMatch Then
                        'take the last station above current
                        F.FindLast Overlap(TS, TS) & "And Station < " & s
                        success = Not F.NoMatch
                    Else
                        'save this match and check if stations above are closer
                        success = True
                        best = F("Station") - s
                        firstMatch = F.Bookmark
                        'check previous
                        F.FindPrevious Overlap(TS, TS)
                        If F.NoMatch Then
                            'no previous match, stick with first match
                            F.Bookmark = firstMatch
                        Else
                            If s - F("Station") > best Then
                                'first match was closer
                                F.Bookmark = firstMatch
                            End If
                        End If
                    End If
                Wend
                If Not success Then
                    TSBegin = TSBegin + 48
                    TSEnd = TSBegin + slotsPerDay - 1
                    TS = TSBegin - 1
                    aDay = aDay + 1
                    Set F = filterData(aDay)
                End If
            Wend
        End If
    ElseIf d = "Left" Then
    'check to immediate left, same time slot
```

91

Eick-Mataga-Walpole 16-1

```
        F.MovePrevious
        If Not F.BOF Then
            success = F("Station") = s And F("FinishTS") = TS
        End If
        If Not success Then
        'check previous time slots
            shpSlot(TS - TSBegin + 1 + (currDay - 1) * slotsPerDay).FillStyle =
1'transparent
            lblTime(TS - TSBegin + 1 + (currDay - 1) * slotsPerDay).BackStyle =
0'transparent
            While aDay >= 1 And Not success          'for each day to left
                While TS > TSBegin And Not success   'look for previous slot this day
                    TS = TS - 1
                    F.FindFirst Overlap(TS, TS) & " And Station >= " & Str(s)
                    If F.NoMatch Then
                    'none with station less than current, look for first one down
                        F.FindLast Overlap(TS, TS)
                        success = Not F.NoMatch
                    Else
                        success = True
                        'mark this one and check up
                        firstMatch = F.Bookmark
                        best = F("Station") - s
                        F.FindPrevious Overlap(TS, TS)'will be less than current
station
                        If F.NoMatch Then
                            'none lower, keep first match
                            F.Bookmark = firstMatch
                        Else
                            If s - F("Station") > best Then
                                'first match was closer
                                F.Bookmark = firstMatch
                            End If
                        End If
                    End If
                Wend
                If Not success Then                  'try previous day
                    aDay = aDay - 1
                    TSBegin = TSBegin - 48
                    TSEnd = TSBegin + slotsPerDay - 1
                    TS = TSEnd + 1
                    Set F = filterData(aDay)
                End If
            Wend
        End If
    ElseIf d = "Down" Then
    'move down within time slot
    'note: should we have option to only stop at programs that _begin_ in current
time slot?
    '       (with exception of first time slot in each day, of course)
        F.Bookmark = current
        F.FindNext "(" & Overlap(TS, TS) & " And Station <> " & Str(s) & ")"
        success = Not F.NoMatch
    ElseIf d = "Up" Then
```

92

Eick-Mataga-Walpole 16-1

```
    'move down within time slot
    'note: should we have option to only stop at programs that _begin_ in current
time slot?
    '        (with exception of first time slot in each day, of course)
            F.Bookmark = current
            F.FindPrevious "(" & Overlap(TS, TS) & " And Station <> " & Str(s) & ")"
            success = Not F.NoMatch
    ElseIf d = "Top" Then
        F.FindFirst Overlap(TS, TS)
        success = Not F.NoMatch
    ElseIf d = "Bottom" Then
        F.FindLast Overlap(TS, TS)
        success = Not F.NoMatch
    End If If success Then
        'update
        TScurrent = TS
        currDay = aDay
        DisplayProg
    Else
        'restore position in data
        filterData(currDay).Bookmark = current
    End If
    'restore other stuff
    TSBegin = DateDiff("n", refDate, (startTime + currDay - 1)) \ 30
    TSEnd = TSBegin + slotsPerDay - 1
    shpSlot(TScurrent - TSBegin + 1 + (currDay - 1) * slotsPerDay).FillStyle =
0'solid
    lblTime(TScurrent - TSBegin + 1 + (currDay - 1) * slotsPerDay).BackStyle =
1'opaque
End Sub Sub DisplayProg ()
'highlight location of current program
'put info for current program in info box
    Dim F As snapshot
    Dim msg As String Set F = filterData(currDay)
    'highlight program
    shpProg(0).Visible = False
    selector.Visible = False
    Position shpProg(0), F("Start"), F("Finish"), F("Station")
    CPlace 0, selector, shpProg(0)
    shpProg(0).Visible = True
    selector.Visible = True 'set message
    msg = StationString(F("Station")) & " - " & F("Title") & " "
    msg = msg & Format(F("Start"), "h:mm AM/PM")
    msg = msg & " to " & Format(F("Finish"), "h:mm AM/PM")
    SetInfo msg, Color(F(colorField) Mod 9)
End Sub
```

Eick-Mataga-Walpole 16-1

```
Sub DoPreview ()
'Construct an appropriate preview message and display
    Dim msg As String msg = "Station: " & StationString(filterData(currDay)("Station"))
    msg = msg & Chr(13) & "Title: " & filterData(currDay)("Title") & Chr(13)
    msg = msg & CategoryString((filterData(currDay)("Type")),
(filterData(currDay)("Category")))
    msg = msg & Chr(13) & "Time: " & Format(filterData(currDay)("Start"), "mmm d,yy
h:mm AM/PM")
    msg = msg & Chr(13) & "     to " & Format(filterData(currDay)("Finish"), "h:mm
AM/PM")

'show popup with preview message
    popup.Caption = msg
    popup.Top = lblTime(1).Top + 2 * lblTime(1).Height
    popup.Left = 2
    popup.Width = slotsPerDay * NDays - 3
    popup.Visible = True
    inPreview = True
End Sub Sub DoSelect ()
'set data for selection and go to TV
    userStation = filterData(currDay)("Station")
    userStart = filterData(currDay)("Start")
    returnCode = TOTV
    Me.Hide
End Sub Sub Form_Activate ()
    Dim i As Integer 'counter
    Static saveFilter As String If saveFilter = filters(currDomain) Then sameFilter = True
    saveFilter = filters(currDomain)
    SetStatus "Evening TV: " & currFilter(TV), greyCOLOR
    'note: "Evening TV" label would be variable
    If inPreview Then
        popup.Visible = False
        inPreview = False
    End If
    If newUser Then
        popup.Caption = "Press 'category' to change the kind of programs diplayed."
        popup.Visible = True
        'note: ought to make popup go away on timer as well as button press
        newUser = False
    End If If sameFilter Then
        'restore darkened time-slot
        If TScurrent > 0 Then
```

Eick-Mataga-Walpole 16-1

```
            shpSlot(TScurrent - TSBegin + 1 + (currDay - 1) * slotsPerDay).FillStyle
= 0'solid
            lblTime(TScurrent - TSBegin + 1 + (currDay - 1) * slotsPerDay).BackStyle
= 1'solid
        End If
    Else
        'unload old program shapes and redo display
        SetInfo "Loading program information...", GREY
        shpProg(0).Visible = False
        lblDay(0).Visible = False
        lblTime(0).Visible = False
        shpSlot(0).Visible = False
        selector.Visible = False
        For i = 1 To NProgs
            Unload shpProg(i)
        Next i
        ApplyFilter
        MakeDisplay
        sameFilter = True
    End If
End Sub Sub Form_KeyDown (KeyCode As Integer, Shift As Integer)
    'note: always turn off the black slot before leaving, so it doesn't mess up
later views
    Dim Index As Integer
    Dim n As Integer
    Select Case KeyCode
    Case Asc("Q")
        End
    Case B_BACK
        shpSlot(TScurrent - TSBegin + 1 + (currDay - 1) * slotsPerDay).FillStyle =
1'transparent
        lblTime(TScurrent - TSBegin + 1 + (currDay - 1) * slotsPerDay).BackStyle =
0'transparent
        returnCode = BACK
        Me.Hide
    Case B_HELP
        sameFilter = True
        InvokeHelp
    Case B_PREVIEW
        If inPreview Then
            popup.Visible = False
            inPreview = False
        Else
            inPreview = True
        End If
    Case B_RIGHT
        If Not filterData(currDay).EOF Then ChangeSel ("Right")
    Case B_LEFT
        If Not filterData(currDay).EOF Then ChangeSel ("Left")
    Case B_UP
        If Not filterData(currDay).EOF Then ChangeSel ("Up")
    Case B_DOWN
```

Eick-Mataga-Walpole 16-

```
            If Not filterData(currDay).EOF Then ChangeSel ("Down")
        Case B_SELECT
            shpSlot(TScurrent - TSBegin + 1 + (currDay - 1) * slotsPerDay).FillStyle =
1'transparent
            lblTime(TScurrent - TSBegin + 1 + (currDay - 1) * slotsPerDay).BackStyle =
0'transparent
            If Not filterData(currDay).EOF Then DoSelect
        Case B_PAGEDOWN
            If Not filterData(currDay).EOF Then ChangeSel ("Bottom")
        Case B_PAGEUP
            If Not filterData(currDay).EOF Then ChangeSel ("Top")
        Case B_FILTER
            shpSlot(TScurrent - TSBegin + 1 + (currDay - 1) * slotsPerDay).FillStyle =
1'transparent
            lblTime(TScurrent - TSBegin + 1 + (currDay - 1) * slotsPerDay).BackStyle =
0'transparent
            returnCode = Filter
            Me.Hide
        Case B_0
            shpSlot(TScurrent - TSBegin + 1 + (currDay - 1) * slotsPerDay).FillStyle =
1'transparent
            lblTime(TScurrent - TSBegin + 1 + (currDay - 1) * slotsPerDay).BackStyle =
0'transparent
            returnCode = SHORTCUT
            Me.Hide
    End Select
    If inPreview Then
        DoPreview
    Else
        popup.Visible = False
    End If
End Sub Sub Form_Load ()
    Dim d As Integer, i As Integer, n As Integer 'counters
    Dim t 'as time
    'set form colors and fonts
    Me.BackColor = formCOLOR
    shpProg(0).BackColor = BorderColor
    lblDay(0).BackColor = backgroundCOLOR
    selector.BorderColor = BorderColor
    dayLine(0).BorderColor = divideCOLOR
    lblTime(0).ForeColor = slotCOLOR
    shpSlot(0).BorderColor = slotCOLOR
    If displayMode = "TV" Then
        lblDay(0).FontSize = smallFONT
        lblTime(0).FontSize = smallFONT
        popup.FontSize = mediumFONT
    Else
        lblDay(0).FontSize = largeFONT
        lblTime(0).FontSize = largeFONT
        popup.FontSize = largeFONT
    End If
    'set scale and size objects
```

Eick-Mataga-Walpole 16-1

```
    SizeAForm Me, DispTop, DispHeight, DispLeft, DispWidth
    Me.Scale (0, 0)-(500, 500)
    SizeAControl lblDay(0), 0, lblHEIGHT, 0, 500
    SizeAControl lblTime(0), lblHEIGHT, lblHEIGHT, 0, 50
    SizeAControl shpSlot(0), 2 * lblHEIGHT + .5 * topGAP, 500 - 2 * lblHEIGHT, 0, 50
    SizeAControl popup, 250, 200, 250, 200
    selector.BorderWidth = 1
    dayLine(0).Y1 = 0
    dayLine(0).Y2 = 500
    'init variables
    sameFilter = False
    sameView = False
    inPreview = False
    NProgs = 0
    NDays = 5      'five week days
    slotsPerDay = 6  'three hours, 6 half-hour slots
    NSlots = NDays * slotsPerDay
    startTime = fakeToday + CVDate("7:00 PM") 'time would be variable and set at
activate
    startTime = DateAdd("d", 2 - Weekday(startTime), startTime) 'set startTime to
Monday(=2)
    'set time slot scale and place the permanent objects
    Me.ScaleWidth = NSlots
    lblTime(0).Width = 1
    shpSlot(0).Width = 1
    For i = 1 To NDays
        'place and caption day labels
        Load lblDay(i)
        SizeAControl lblDay(i), 0, lblHEIGHT, slotsPerDay * (i - 1), slotsPerDay
        lblDay(i).Caption = DayString(i + 1, "short")
        lblDay(i).Visible = True
    Next i
    For d = 1 To NDays
        For i = 1 To slotsPerDay
            n = (d - 1) * slotsPerDay + i
            'place time slot dividers
            Load shpSlot(n)
            shpSlot(n).Move n - 1
            shpSlot(n).ZOrder
            shpSlot(n).Visible = True
            'place time labels
            Load lblTime(n)
            lblTime(n).Move n - 1
            lblTime(n).ZOrder
            t = DateAdd("n", 30 * (i - 1), startTime)
            lblTime(n).Caption = TimeLabel(t)
            'time captions would be set at activate since they could change (when
sameView false)
            shpSlot(i).FillStyle = 1'transparent
            lblTime(i).BackStyle = 0'transparent
            lblTime(n).Visible = True
        Next i
        'place day separators, but don't show yet
        If d < NDays Then
```

97

Eick-Mataga-Walpole 16-1

```
            Load dayLine(d)
            dayLine(d).X1 = d * slotsPerDay
            dayLine(d).X2 = d * slotsPerDay
        End If
    Next d
    InputData
    Form_Activate
    sameView = True
End Sub Sub InputData ()
'part of form_load
'opens the database and creates allData snapshots Dim DB As database
    Dim RefSnap As snapshot
    Dim i As Integer Set DB = OpenDatabase(TVDB)
    'assumes data already sorted by station, start 'get reference date and number of stations
    Set RefSnap = DB.CreateSnapshot("Reference")
    RefSnap.FindFirst "Name = 'Date'"
    refDate = DateValue(RefSnap("Data"))
    RefSnap.FindFirst "Name = 'NStations'"
    MaxStation = Val(RefSnap("Data"))

Set allData(0) = DB.CreateSnapshot("Programs")

'create snapshots of all programs for each weekday at fixed time
    ' time would be variable and these would have to be created at activate
    TSBegin = DateDiff("n", refDate, startTime) \ 30
    TSEnd = TSBegin + slotsPerDay - 1
    For i = 1 To 5
        allData(0).Filter = Overlap(TSBegin + 48 * (i - 1), TSEnd + 48 * (i - 1))
'48 time slots/day
        Set allData(i) = allData(0).CreateSnapshot()
    Next i
    Set allData(0) = Nothing 'won't be needing everything since time is fixed
End Sub Sub MakeDisplay ()
'create the visual schedule of programs from the filtered data
    Dim d As Integer 'day
    Dim c As Integer 'counter
    Dim F As snapshot    'convenience
    Dim hasProgs As Integer 'remember the first day that has programs in it 'set times showing
    If Not sameView Then
        'would change time labels here
    End If
```

98

Eick-Mataga-Walpole 16-1

```
    'place program shapes
    hasProgs = 0
    c = 0   'init count of shpProgs
    On Error GoTo ErrorHandler 'if we run out of shpProgs to allocate
    For d = 1 To NDays
        currDay = d
        Set F = filterData(d)
        'create a shape control for each TV program in the data
        If Not F.EOF Then
            F.MoveFirst
            Do While Not F.EOF
                Load shpProg(c + 1)
                c = c + 1  'increment only after allocate succeeds
                shpProg(c).BackColor = Color(F(colorField) Mod 9)
                Position shpProg(c), F("Start"), F("Finish"), F("Station")
                shpProg(c).ZOrder
                shpProg(c).Visible = True
                F.MoveNext
            Loop
            F.MoveFirst
            If hasProgs = 0 Then hasProgs = d 'remember the first day with programs
in it
        End If
    Next d
MoveOn:
    On Error GoTo 0 'quit trapping errors internally
    'make day lines visible on top
    For d = 1 To NDays - 1
        dayLine(d).ZOrder
        dayLine(d).Visible = True
    Next d 'initialize stuff
    NProgs = c
    currDay = hasProgs
    shpProg(0).ZOrder
    selector.ZOrder
    If currDay > 0 Then
        'set time slot begin and end numbers for current day
        TSBegin = DateDiff("n", refDate, startTime) \ 30 + 48 * (currDay - 1)
        TSEnd = TSBegin + slotsPerDay - 1
        TScurrent = TSBegin
        Set F = filterData(currDay)
        Do While TScurrent <= TSEnd
            F.FindFirst Overlap(TScurrent, TScurrent)
            If Not F.NoMatch Then
                DisplayProg
                Exit Do
            End If
            TScurrent = TScurrent + 1
        Loop
    Else
        TSBegin = DateDiff("n", refDate, startTime) \ 30
        TSEnd = TSBegin + slotsPerDay - 1
```

99

Eick-Mataga-Walpole 16-1

```
        TScurrent = TSBegin
        currDay = 1
    End If
    shpSlot(TScurrent - TSBegin + 1 + (currDay - 1) * slotsPerDay).FillStyle =
0'solid
    lblTime(TScurrent - TSBegin + 1 + (currDay - 1) * slotsPerDay).BackStyle =
1'opaque
    Exit Sub ErrorHandler:
    If Err = 342 Then
        'ran out of room to allocate program shapes, quit drawing
        Resume MoveOn
    Else
        Dim msg
        msg = Error & Chr(13) & "Resume or Cancel?"
        msg = InputBox(msg, "Error Correction", "Resume")
        If msg = "" Then Stop
        Resume MoveOn
    End If
End Sub Sub Position (shape As Control, start, finish, station)
'position a program shape for display
    Dim relativeL, relativeW, dayStart
    Dim edge
    'convert a day/time to position in NSlot scale
    dayStart = startTime + currDay - 1
    relativeL = (start - dayStart) * 48
    relativeW = (finish - dayStart) * 48 - relativeL
    'clip shapes off at day boundaries
    If relativeL < 0 Then
        relativeW = relativeW + relativeL
        relativeL = 0
    End If
    If relativeW + relativeL > slotsPerDay Then relativeW = slotsPerDay - relativeL
    'set left and width of shape
    edge = (currDay - 1) * slotsPerDay
    shape.Left = relativeL + edge + sideGap
    shape.Width = relativeW - 2 * sideGap
    'enforce minimum width so program is visible
    If shape.Width < MINProgWidth Then shape.Width = MINProgWidth
    'set top according to station
    'note: this scheme only works because stations are named 1..n
    rowOffset = ((500 - 2 * lblHEIGHT - shpProg(0).Height) / NStation)
    shape.Top = shpSlot(0).Top + topGAP + (station - 1) * rowOffset
End Sub
```

100

What is claimed is:

1. A method comprising the steps of:

receiving program schedule data for at least 300 individual channels for a time period of at least a week, said program schedule data having at least 3600 individual program titles with each of said individual titles having a respective start and stop time;

storing said program schedule data in local memory for rapid sorting and retrieval in a database format;

displaying a plurality of vertically cascaded cards with each card representing a respective individual title with its particular start time and channel;

filtering the program schedule data in response to interactive user inputs into a subgroup of the program schedule data;

displaying the subgroup of the program schedule data for the user's review; and interactively selecting an individual title from the subgroup of program schedule data for viewing on a TV screen.

2. A method comprising the steps of:

receiving program schedule data for at least 300 individual channels for a time period of at least a week, said program schedule data having at least 3600 individual program titles with each of said individual titles having a respective start and stop time;

storing said program schedule data in local memory for rapid sorting and retrieval in a database format;

displaying a plurality of vertically cascaded cards with each card representing a respective individual title with its particular start time and channel;

filtering the program schedule data in response to interactive user inputs into a subgroup of the program schedule data;

displaying the subgroup of the program schedule data for the user's review; and interactively selecting an individual title from the subgroup of program schedule data for recording by a video recording device.

3. A method for choosing a desired program from a large schedule of programs whose data is stored in a local memory, comprising the steps of:

displaying a vertically cascaded group of cards with each card representing a program of a particular time and channel;

displaying a selection window located around a subgroup of said group of cards;

displaying a two-dimensional grid adjacent to said vertically cascaded group of cards in which said subgroup of the programs represented by said vertically cascaded group of cards are shown in greater detail;

displaying a first active area within said selection window highlighting one of said subgroup of programs;

displaying a second active area within said two-dimensional grid, said second active area being located around and highlighting greater details of the program highlighted in said first active area;

moving said first active area in a vertical direction in response to vertical direction arrows to a viewer's input of a remote control; and selecting a desired program by moving said active area to said desired program and actuating a select button until said set top box makes said selection.

4. The method according to claim 3, further comprising the steps of after said active area is moved one location outside of said selection window by inputs from said viewer, moving said selection window to a contiguous subgroup to which said active area has moved.

* * * * *